United States Patent
Kim et al.

(10) Patent No.: US 10,681,419 B2
(45) Date of Patent: Jun. 9, 2020

(54) DIGITAL DEVICE AND METHOD FOR CONTROLLING THE SAME

(71) Applicant: LG ELECTRONICS INC., Seoul (KR)

(72) Inventors: Daegu Kim, Seoul (KR); Alan Thomas Shen, Santa Clara, CA (US); David Kempe, Santa Clara, CA (US); Itai Vonshak, Santa Clara, CA (US); Molly Davis, Santa Clara, CA (US); Liron Damir, Santa Clara, CA (US); Danielle Zimmerman, Santa Clara, CA (US); Herbert Han-pu Wang, Santa Clara, CA (US); Brian Behnke, Santa Clara, CA (US)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/437,681

(22) PCT Filed: Dec. 15, 2014

(86) PCT No.: PCT/KR2014/012326
§ 371 (c)(1),
(2) Date: Apr. 22, 2015

(87) PCT Pub. No.: WO2015/099343
PCT Pub. Date: Jul. 2, 2015

(65) Prior Publication Data
US 2015/0304717 A1    Oct. 22, 2015

Related U.S. Application Data

(60) Provisional application No. 61/920,473, filed on Dec. 24, 2013.

(30) Foreign Application Priority Data

Aug. 28, 2014  (KR) .................... 10-2014-0112973
Aug. 28, 2014  (KR) .................... 10-2014-0112974

(51) Int. Cl.
*H04N 21/466*   (2011.01)
*H04N 21/431*   (2011.01)
(Continued)

(52) U.S. Cl.
CPC ..... *H04N 21/4668* (2013.01); *G06Q 30/0269* (2013.01); *H04N 21/251* (2013.01);
(Continued)

(58) Field of Classification Search
CPC ............ G06Q 30/0269; H04N 21/251; H04N 21/2665; H04N 21/27; H04N 21/4312;
(Continued)

(56) References Cited

U.S. PATENT DOCUMENTS 5,530,796 A * 6/1996 Wang ..................... G06F 8/34
                                                    715/762
6,177,931 B1   1/2001 Alexander et al.
(Continued)

FOREIGN PATENT DOCUMENTS

CN    103081501 A    5/2013
GB      2476136 A    6/2011
(Continued)

OTHER PUBLICATIONS

U.S. Appl. No. 14/694,873, filed Apr. 23, 2015.

*Primary Examiner* — Hai V Tran
*Assistant Examiner* — Jen-Shi Huang
(74) *Attorney, Agent, or Firm* — Birch, Stewart, Kolasch & Birch, LLP

(57) ABSTRACT

Various embodiment(s) of a digital device and a method for controlling the same are disclosed in this specification.
(Continued)

Herein, the method for controlling a digital device according to an exemplary embodiment of the present invention may include f receiving a signal requesting for outputting a recommended content page, receiving recommended content page data of a most recently update version from a cloud server, and displaying the recommended content page received from the cloud server, wherein the recommended content page may include a first window including broadcast content information and a second window including VOD content information, and wherein the first window and the second window may include thumbnail images of each content.

8 Claims, 30 Drawing Sheets

(51) Int. Cl.

| | | |
|---|---|---|
| H04N 21/472 | (2011.01) | |
| H04N 21/45 | (2011.01) | |
| H04N 21/27 | (2011.01) | |
| H04N 21/2665 | (2011.01) | |
| H04N 21/4782 | (2011.01) | |
| H04N 21/25 | (2011.01) | |
| H04N 21/422 | (2011.01) | |
| H04N 21/4722 | (2011.01) | |
| G06Q 30/02 | (2012.01) | |
| H04N 21/442 | (2011.01) | |

(52) U.S. Cl.
CPC ......... *H04N 21/2665* (2013.01); *H04N 21/27* (2013.01); *H04N 21/42208* (2013.01); *H04N 21/4312* (2013.01); *H04N 21/4316* (2013.01); *H04N 21/44222* (2013.01); *H04N 21/4532* (2013.01); *H04N 21/4667* (2013.01); *H04N 21/4722* (2013.01); *H04N 21/4782* (2013.01); *H04N 21/47202* (2013.01)

(58) Field of Classification Search
CPC ........... H04N 21/4316; H04N 21/4532; H04N 21/4667; H04N 21/4668; H04N 21/47202; H04N 21/4782; H04N 21/42204; H04N 21/4622; H04N 21/8545; H04N 21/42208; H04N 21/44222; H04N 21/4722; H04N 21/482; H04N 21/47208; H04N 21/4438; H04N 7/0884; G06F 3/0482; G06F 2203/04803; G06F 3/0486

See application file for complete search history.

(56) References Cited

U.S. PATENT DOCUMENTS

| | | | | |
|---|---|---|---|---|
| 8,490,137 B2* | 7/2013 | Lee | ................. | H04N 21/42204 725/43 |
| 8,522,279 B2* | 8/2013 | Lee | ................. | H04N 21/25875 725/44 |
| 8,572,653 B2* | 10/2013 | Kim | ..................... | G06F 3/0346 725/38 |
| 8,863,191 B2* | 10/2014 | Choi | .................... | H04N 5/4403 386/297 |
| 9,015,758 B2* | 4/2015 | Choi | .................. | H04N 21/8173 725/41 |
| 9,094,709 B2* | 7/2015 | Jeong | ................. | H04N 21/4312 |
| 9,182,890 B2* | 11/2015 | Kang | .................. | G06F 3/0483 |
| 9,332,298 B2* | 5/2016 | Suk | .................. | H04N 21/42222 |
| 9,398,339 B2* | 7/2016 | Lee | ................. | H04N 21/4755 |
| 9,489,078 B2* | 11/2016 | Seo | ........................ | G06F 1/1641 |
| 9,489,080 B2* | 11/2016 | Seo | ........................ | G06F 1/1641 |
| 9,794,616 B2* | 10/2017 | Kim | .................. | H04N 21/4316 |
| 2005/0149969 A1 | 7/2005 | Kumar et al. | | |
| 2007/0050726 A1* | 3/2007 | Wakai | ................... | G06F 3/0486 715/769 |
| 2008/0307350 A1* | 12/2008 | Sabatelli | ............... | G06F 3/0481 715/779 |
| 2009/0158311 A1 | 6/2009 | Hon et al. | | |
| 2009/0187842 A1* | 7/2009 | Collins | .................. | G06F 3/0482 715/769 |
| 2010/0262995 A1 | 10/2010 | Woods et al. | | |
| 2010/0302059 A1* | 12/2010 | Hnatiuk | .............. | G06F 3/04817 340/12.54 |
| 2011/0107374 A1* | 5/2011 | Roberts | .............. | H04N 5/44543 725/46 |
| 2012/0023524 A1 | 1/2012 | Suk et al. | | |
| 2012/0054794 A1* | 3/2012 | Kim | ........................ | G06F 3/0346 725/38 |
| 2012/0120316 A1* | 5/2012 | Lee | .................. | H04N 21/42204 348/564 |
| 2012/0124615 A1 | 5/2012 | Lee | | |
| 2012/0139945 A1* | 6/2012 | Choi | ........................ | G06F 3/0346 345/660 |
| 2012/0147270 A1* | 6/2012 | Kim | ................... | H04N 5/44591 348/564 |
| 2012/0226999 A1 | 9/2012 | Seo | | |
| 2012/0304229 A1* | 11/2012 | Choi | .................. | H04N 21/8173 725/41 |
| 2013/0174200 A1 | 7/2013 | Sinha et al. | | |
| 2013/0227471 A1 | 8/2013 | Cha et al. | | |
| 2013/0239149 A1* | 9/2013 | Kim | .................. | H04N 21/2362 725/59 |
| 2013/0282755 A1 | 10/2013 | Procopio et al. | | |
| 2013/0321340 A1* | 12/2013 | Seo | ...................... | G06F 1/1641 345/174 |
| 2014/0053189 A1 | 2/2014 | Lee et al. | | |
| 2014/0096047 A1* | 4/2014 | Ha | ...................... | G06F 3/04817 715/768 |
| 2014/0215380 A1 | 7/2014 | Kang et al. | | |
| 2015/0020109 A1 | 1/2015 | Higa et al. | | |
| 2016/0044382 A1 | 2/2016 | Seo et al. | | |

FOREIGN PATENT DOCUMENTS

| | | |
|---|---|---|
| KR | 10-2008-0039642 A | 5/2008 |
| KR | 10-2012-0058014 A | 6/2012 |
| KR | 10-2012-0099931 A | 9/2012 |
| KR | 10-2013-0057298 A | 5/2013 |
| KR | 10-2013-0084350 A | 7/2013 |
| KR | 10-2013-0097488 A | 9/2013 |
| KR | 10-2013-0098460 A | 9/2013 |
| WO | WO 2008/030565 A2 | 3/2008 |
| WO | WO 2009/031102 A2 | 3/2009 |

* cited by examiner

FIG. 15
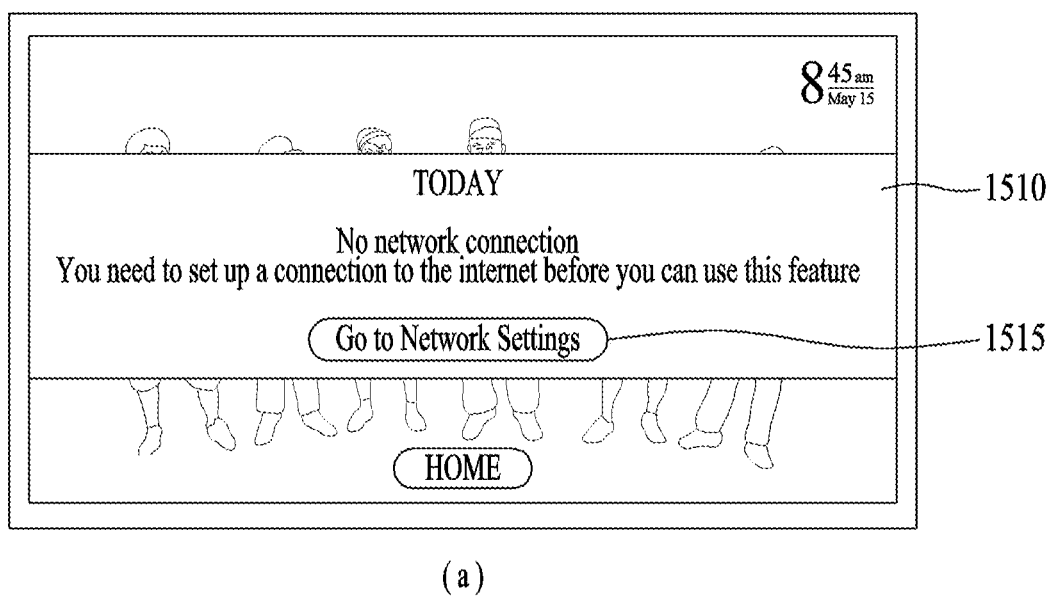
(a)
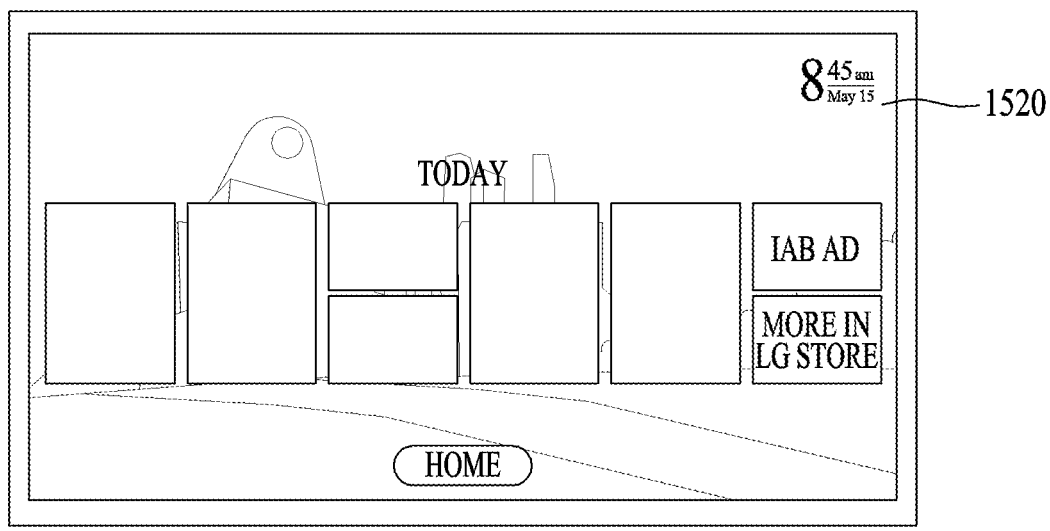
(b)

FIG. 39
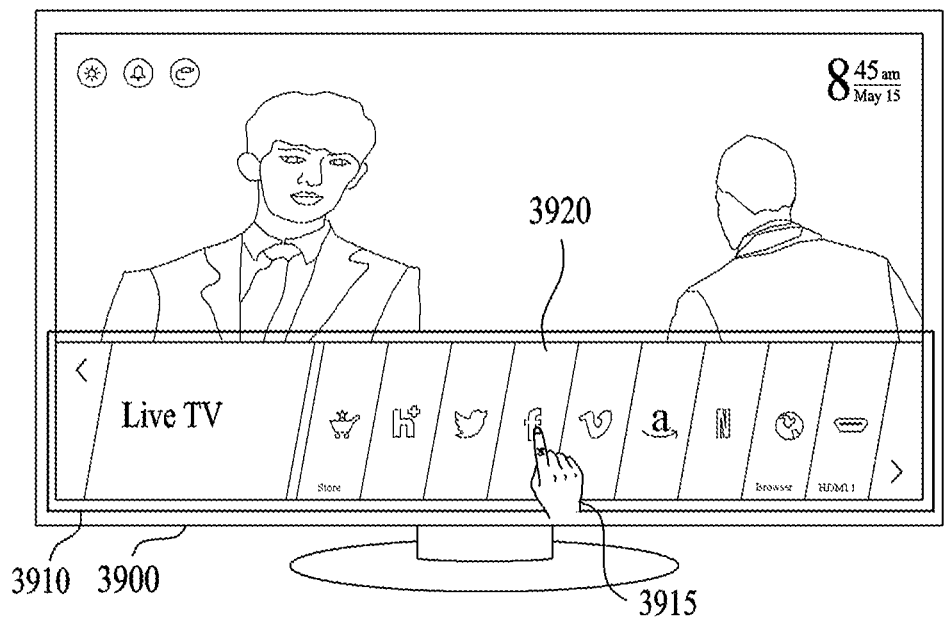
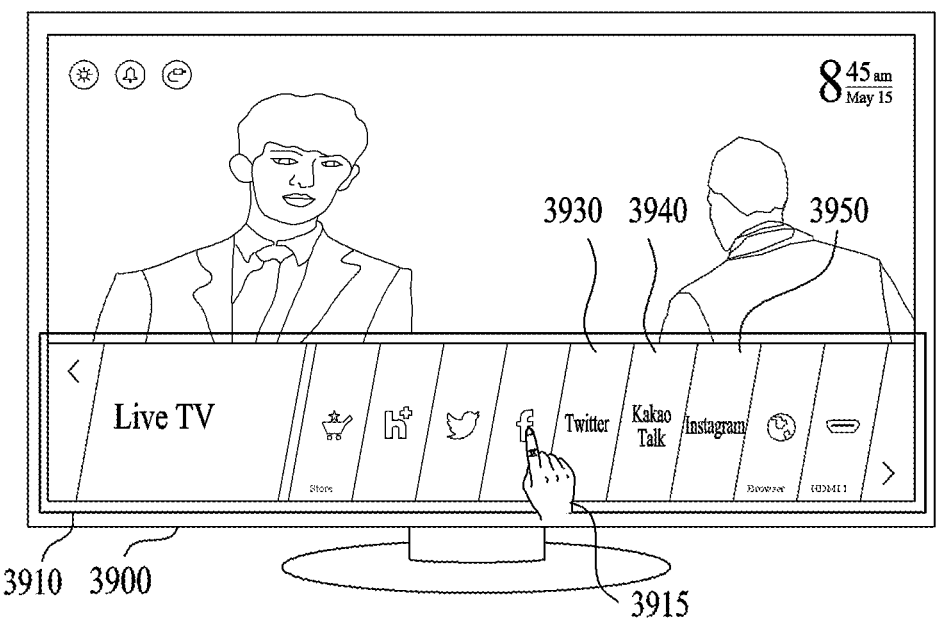

DIGITAL DEVICE AND METHOD FOR CONTROLLING THE SAME

CROSS REFERENCE TO RELATED APPLICATIONS

This application is the National Phase of PCT International Application No. PCT/KR2014/012326, filed on Dec. 15, 2014, which claims priority under 35 U.S.C. 119(e) to U.S. Provisional Application No. 61/920,473, filed on Dec. 24, 2013 and under 35 U.S.C. 119(a) to Korean application Nos. 10-2014-0112973 and 10-2014-0112974, both filed on Aug. 28, 2014 which are hereby expressly incorporated by reference into the present application.

FIELD OF THE INVENTION

The present invention relates to a digital device and, more particularly, as an invention that has been designed to provide a user using the digital device with an optimized recommended content page by periodically updating viewing patterns of the user using the digital device, to a digital device that can provide diverse supplemental data to the user by using at least one window displayed on the recommended content page.

BACKGROUND ART

In succession to standing devices, such as PCs (Personal Computer), TVs (Television), and so on, the evolution of mobile devices, such as smart phones, Tablet PCs, and so on, is remarkable. Although standing devices and mobile devices have initially been evolving in each of their respective fields by being differentiated from one another, such fields have become non-distinctive with the recent advent of the digital convergence boom.

Additionally, with such development or change in the environment of the digital devices, expectation levels of users have also increased gradually, thereby causing an increase in a request for supporting a more diverse range of high-quality services or applications.

DETAILED DESCRIPTION OF THE INVENTION

Technical Objects

The present invention has been devised to resolve the above-described situations and problems, and an object of the present invention is to provide the user with a recommended content page, which is updated at a predetermined cycle period.

Another object of the present invention is to provide the user with an optimized recommended content service by storing (or saving) a viewing history (or viewing record) data of the user using the digital device.

Yet another object of the present invention is to provide thumbnail images on a window, which is included in the recommended content page, so that the user can intuitively (or directly) recognize content information, and to provide the user with diverse supplemental content information by using the window.

The technical objects that are to be achieved in the present invention will not be limited only to the technical objects described above. Accordingly, technical objects that have not been mentioned above or additional technical objects of the present application may become apparent to those having ordinary skill in the art from the description presented below.

Technical Solutions

Diverse embodiment(s) of a digital device and a method for controlling the same are disclosed in this specification.

A method for controlling a digital device according to an embodiment of the present invention may be designed to include receiving a signal requesting for outputting recommended content page, receiving a most recently updated version of recommended content page data from a cloud server, and displaying the recommended content page received from the cloud server.

A digital device according to an embodiment of the present invention may be designed to include a receiving unit configured to receive a signal from an external inputting means, a communication module configured to perform data communication with an external server, a display module configured to display at least one content, and a controller configured to control operations of the digital device, wherein the controller may be designed to control the digital device so as to receive a recommended content page output request signal, to receive a most recently updated version of recommended content page data from a cloud server, and to display the recommended content page received from the cloud server.

The technical solutions that may be achieved by the present invention will not be limited only to the technical solutions described above. Accordingly, technical solutions that have not been mentioned above or additional technical solutions of the present application may become apparent to those having ordinary skill in the art from the description presented below.

Effects of the Invention

Advantageous effects of the present invention are as described below.

According to one of diverse embodiments of the present invention, the present invention is advantageous in that a recommended content page, which is updated at a predetermined cycle period, may be provided to the user.

According to another one of diverse embodiments of the present invention, the present invention has a technical effect of providing the user with an optimized recommended content service by storing (or saving) a viewing history (or viewing record) data of the user using the digital device.

According to yet another one of diverse embodiments of the present invention, the present invention has a technical effect of providing thumbnail images on a window, which is included in the recommended content page, so that the user can intuitively (or directly) recognize content information, and providing the user with diverse supplemental content information by using the window.

The effects that may be gained in the present invention will not be limited only to the effects described above. Accordingly, effects that have not been mentioned above or additional effects of the present application may become apparent to those having ordinary skill in the art from the description presented below.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 14 and FIG. 15 are overviews illustrating examples of outputting a recommended content page from the digital device according to an embodiment of the present invention.

FIG. 39 illustrates another example of controlling a Favorite application within a first page from the digital device according to an embodiment of the present invention.

BEST MODE FOR CARRYING OUT THE INVENTION

Figure 1:
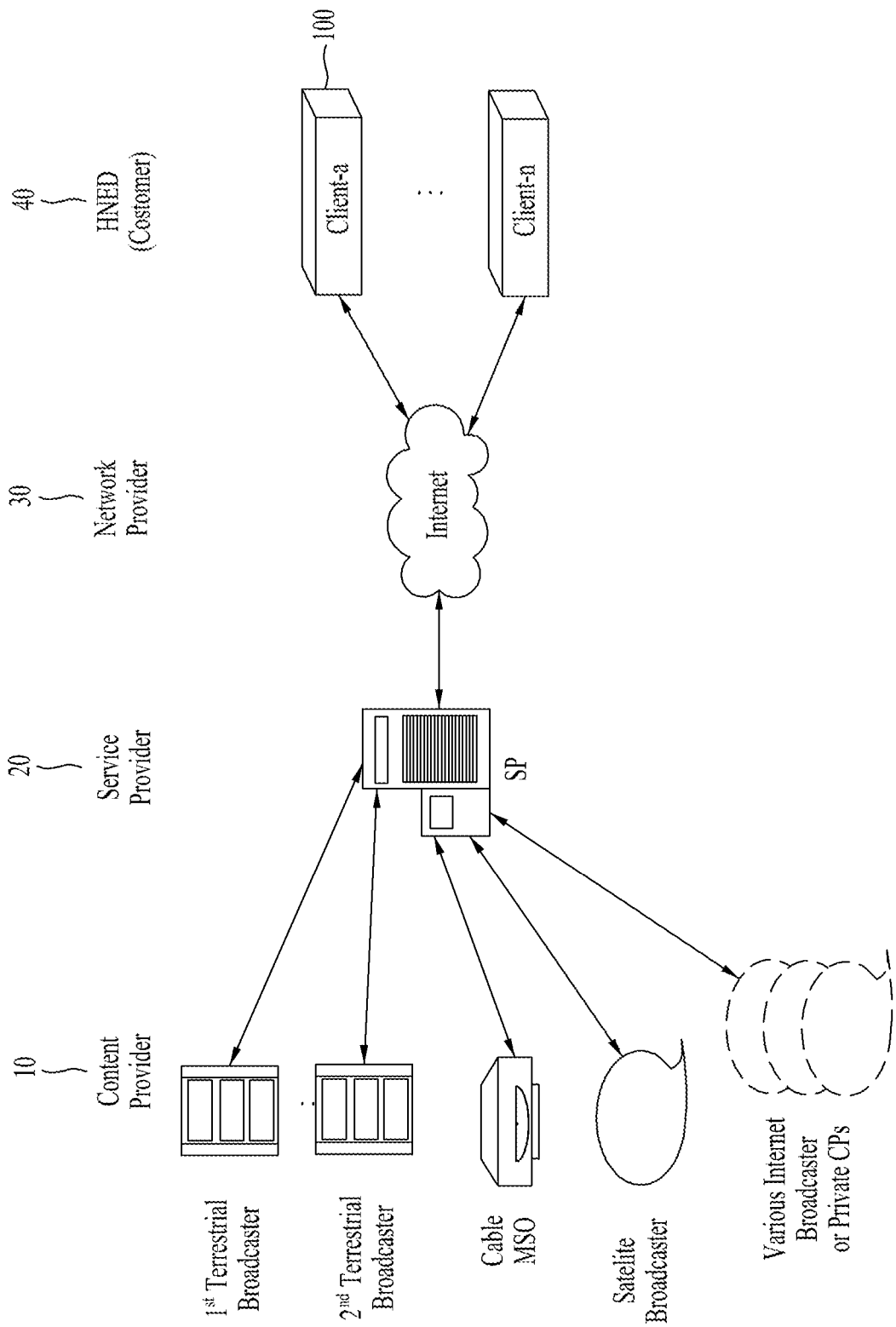
FIG. 1 is a schematic diagram illustrating a service system including a digital device according to one embodiment of the present invention.

Description will now be given in detail according to embodiments disclosed herein, with reference to the accompanying drawings.

In general, a suffix such as "module" and "unit" may be used to refer to elements or components. Use of such a suffix herein is merely intended to facilitate description of the specification, and the suffix itself is not intended to give any special meaning or function. Meanwhile, such an ordinal number as 'first-', 'second-' and the like may have a meaning of an order. Yet, the terminologies can be used for the purpose of distinguishing one component from another component capable of being overlapped with each other.

The accompanying drawings are used to help easily understand various technical features and it should be understood that the embodiments presented herein are not limited by the accompanying drawings.

As such, the present disclosure should be construed to extend to any alterations, equivalents and substitutes in addition to those which are particularly set out in the accompanying drawings.

A digital device according to the present invention as set forth herein may be any device that can handle any one of transmitting, receiving, handling and outputting data, content, servicer, application, and so forth. The digital device may be connected to other digital devices through wired network or wireless network, paired or connected to external server, and through the connections, the digital device may transmit and receive the prescribed data. Examples of the digital device may include standing devices such as a network TV, a Hybrid Broadcast Broadband TV (HBBTV), a smart TV, Internet Protocol TV (IPTV), and personal computer (PC), or mobile/handheld devices such as a Personal Digital Assistant (PDA), a smart phone, a tablet PC, or a Notebook computer. For convenience of description, in this specification, the Digital TV is used in FIG. 2 and the mobile device is used in FIG. 3 depicting the digital device.

Further, the digital device in this specification may be referred to configuration having only a panel, set-top box (STB), or a set including the entire system.

Moreover, the wired or wireless network described in this specification may refer to various pairing method, standard telecommunication network protocol methods supported for transmitting and receiving data between digital devices or between digital device and external server. The wired or wireless network also includes various telecommunication network protocols supported now as well as in the future. Examples of the wired or wireless network include wired network supported by various telecommunication standard such as Universal Serial Bus (USB), Composite Video Banking Sync (CVBS), Component, S-Video (analog), Digital Visual Interface (DVI), High Definition Multimedia Interface (HDMI), RGB, D-SUB and so forth, and wireless network supported by various standards including Bluetooth, Radio Frequency Identification (RFID), infrared Data Association (IrDA), Ultra Wideband (UWB), ZigBee, Digital Living Network Alliance (DLNA), Wireless LAN (WLAN)(Wi-Fi), Wireless broadband (Wibro), World Interoperability for Microwave Access (Wimax), High Speed Downlink Packet (HSDPA), Long Term Evolution/LTE-Advanced (LTE/LTE-A), Wi-Fi direct, and so forth.

In addition, when this specification refers simply to the digital device, it can mean a standing device or a mobile device depending on the context, and when it is not referred to a specific device, the digital device referred in this specification refers to both standing and mobile device.

Meanwhile, the digital device may perform intelligent functions such as receiving broadcasting program, operating computer functions, and supporting at least one external input, and by being connected through the network wired or wirelessly, the digital device may support e-mail functions, web browsing functions, banking, gaming, and executing applications. The digital device may further include an interface for any one of input or control means (hereinafter referred as "input means") supporting handwriting input, touch-screen, and space remote control.

Furthermore, the digital device may use a standard operating system (OS), however, the digital device described in this specification and the embodiments, uses a Web OS. Therefore, the digital device may perform functions such as adding, deleting, amending, and updating the various services and applications for standard universal OS kernel or Linux kernel in order to construct a more user-friendly environment.

When the digital device, described above, receives and handles external input, the external input includes external input devices described above, meaning all input means or digital devices, capable of transmitting and receiving data through wired or wireless network connected to and from the digital device. For example, the external input includes HDMI, game devices such as a Playstation or an X-Box, a smart phone, a tablet PC, a printing device such as a pocket photo, digital devices such as a smart TV and a blue-ray device.

The "server" referred to as in this application, includes digital device or system capable of transmitting and receiving data to and from client, and may also be referred to as a processor. For example, the server may be servers providing services such as a portal server providing web page, a web content or a web service, an advertising server providing advertising data, a content server, a Social Network Service (SNS) server providing an SNS service, a service server providing a service to a manufacturer, a Multichannel Video Programming Distributor (MVPD) providing a Video on Demand (VOD) or a streaming service, and a service server providing pay services.

In this application, when application is described for the convenience of explanation, the meaning of application in the context may include services as well as applications.

In the following description, various embodiments according to the present invention are explained with reference to attached drawings.

FIG. 1 is a schematic diagram illustrating a service system including a digital device according to one embodiment of the present invention.

Referring to FIG. 1, examples of a service system comprising a digital receiver may include a content provider (CP) 10, a service provider (SP) 20, a network provider (NP) 30, and a home network end user (HNED) (Customer) 40. The HNED 40 includes a client 100, that is, a digital device.

The CP 10 produces and provides content. Referring to FIG. 1, the CP 10 can include a first or second terrestrial broadcaster, a cable system operator (SO), a multiple system operator (MSO), a satellite broadcaster, various Internet broadcasters, private content providers (CPs), etc. The CP 10 can produce and provide various services or applications as well as broadcast content.

The SP 20 service packetizes content provided by the CP 10 and provides to FINED 40. For example, the SP 20 packetizes at least one content provided by the first or second terrestrial broadcaster, the cable SO, the MSO, the satellite broadcaster, various Internet broadcasters, the private CPs for service and provides it to the HNED 40.

The SP 20 can provide services to the client 100 in a uni-cast or multi-cast manner. Meanwhile, the SP 20 can transmit data to plurality of clients which are previously registered at once, and Internet Group Management Protocol (IGMP) may be used in transmission.

The CP 10 and the SP 20 can be configured in the form of one entity. For example, the CP 10 can function as the SP 20 by producing content and directly packetizing the produced content into services, and vice versa.

The NP 30 can provide a network environment for data exchange between the CP 10 and/or SP 20 and the client 100.

The client 100, a consumer included in the FINED 40, can construct a home network, receive data and transmit/receive data for various services or applications such as a VOD, a streaming, and the like, via the NP 30.

The CP 10 and/or SP 20 included in the service system can use a conditional access or a content protection means for protecting content transmitted. In this case, the client 100 can use processing means such as a cable card (or Point of Deployment (POD)) or a downloadable conditional access system (DCAS), for the conditional access or protecting content.

In addition, the client 100 can use a bi-directional service through a network. In this case, the client 100 can perform or function as the CP 10. And, the SP 20 can transmit it to other client.

In FIG. 1, CP 10 and/or SP 20 can be a server providing service which specifies below in the disclosure. In this case, the server can include the NP 30, if necessary. Even though not specified in the disclosure, service or service data can include not only service or application received from the external server but also an internal service or application as above-mentioned. This service or application is defined service data or application data for the client 100 based on the Web OS.

Figure 2:
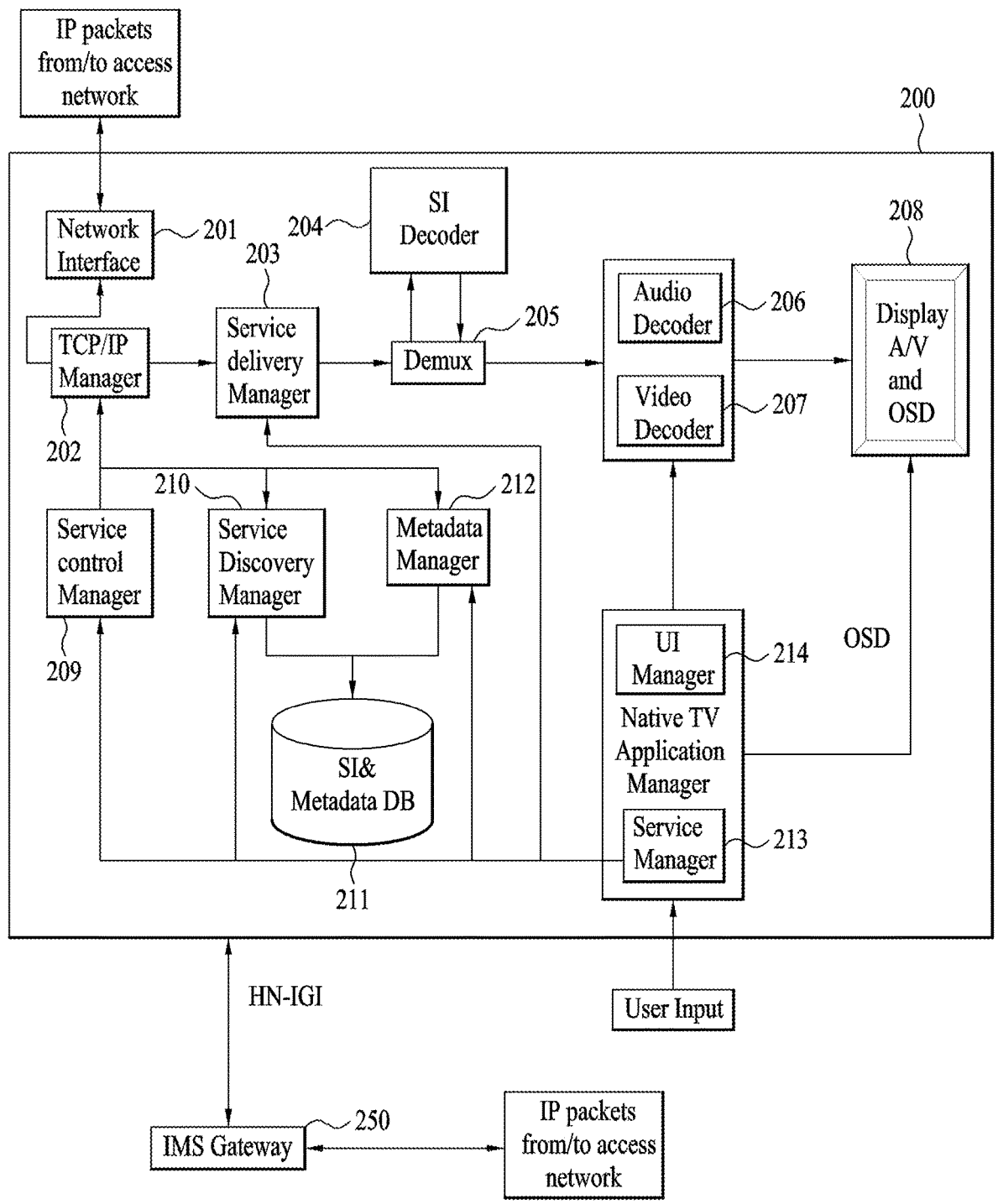
FIG. 2 is a block diagram illustrating a digital device according to one embodiment of the present invention.
Figure 3:
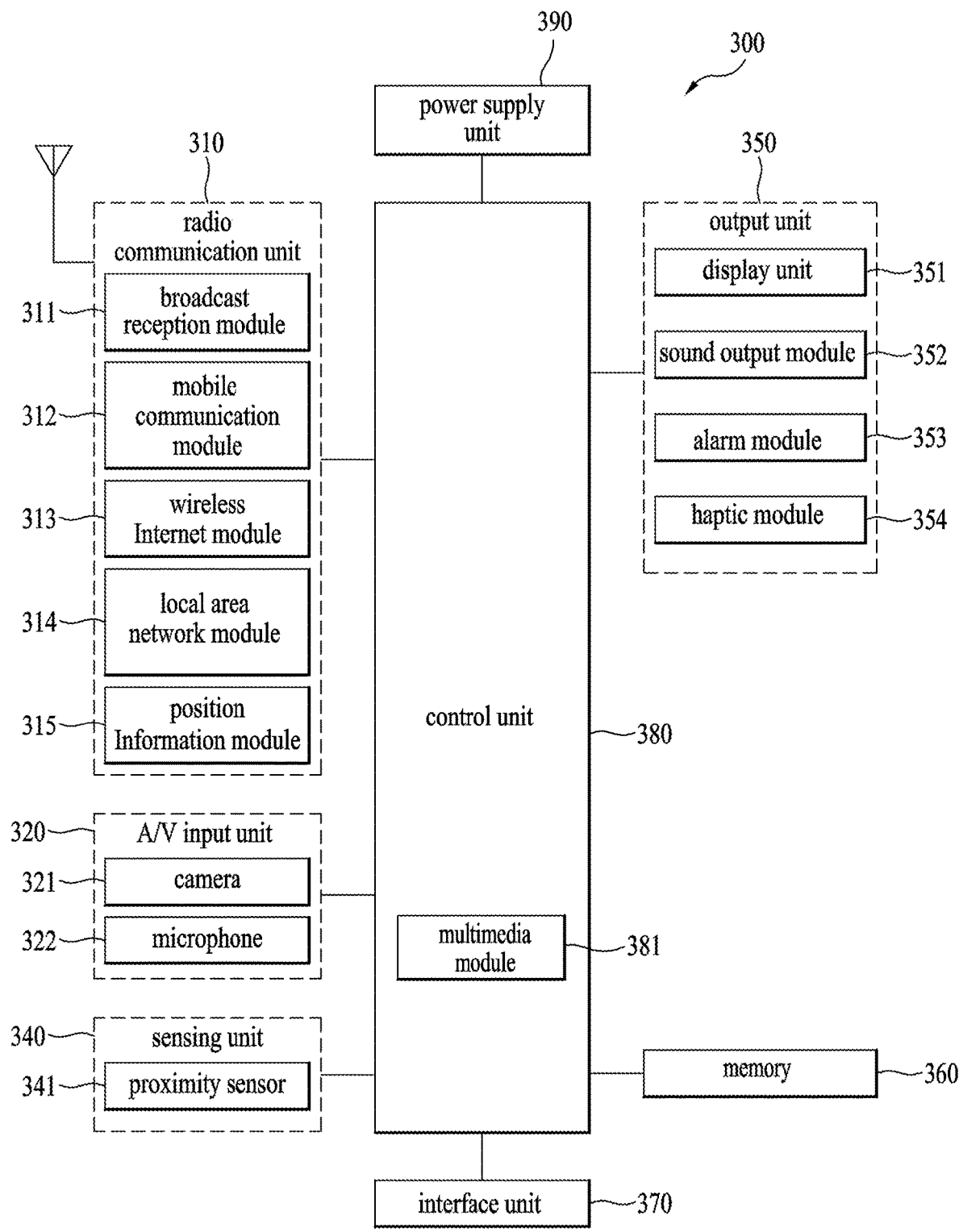
FIG. 3 is a block diagram illustrating the digital device according to another embodiment of the present invention.

FIG. 2 is a block diagram showing a digital device according to one embodiment of the present invention.

In the disclosure, the digital device can correspond to the client 100 shown in FIG. 1.

The digital device 200 can include a network interface 201, a TCP/IP (Transfer Control Protocol/Internet Protocol) manager 202, a service delivery manager 203, an SI (System Information, Service Information or Signaling Information) decoder 204, a demultiplexer 205, an audio decoder 206, a video decoder 207, a display AN (Audio/Video) and OSD (On Screen Display) module 208, a service control manager 209, a service discovery manager 210, a SI & metadata database (DB) 211, a metadata manager 212, a service manage 213, a UI (User Interface) manager 214, etc.

The network interface 201 can receive or transmit IP (Internet Protocol) packets or IP datagrams (hereinafter, referred as IP packets) through a network accessed. As an example, the network interface 201 can receive service, application, content, etc., from the SP 20 of FIG. 1 through the network.

The TCP/IP manager 202 is involved in packet delivery of IP packets transmitted to the digital device 200 and IP packets transmitted from the digital device 200 between a source and a destination. The TCP/IP manager 202 may classify received packets according to an appropriate protocol and output the classified packets to the service delivery manager 205, the service discovery manager 210, the service control manager 209, and the metadata manager 212, etc.

The service delivery manager 203 can control received service data. For example, the service delivery manager 203 can use Real-Time Protocol/Real-Time Control Protocol (RTP/RTCP) to control real-time streaming data. If the real-time streaming data is transmitted using the RTP, the service delivery manager 203 can parse a received real-time streaming data packet, transmitted based on the RIP, and transmits the parsed data packet to the demultiplexer 205 or store the parsed data packet in the SI & metadata DB 211 under the control of the service manager 213. The service delivery manager 203 can provide feedback of the network reception information to the server based on the RTCP.

The demultiplexer 205 can demultiplex audio data, video data, SI data from a received packet and transmit the demultiplexed data to each of the audio/video decoder 206/207 and the SI decoder 204.

The SI decoder 204 can decode the demultiplexed SI data such as program specific information (PSI), program and system information protocol (PSIP), digital video broadcast-service information (DVB-SI), digital television terrestrial multimedia broadcasting/coding mobile multimedia broadcasting (DTMB/CMMB), etc. The SI decoder 204 can store the decoded SI data in the SI & metadata DB 211. The SI data stored in the SI & metadata DB 211 can be read and extracted by a component which requires the SI data according to user request, for example.

The audio decoder 206 and the video decoder 207 can decode the demultiplexed audio and video data, respectively. The decoded audio data and video data can be provided to the user through the display unit 208.

The application manager can include the service manager 213 and the UI manager 214, for example. The application manager can perform a function of the controller of the digital device 200. In other words, the application manager can administrate the overall state of the digital receiver 200, provides a UI, and manage other mangers.

The UI manager 214 can provide a graphic user interface (GUI)/UI for the user using OSD, etc. And, the UI manager 214 can receive a key input from the user and perform an operation of the device in response to the received key input. For example, the UI manager 214 can transmit a key input signal to the service manager 213 if the key input signal of selecting a channel is received from the user.

The service manager 213 can control service-related managers such as the service delivery manager 203, the service discovery manager 210, the service control manager 209, and the metadata manager 212.

The service manager 213 can generate a channel map and control a channel selection using the generated channel map according to the received key input from the UI manager 214. The service manager 213 can receive service information from the SI decoder 204 and set audio/video PID (packet identifier) of a selected channel to the demultiplexer 205. The set audio/video PID can be used for the demultiplexing procedure. Accordingly, the demultiplexer 205 can filter the audio data, video data and SI data using the PID (PID filtering or section filtering.)

The service discovery manager 210 can provide information required to select a service provider that provides a service. Upon receipt of a signal for selecting a channel from the service manager 213, the service discovery manager 210 discovers or searches a service based on the received signal.

The service control manager 209 can select and control a service. For example, the service control manager 209 can use perform service selection and control using IGMP or real time streaming protocol (RTSP) when the user selects a live broadcast service, and using RTSP when the user selects a VOD service. The RTSP can provide a trick mode for the real-time streaming. Also, the service manager 213 can initialized and manage a session through the IMS (IP Multimedia Subsystem) gateway 250 using IMS and SIP (Session Initiation Protocol.) The above protocols are just an example and other protocols can be used depending on an implementation.

The metadata manager 212 can manage metadata regarding services and store metadata in the SI & metadata DB 211.

The SI & metadata DB 211 can store SI data decoded by the SI decoder 204, metadata managed by the metadata manager 212, and information required to select a service provider, which is provided by the service discovery manager 210. In addition, the SI & metadata DB 211 can store system set-up data, etc.

The SI & metadata DB 211 can be implemented using a Non-Volatile RAM (NVRAM) or a Flash memory, and the like.

An IMS gateway 250 can be a gateway that collects functions required to access IPTV services based on an IMS.

FIG. 3 is a block diagram illustrating the digital device according to another embodiment of the present invention.

FIG. 2 explained above refers to a standing device as according to an embodiment of the digital device, but FIG. 3 refers to a mobile device as another embodiment of the digital device With reference to FIG. 3, the mobile terminal 300 can include a wireless communication unit 310, an A/V input unit 320, an user input unit 330, a sensing unit 340, an output unit 350, a memory 360, an interface unit 370, a controller 380, and a power supply unit 390.

Each element is explained in detail as follows.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel may include a satellite channel and a terrestrial channel. At least two broadcast receiving modules 311 can be provided in the mobile terminal 300 to facilitate simultaneous reception of at least two broadcast channels or broadcast channel switching.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312.

The broadcast associated information can be implemented in various forms. For instance, broadcast associated information may include an electronic program guide (EPG) and an electronic service guide (ESG).

The broadcast receiving module 311 may be configured to receive broadcast signals transmitted from various types of broadcast systems. By non-limiting example, such broadcasting systems may include digital video broadcasting-Terrestrial (DVB-T), DVB-Satellite (DVB-S), DVB-Handheld (DVB-H), DVB-Convergence of Broadcasting and Mobile Services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 311 can be configured to be suitable for other broadcasting systems as well as the above-noted digital broadcasting systems.

The broadcast signal and/or broadcast associated information received by the broadcast receiving module 311 may be stored in a suitable device, such as the memory 360.

The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 313 supports Internet access for the mobile terminal 300. This module may be internally or externally coupled to the mobile terminal 300. The wireless Internet technology can include WLAN (Wi-Fi), Wibro, Wimax, or HSDPA.

The short-range communication module 314 facilitates relatively short-range communications. Suitable technologies for implementing this module include RFID, IrDA, UWB, as well as the networking technologies commonly referred to as Bluetooth™ and ZigBee™, to name a few.

The position-location module 315 identifies or otherwise obtains the location of the mobile terminal 100. According to one embodiment, this module may be implemented with a global positioning system (GPS) module. The GPS module 315 can precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 315 can calculate speed information by continuously calculating a real-time current location.

With continued reference to FIG. 3, the A/V input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage.

The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 may detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 may sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display 351, an audio output module 352, an alarm unit 353, a haptic module 354, and a projector module 355.

The display 351 is typically implemented to visually display (output) information associated with the mobile terminal 300. For instance, if the mobile terminal is operating in a phone call mode, the display will generally provide a UI or GUI which includes information associated with placing, conducting, and terminating a phone call. As another example, if the mobile terminal 300 is in a video call mode or a photographing mode, the display 351 may additionally or alternatively display images which are associated with these modes, the UI or the GUI.

The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays.

Some of the displays can be implemented in a transparent or optical transmittive type, i.e., a transparent display. A representative example of the transparent display is the TOLED (Transparent OLED). A rear configuration of the display 351 can be implemented as the optical transmittive type as well. In this configuration, a user can see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this case, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

A proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

For example, the proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 may be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 can output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output by being synthesized together or can be output in sequence. The haptic module 354 can generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device. The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360. Moreover, data for various patterns of vibration and/or sound output in response to a touch input to the touch screen can be stored in the memory 360.

The memory 360 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 can operate in association with a web storage for performing a storage function of the memory 360 on the Internet.

The interface unit 370 may be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component. Moreover, the controller 380 can perform a pattern (or image) recognizing process for recognizing a writing input and a picture drawing input performed on the touch screen as characters or images, respectively.

The power supply unit 390 provides power required by various components of the mobile terminal 300. The power may be internal power, external power, or combinations of internal and external power.

Various embodiments described herein may be implemented in a computer-readable medium using, for example, computer software, hardware, or some combination of computer software and hardware.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 380.

Figure 4:
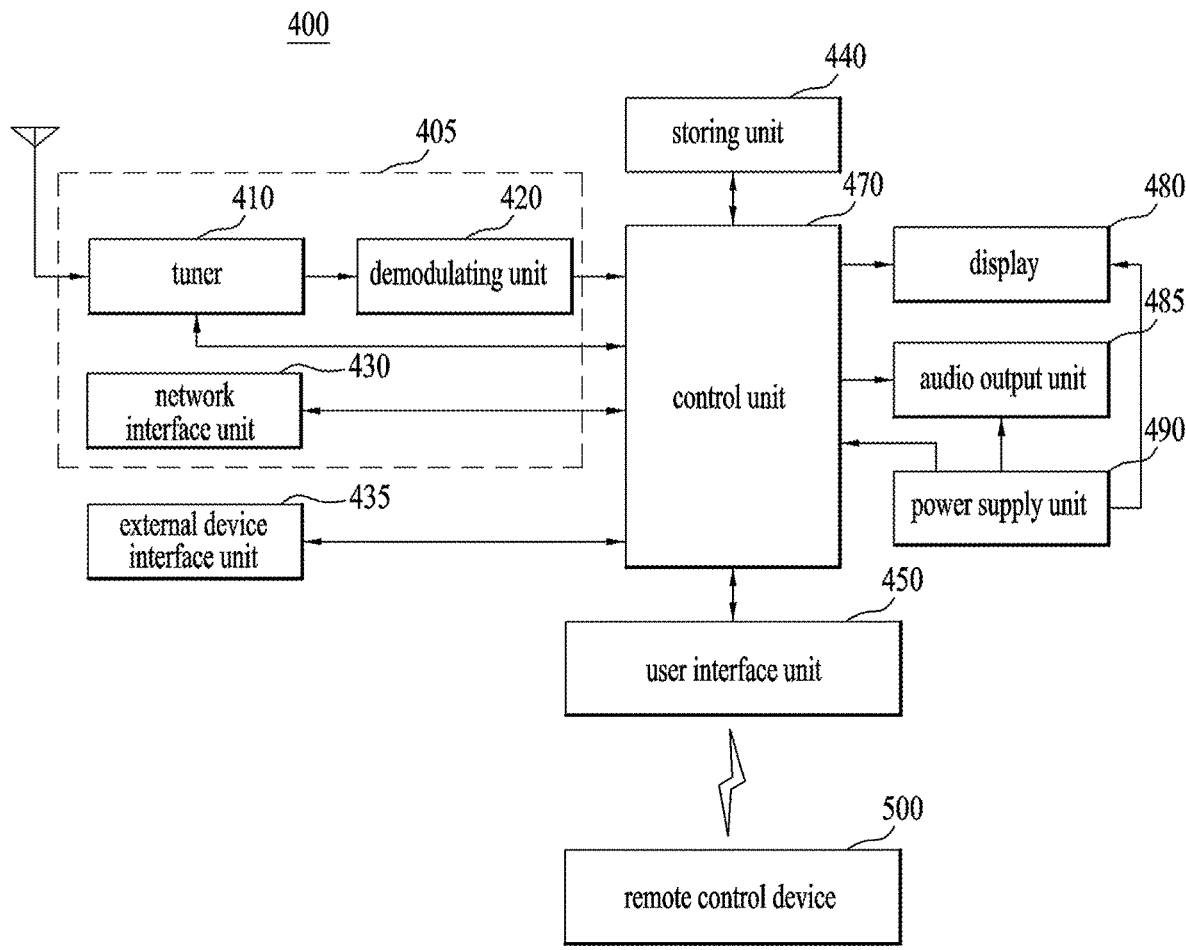
FIG. 4 is a block diagram illustrating the digital device according to the other embodiment of the present invention.

FIG. 4 is a block diagram illustrating the digital device according to the other embodiment of the present invention.

The digital device 400 according to another embodiment of the present invention can include a broadcast receiving unit 405, an external device interface 435, a storage unit 440, a user input interface 450, a controller 470, a display unit 480, an audio output unit 485, a power supply unit 490, and a photographing unit (not shown). Here, the broadcast receiving unit 305 can include at least one of tuner 410 and a demodulator 420, and a network interface 430. The broadcast receiving unit 405 can include the tuner 410 and the demodulator 420 without the network interface 430, or can include the network interface 430 without the tuner 410 and the demodulator 420. The broadcast receiving unit 405 can include a multiplexer (not shown) to multiplex a signal, which is demodulated by the demodulator 420 via the tuner 410, and a signal received through the network interface 40. In addition, the broadcast receiving unit 405 can include a demultiplexer (not shown) and demultiplex a multiplexed signal, a demodulated signal, or a signal received through the network interface 430.

The tuner 410 can receive a radio frequency (RF) broadcast signal, through an antenna, by tuning to a channel selected by the user or all previously stored channels. Also, the tuner 410 can convert the received RF broadcast signal into an IF (Intermediate Frequency) signal or a baseband signal.

For example, if the received RF broadcast signal is a digital broadcast signal, it is converted to a digital IF (DIF) signal, and if the received RF broadcast signal is an analog broadcast signal, it is converted to an analog baseband image or a voice signal (CVBS/SIF). That is, the tuner 410 can process both the digital broadcast signal and the analog broadcast signal. The analog baseband image or a voice signal (CVBS/SIF) output from the tuner 410 can be directly input to the controller 470.

The tuner 410 can receive a RF broadcast signal of single carrier or multiple carriers. The tuner 410 can sequentially tune and receive a RF broadcast signal of all broadcast channel stored by a channel memory function among RF broadcast signal received through an antenna to. And, the tuner 410 can covert the received RF broadcast signal into the DIF (Digital Intermediate Frequency or baseband frequency.)

The demodulator 420 receives the DIF signal, demodulates the received DIF signal, and performs a channel decoding, etc. For this, the demodulator 420 includes a trellis decoder, a de-interleaver, a Reed-Solomon decoder, etc., or includes a convolution decoder, the de-interleaver, the Reed-Solomon decoder, etc.

The demodulator 420 can outputs a transport stream (TS) after performing a demodulation and a channel decoding. At this time, the TS signal can be a signal by multiplexing a video signal, an audio signal or a data signal. As an example, the TS signal can be an MPEG-2 TS by multiplexing an MPEG-2 standard video signal, a Dolby (AC-3 standard) audio signal, etc.

A TS signal output from the demodulator 420 can be input to the controller 470. The controller 470 can control demultiplexing, processing audio/video signal, etc. Furthermore, the controller 470 can control outputting video through the display unit 480 and outputting audio through the audio output unit 485.

The external device interface 435 can provide an environment for interfacing external devices with the digital device 400. To implement this, the external device interface 435 can include an A/V input/output unit (not shown) or an RF communication unit (not shown).

The external device interface 435 can be connected with external devices such as a digital versatile disk (DVD), a Blu-ray player, a game device, a camera, a camcorder, a computer (notebook computer), a tablet PC, a smart phone, a Bluetooth device, a Cloud and the like in a wired/wireless manner. The external device interface 435 transfer a signal to the controller 470 of the digital device. The signal includes image data, video data, audio data which is input through an external device. The external device is connected to the digital device. The controller 470 can control to output the signal including the processed image data, the processed video data and the processed audio data to the connected external device. For this, the external device interface 435 can further include an A/V input/output unit (not shown) or a wireless communication unit (not shown).

The A/V input/output unit may include a USB terminal, a CVBS terminal, a component terminal, an S-video terminal (analog), a DVI terminal, a HDMI terminal, an RGB terminal, a D-SUB terminal, etc.

The RF communication unit can perform near field communication. The digital receiver 400 can be networked with other electronic apparatuses according to communication protocols such as Bluetooth, RFID, IrDA, UWB, ZigBee, and DLNA, for example.

Also, the external device interface 435 can connect a STB via at least one interface described above, and perform an input/output operation with the connected STB.

Meanwhile, the external device interface 435 can receive application or application list included in a nearby external device, and can transfer the application or the application list to the controller 470 or the storage unit 440.

The network interface 430 may provide an interface for connecting the digital receiver 400 to wired/wireless networks. For example, the network interface 430 includes an Ethernet port for connecting to a wire network and, WLAN (Wi-Fi), Wibro, Wimax, HSDPA, and the like for connecting to a wireless network.

Using the network interface 430, the digital receiver can transmit/receive data to/from other users or other electronic apparatuses or access a predetermined web page through a network connected thereto or another network linked to the connected network. Especially, the network interface 430 can transmit some part of content data stored in the digital device 400 to another user pre-registered in the digital device 400, a selected user of another digital device, or a selected digital device.

Meanwhile, the network interface 430 can connect a web page via a connected network or another network linked to the connected network. That is, the network interface 430 can transmit or receive data to/from a corresponding server by connecting the web page through the network. Additionally, the network interface 430 can receive content or data from a CP or an NP. In other words, the network interface 430 can receive the content and the content related to a movie, a commercial, a game, a VOD, a broadcast signal, and the like from the CP or the NP through the network. Also, the network interface 430 can receive update information of a firmware and an update file from the NP. And, the network interface 430 can transmit data to an internet provider, CP or NP.

Also, the network interface 430 can select a wanted application among open applications and the selected application via a network.

The storage unit 440 may store programs for signal processing and control and store a processed video, audio or data signal.

In addition, the storage unit 440 may execute a function of temporarily storing a video, audio or data signal input from the external device interface 435 or the network interface 430. The storage unit 440 may store information about a predetermined broadcast channel through a channel memory function.

The storage unit 440 can store an application or a list of applications input from the external device interface 435 or the network interface 430.

The storage unit 440 may store various platforms which will be described later.

The storage unit 440 can include storage media of one or more types, such as a flash memory type, a hard disk type, a multimedia card micro type, a card type memory (e.g. SD or XD memory), RAM, EEPROM, etc. The digital receiver 400 may reproduce content files (a video file, a still image file, a music file, a text file, an application file, etc.) and provide them to the user.

While FIG. 4 illustrates an embodiment in which the storage unit 440 is separated from the controller 470, the configuration of the digital receiver 400 is not limited thereto and the storage unit 440 may be included in the controller 470.

The user input interface 450 may transmit a signal input by the user to the controller 470 or deliver a signal output from the controller 470 to the user.

For example, the user input interface 450 can receive control signals such as a power on/off signal, a channel selection signal, an image setting signal, etc. from the remote controller 500 or transmit control signals of the controller 470 to the remote controller 500 according to various communication schemes such as RF communication, IR communication, and the like.

The user input interface 450 can transmit control signals input through a power key, a channel key, a volume key, and a local key (not shown) of a set value to the controller 470.

The user input interface 450 can transmit a control signal input from a sensing unit (not shown) which senses a gesture of the user or deliver a signal of the controller 470 to the sensing unit (not shown). Here, the sensing unit (not shown) may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 470 can generate and output a signal for video or audio output by demultiplexing streams input through the tuner 410, the demodulator 420 or the external device interface 435 or processing demultiplexed signals.

A video signal processed by the controller 470 can be input to the display unit 380 and displayed as an image through the display unit 480. In addition, the video signal processed by the controller 470 can be input to an external output device through the external device interface 435.

An audio signal processed by the controller 470 can be applied to the audio output unit 485. Otherwise, the audio signal processed by the controller 470 can be applied to an external output device through the external device interface 435.

The controller 470 may include a demultiplexer and an image processor, which are not shown in FIG. 4.

The controller 470 can control the overall operation of the digital receiver 300. For example, the controller 470 can control the tuner 410 to tune to an RF broadcast corresponding to a channel selected by the user or a previously stored channel.

The controller 470 can control the digital receiver 400 according to a user command input through the user input interface 450 or an internal program. Particularly, the controller 470 can control the digital receiver 400 to be linked to a network to download an application or application list that the user desires to the digital receiver 400.

For example, the controller 470 may control the tuner 410 to receive a signal of a channel selected in response to a predetermined channel selection command received through the user input interface 450. In addition, the controller 470 may process a video, audio or data signal corresponding to the selected channel. The controller 470 may control information on a channel selected by the user to be output with a processed video or audio signal through the display unit 480 or the audio output unit 485.

Alternatively, the controller 470 may control a video signal or an audio signal received from an external apparatus, for example, a camera or a camcorder through the external device interface 435 to be output through the display unit 480 or the audio output unit 485 according to an external device image reproduction command received through the user input interface 450.

The controller 470 can control the display unit 480 to display images. For example, the controller 470 can control a broadcast image input through the tuner 410, an external input image received through the external device interface 435, an image input through the network interface 430, or an image stored in the storage unit 440 to be displayed on the display unit 480. Here, an image displayed on the display unit 480 can be a still image or video, and it can be a 2D or 3D image.

The controller 470 can control reproduction of content. Here, the content may be content stored in the digital receiver 400, received broadcast content, or content input from an external device. The content may include at least one of a broadcast image, an external input image, an audio file, a still image, an image of a linked web, and a text file.

The controller 470 can control display of applications or an application list, downloadable from the digital receiver 400 or an external network, when an application view menu is selected.

The controller 470 can control installation and execution of applications downloaded from an external network in addition to various UIs. Furthermore, the controller 470 can control an image relating to an application executed by user selection to be displayed on the display unit 480.

The digital receiver 400 may further include a channel browsing processor (not shown) which generates a thumbnail image corresponding to a channel signal or an external input signal.

The channel browsing processor can receive a stream signal (e.g., TS) output from the demodulator 420 or a stream signal output from the external device interface 435 and extract an image from the received stream signal to generate a thumbnail image. The generated thumbnail image can be directly input to the controller 470 or can be encoded and then input to the controller 470. Also, the thumbnail image can be coded into a stream and then applied to the controller 470. The controller 470 can display a thumbnail list including a plurality of thumbnail images on the display unit 480 using thumbnail images input thereto. The thumbnail images included in the thumbnail list can be updated sequentially or simultaneously. Accordingly, the user can conveniently check content of a plurality of broadcast channels.

The display unit 480 may convert a video signal, a data signal, and an OSD signal processed by the controller 470 and a video signal and a data signal received from the external device interface 435 into RGB signals to generate driving signals.

The display unit 480 may be a PDP, an LCD, an OLED, a flexible display, a 3D display or the like.

The display unit 480 may be configured as a touch-screen and used as an input device rather than an output device.

The audio output unit 485 receives a signal audio-processed by the controller 470, for example, a stereo signal, a 3.1 channel signal or a 5.1 channel signal, and outputs the received signal as audio. The audio output unit 485 can be configured as one of various speakers.

The digital receiver 400 may further include the sensing unit (not shown) for sensing a gesture of the user, which includes at least one of a touch sensor, a voice sensor, a position sensor, and an action sensor, as described above. A signal sensed by the sensing unit (not shown) can be delivered to the controller 470 through the user input interface 450.

The digital receiver 400 may further include the photographing unit (not shown) for photographing the user. Image information acquired by the photographing unit (not shown) can be supplied to the controller 470.

The controller 470 may sense a gesture of the user from an image captured by the photographing unit (not shown) or a signal sensed by the sensing unit (not shown), or by combining the image and the signal.

The power supply unit 490 may supply power to the digital receiver 400.

Particularly, the power supply unit 490 can supply power to the controller 470 which can be implemented as a system-on-chip (SoC), the display unit 480 for displaying images, and the audio output unit 485 for audio output.

The power supply unit 490 can include a converter (not shown) converting a alternating source into a direct source. For example, when the display unit 480 is implemented as a liquid panel including a plurality of backlight lamps, the power supply unit 490 can include an inverter (not shown) which is capable of performing a Pulse Width Modulation (PWM) for changing or dimming a luminance.

The remote controller 500 may transmit user input to the user input interface 450.

To achieve this, the remote controller 500 can use Bluetooth, RF communication, IR communication, UWB, ZigBee, etc.

In addition, the remote controller 500 can receive audio, video or data signal output from the user input interface 350 and display the received signal or output the same as audio or vibration.

The above-mentioned digital device 400 can be a digital broadcast receiver which is capable of processing a digital broadcast signal of a fixed or mobile ATSC method, or a digital broadcast signal of a DVB method.

Some of the components shown in FIG. 2 may be omitted or a component (not shown in FIG. 2) may be added as required. The digital receiver according to the present invention may not include the tuner and the demodulator, differently from the digital receivers shown in FIGS. 2 and 4, and may receive content through the network interface or the external device interface and reproduce the content.

Figure 5:
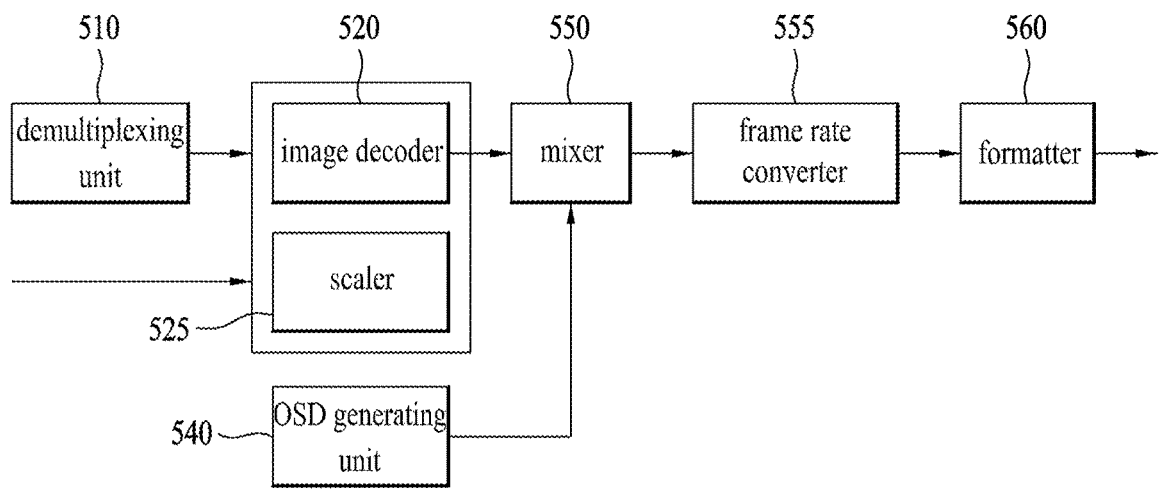
FIG. 5 is a block diagram illustrating the detailed configuration of each of controllers of FIGS. 2 to 4 according to one embodiment of the present invention.

FIG. 5 is a block diagram illustrating the detailed configuration of each of controllers of FIGS. 2 to 4 according to one embodiment of the present invention.

The digital receiver according to the present invention may include a demultiplexer 510, an image processor 520, an OSD generator 540, a mixer 550, a frame rate converter (FRC) 555, and a 3D formatter (or an Output formatter) 560.

The demultiplexer 510 can demultiplex an input stream signal into an MPEG-2 TS image, an audio signal and a data signal, for example.

The image processor 420 can process a demultiplexed image signal using a video decoder 525 and a scaler 535.

The video decoder 525 can decode the demultiplexed image signal and the scaler 535 can scale the resolution of the decoded image signal such that the image signal can be displayed.

The video decoder 525 can support various standards. For example, the video decoder 525 can perform a function as an MPEG-2 decoder when the video signal is coded in an MPEG-2 standard. The video decoder 525 can perform a function as a H.264 decoder when the video signal is coded in a digital multimedia broadcasting (DMB) method or the H.264 standard method.

The image signal decoded by the image processor 520 may be input to the mixer 550.

The OSD generator 540 may generate OSD data automatically or according to user input. For example, the OSD generator 540 may generate data to be displayed on the screen of an output unit in the form of an image or text on the basis of a control signal of a user input interface. OSD data generated by the OSD generator 540 may include various data such as a UI image of the digital receiver, various menu screens, widget, icons, and information on ratings. The OSD generator 540 can generate a caption of a broadcast image or data for displaying EPG based broadcast information.

The mixer 550 may mix the OSD data generated by the OSD generator 540 and the image signal processed by the image processor 520. The mixer 550 may provide the mixed signal to the 3D formatter 560. By mixing the decoded image signal and the OSD data, OSD may be overlaid on a broadcast image or external input image.

The frame rate converter (FRC) 555 may convert a frame rate of input video. For example, the frame rate converter 555 can convert the frame rate of an input 60 Hz video to a frame rate of 120 Hz or 240 Hz, according to an output frequency of the output unit. The frame rate converter 555 may be bypassed when frame conversion is not executed.

The 3D formatter 560 may change the output of the frame rate converter 555, which is input thereto, into a form suitable for the output format of the output unit. For example, the 3D formatter 560 can output an RGB data signal. In this case, this RGB data signal can be output according to low voltage differential signaling (LVDS) or mini-LVDS. When a 3D image signal output from the frame rate converter 555 is input to the 3D formatter 560, the 3D formatter 560 can format the 3D image signal such that the 3D image signal is matched to the output format of the output unit, to thereby support a 3D service.

An audio processor (not shown) may audio-process a demultiplexed audio signal. The audio processor (not shown) can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor (not shown) can include decoders corresponding to the formats to process the audio signals.

Furthermore, the audio processor (not shown) can control base, treble and volume.

In addition, a data processor (not shown) can process a demultiplexed data signal. For example, when a demultiplexed data signal is encoded, the data processor (not shown) can decode the encoded demultiplexed data signal. Here, the encoded data signal may be EPG information including broadcast information such as the start time and end time (or duration) of a broadcast program which is broadcast through each channel.

Meanwhile, the above-mentioned digital device, as an embodiment according to the present invention, each component can be integrated, added or omitted according to a capability of the digital device which is actually implemented. That is, if necessary, at least two components are united into a single component or a single component is divided into at least two components. Also, a function performed by each block explains an embodiment of the present invention, the specific operation or device is not limited to a scope of the present invention.

Meanwhile, the digital device can be an image signal processing device for performing a signal of an input image or an image stored in the device. Other example of the image signal device can be a STB which does not include the display unit 480 and the audio output unit 485 shown in FIG. 4, a DVD player, a Blu-ray player, a game device, a computer, etc.

Figure 6:
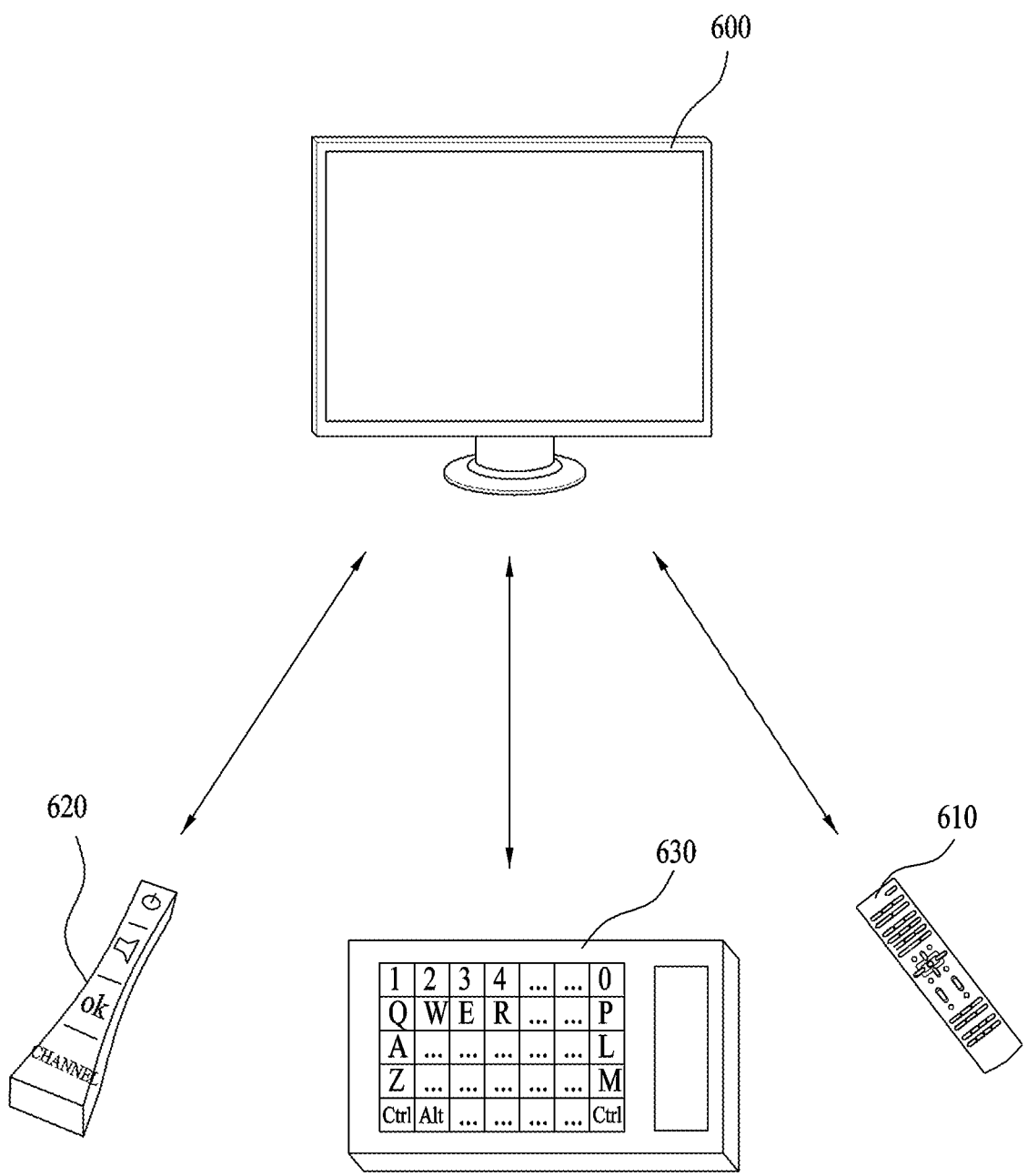
FIG. 6 is a diagram illustrating an input unit connected to each of the digital devices of FIGS. 2 to 4 according to one embodiment of the present invention.

FIG. 6 is a diagram illustrating an input unit connected to each of the digital devices of FIGS. 2 to 4 according to one embodiment of the present invention.

To execute various operations for implementing the present invention according to embodiments, various user interface devices (UIDs) which can communicate with a digital receiver 600 in a wired/wireless manner can be used as remote controllers.

UIDs can include a mobile device (e.g., a smart phone, a tablet PC, and the like), a magic remote controller 620 and a remote controller 630 equipped with a keyboard and a touch pad in addition to a general remote controller 610.

The remote controllers can use various communication protocols such as Bluetooth, RFID, IrDA, UWB, ZigBee, DLNA, etc.

The magic remote controller 620 may include a gyro sensor mounted therein to sense vibration of a user's hand or rotation. That is, the magic remote controller 620 can move a pointer according to up, down, left and right motions of the user such that the user can easily execute a desired action, for example, easily control a channel or a menu.

The remote controller 630 including the keyboard and touch pad can facilitate text input through the keyboard and control of movement of a pointer and magnification and reduction of a picture or video through the touch pad.

The keyboard 630 have been implemented so that it is similar to a keyboard of a PC in order to conveniently input text because the traditional remote control 610 is not sufficient enough to control the digital device 600 since the digital device 600 offers more than just providing broadcast programs as it did before, but has advanced into a intelligent integrated digital device providing web browser, application, SNS and the like.

Meanwhile, the control means such as the remote control 610, the pointing device 620, and the keyboard 630 can, if necessary, include a touchpad to control functions of text input, move the pointer, enlarging/reducing pictures and video clips more conveniently.

The digital device described in the present specification uses Web OS as a platform. Hereinafter, a Web OS based process or algorithm may be performed by the controller of the above-described digital device. The controller includes the controllers of FIGS. 2 to 5 and has wide concepts. Accordingly, hereinafter, a component for processing Web OS based services, applications, content, etc., including software, firmware or hardware in a digital device is referred to a controller.

Such a Web OS based platform may improve development independency and functional extensibility by integrating services, applications, etc. based on a Luna-service bus, for example, and increase application development productivity based on web application framework. In addition, system resources, etc. may be efficiently used via a Web OS process and resource management to support multitasking.

A Web OS platform described in the present specification may be available not only for stationary devices such as PCs, TVs and STBs but also for mobile devices such as cellular phones, smartphones tablet PCs, laptops, and wearable devices.

A software structure for a digital device is a monolithic structure which solves conventional problems depending on markets, is a single process and closed product based on multi-threading, and has difficulties in terms of external applications. In pursuit of new platform based development, cost innovation via chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Figure 7:
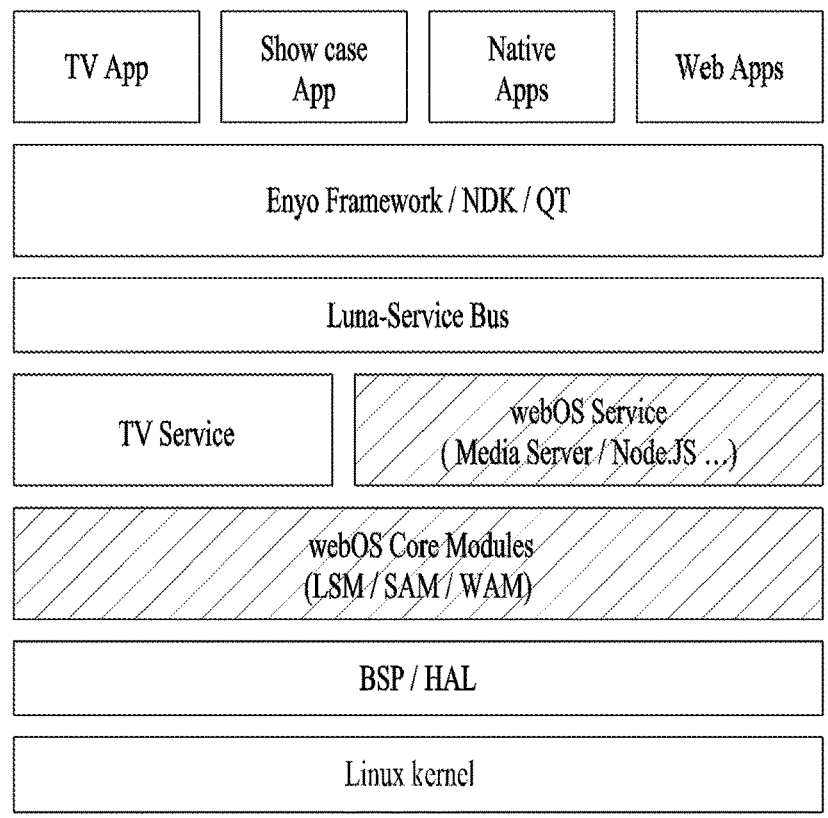
FIG. 7 is a diagram illustrating Web OS architecture according to one embodiment of the present invention.

FIG. 7 is a diagram illustrating Web OS architecture according to one embodiment of the present invention.

The architecture of a Web OS platform will now be described with reference to FIG. 7.

The platform may be largely divided into a kernel, a system library based Web OS core platform, an application, a service, etc.

The architecture of the Web OS platform has a layered structure. OSs are provided at a lowest layer, system library(s) are provided at a next highest layer and applications are provided at the highest layer.

First, the lowest layer is an OS layer including a Linux kernel such that Linux is included as an OS of the digital device.

At layers higher than the OS layer, a board support package (BSP)/hardware abstraction layer (HAL) layer, a Web OS core modules layer, a service layer, a Luna-service bus layer and an Enyo framework/native developer's kit (NDK)/QT layer are sequentially provided. At the highest layer, an application layer is provided.

Some layers of the above-described Web OS layered structure may be omitted and a plurality of layers may be combined to one layer and one layer may be divided into a plurality of layers.

The Web OS core module layer may include a Luna surface manager (LSM) for managing a surface window, etc., a system & application manager (SAM) for managing execution and performance status of applications, etc., and a web application manager (WAM) for managing web applications based on WebKit.

The LSM manages an application window displayed on a screen. The LSM may control display hardware (HW) and provide a buffer for rendering content necessary for applications, and compose and output results of rendering a plurality of applications on a screen.

The SAM manages policy according to several conditions of systems and applications.

The WAM is based on Enyo framework, because a Web OS regards a web application as a basic application.

An application may use a service via a Luna-service bus. A service may be newly registered via a bus and the application may detect and use a desired service.

The service layer may include services having various service levels, such as a TV service, a Web OS service, etc. The Web OS service may include a media server, Node.JS, etc. and, in particular, the Node.JS service supports JavaScript, for example.

The Web OS service may be communicated to a Linux process implementing function logic via a bus. This Web OS service is largely divided into four parts, migrates from a TV process and an existing TV to a Web OS, is developed as services which differ between manufacturers, Web OS common services and JavaScripts, and is composed of the Node.js service used via Node js.

The application layer may include all applications supportable by a digital device, such as a TV application, a showcase application, a native application, a web application, etc.

Applications on the Web OS may be divided into a web application, a palm development kit (PDK) application, a Qt Meta Language or Qt Modeling Language (QML) application, etc. according to implementation methods.

The web application is based on a WebKit engine and is performed on WAM runtime. Such a web application is based on Enyo framework or may be developed and performed based on general HTML5, cascading style sheets (CSS) and JavaScripts.

The PDK application includes a native application developed with C/C++ based on a PDK provided for a third party or an external developer. The PDK refers to a set of development libraries and tools provided to enable a third party to develop a native application (C/C++) such as games. For example, the PDK application may be used to develop applications requiring high performance.

The QML application is a Qt based native application and includes basic applications provided along with the Web OS platform, such as card view, home dashboard, virtual keyboard, etc. QML is a markup language of a script format, not C++.

The native application is an application which is developed and compiled using C/C++ and is executed in the binary form and has an advantage such as high execution speed.

Figure 8:
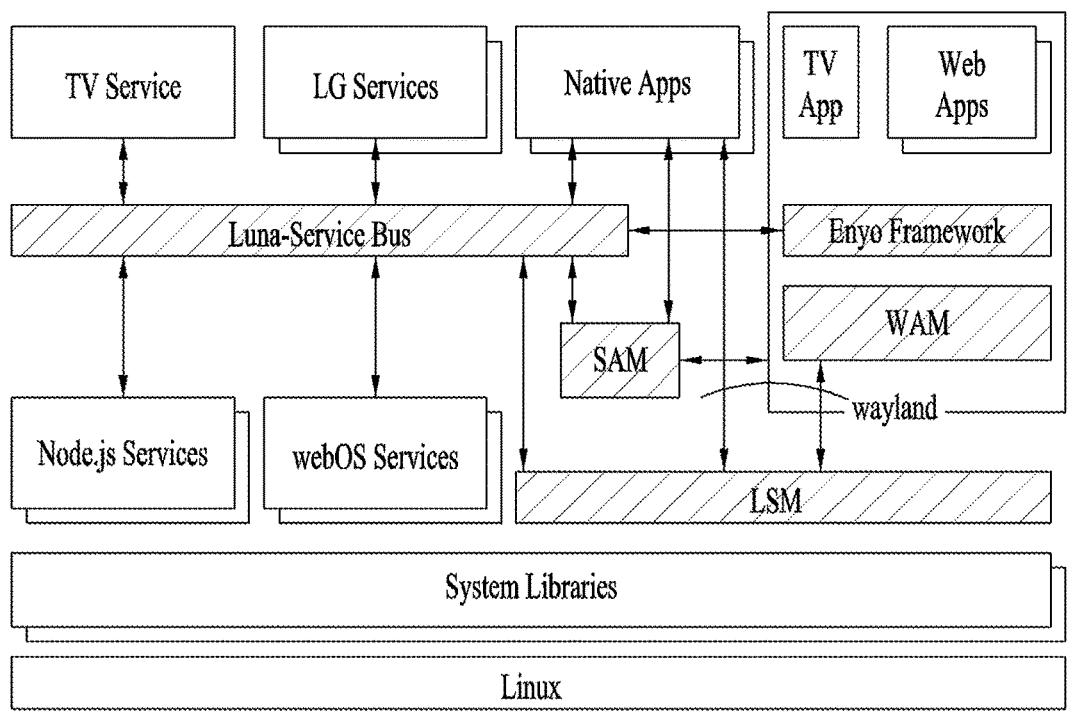
FIG. 8 is a diagram illustrating architecture of a Web OS device according to one embodiment of the present invention.

FIG. 8 is a diagram illustrating the architecture of a Web OS device according to one embodiment of the present invention.

FIG. 8 is a block diagram based on a runtime of a Web OS device and is described with reference to the layered structure of FIG. 7.

Hereinafter, a description will be given with reference to FIGS. 7 and 8.

Referring to FIG. 8, services, applications and Web OS core modules are included on a system OS (Linux) and system libraries and communication therebetween may be performed via a Luna-service bus.

Node.js services based on HTML5 such as e-mail, contact or calendar, CSS, JavaScript, etc., Web OS services such as logging, backup, file notify, database (DB), activity manager, system policy, audio daemon (AudioD), update, media server, etc., TV services such as electronic program guide (EPG), personal video recorder (PVR), data broadcasting, etc., CP services such as voice recognition, now on, notification, search, auto content recognition (ACR), contents list browser (CBOX), wfdd, DMR, remote application, download, Sony Philips digital interface format (SDPIF), etc., native applications such as PDK applications, browsers, QML applications, a UI-related TV applications based on Enyo framework and web applications are processed via Web OS core modules such as the above-described SAM, WAM and LSM via the Luna-service bus. The TV applications and the web applications are not necessarily based on Enyo framework or related to UI.

The CBOX may manage metadata and lists of content of external devices such as USB drivers, DLNA devices or Cloud servers connected to a TV. The CBOX may output content listing of various content containers such as USB, DMS, DVR, Cloud server, etc. as an integrated view. The CBOX may display various types of content listings such as pictures, music or video and manage metadata thereof. The CBOX may output content of an attached storage in real time. For example, if a storage device such as a USB is plugged in, the CBOX should immediately output a content list of the storage device. At this time, a standardized method for processing the content listing may be defined. The CBOX may accommodate various connection protocols.

The SAM is used to improve module complexity and extensibility. For example, an existing system manager processes several functions such as system UI, window management, web application runtime and UX constraint processing via one process and thus has high implementation complexity. In order to solve such a problem, the SAM divides main functions and clarifies an interface between functions, thereby decreasing implementation complexity.

The LSM is supported to independently develop and integrate a system UX such as card view, launcher, etc. and to easily cope with change in product requirements. The LSM maximally uses hardware resources to enable multitasking if a plurality of application screens is composed using an app-on-app method and may provide a window management mechanism for 21:9 and a multi-window.

The LSM supports implementation of a system UI based on a QML and improves development productivity. QML UX may easily configure a view using a screen layout and UI components based on MVC and easily develop code for processing user input. An interface between the QML and the Web OS component is achieved via a QML extensibility plug-in and graphic operation of an application may be based on Wayland protocol, luna-service call, etc.

The LSM is an abbreviation for a Luna surface manager and functions as an application window compositor.

The LSM composes and outputs independently developed applications, UI components, etc. on a screen. When components such as recent applications, showcase applications or launcher applications render respective content, the LSM defines an output area, a linkage method, etc. as a compositor. The LSM functioning as a compositor performs processing such as graphic composition, focus management, input events, etc. At this time, the LSM receives event, focus, etc. from an input manager, and a remote controller, a HID such as a mouse and keyboard, a joystick, a game pad, a remote application, a pen touch, etc. may be included as an input manager.

The LSM supports multiple window models and may be simultaneously executed in all applications as a system UI. The LSM may support launcher, recents, setting, notification, system keyboard, volume UI, search, finger gesture, voice recognition (speech to text (STT), text to speech (TTS), natural language processing (NLP), etc.), pattern gesture (camera or mobile radio control unit (MRCU)), live menu, auto content recognition (ACR), etc.

Figure 9:
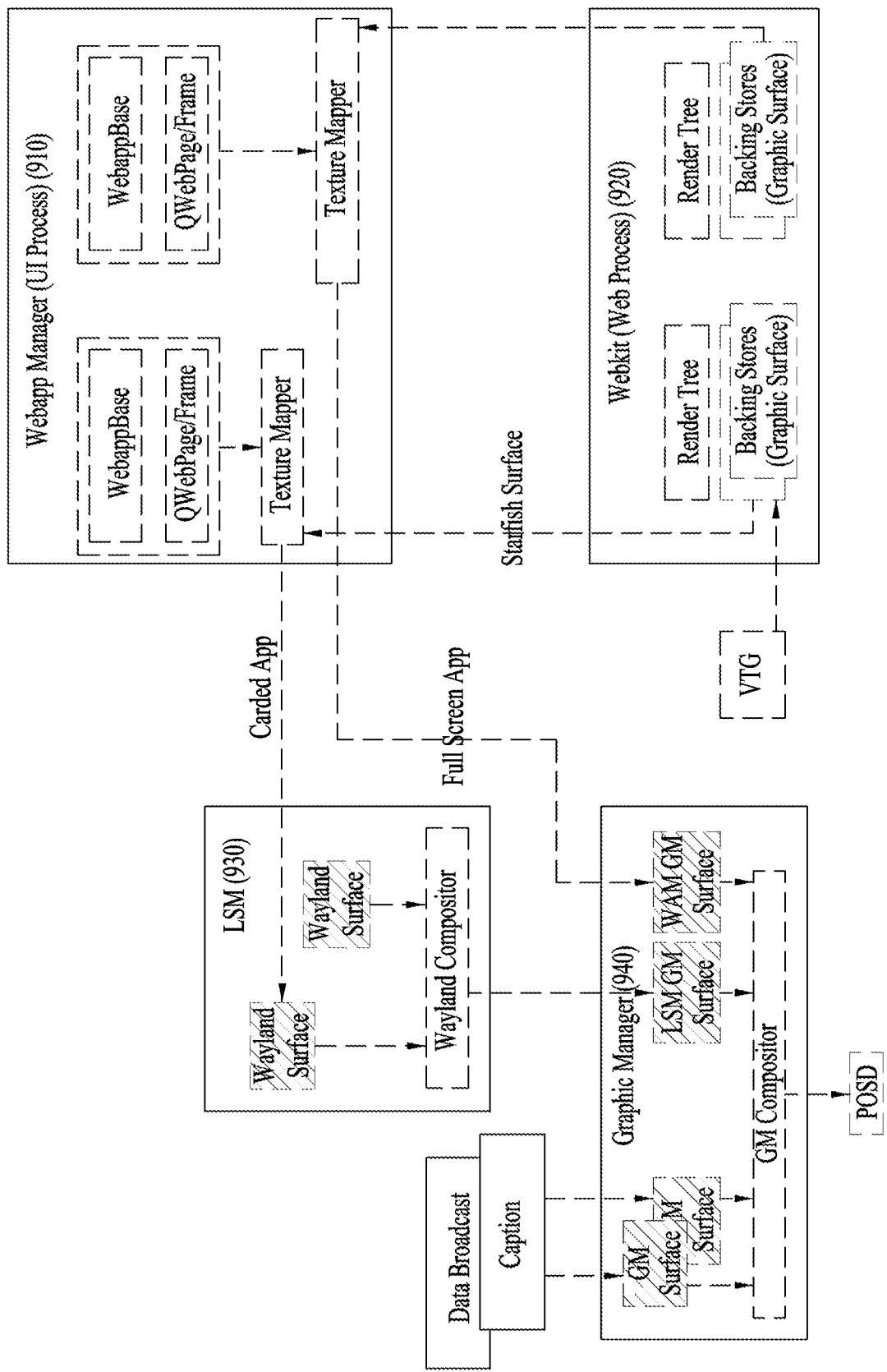
FIG. 9 is a diagram illustrating a graphic composition flow in a Web OS device according to one embodiment of the present invention.

FIG. 9 is a diagram illustrating a graphic composition flow in a Web OS device according to one embodiment of the present invention.

Referring to FIG. 9, graphic composition processing may be performed via a web application manager 910 functioning as a UI process, a WebKit 920 functioning as a web process, an LSM 930 and a graphics manager (GM) 940.

When the web application manager 910 generates web application based graphics data (or application) as a UI process, the generated graphics data is delivered to the LSM if the graphics data is not a fullscreen application. The web application manager 910 receives an application generated by the WebKit 920 in order to share a graphic processing unit (GPU) memory for graphic management between the UI process and the web process and delivers the application to the LSM 930 if the application is not a fullscreen application. If the application is a fullscreen application, the LSM 930 may bypass the application. In this case, the application is directly delivered to the graphics manager 940.

The LSM 930 transmits the received UI application to a Wayland compositor via a Wayland surface and the Wayland compositor appropriately processes the UI application and delivers the processed UI application to the graphics manager. The graphics data received from the LSM 930 is delivered to the graphics manager compositor via the LSM GM surface of the graphics manager 940, for example.

The fullscreen application is directly delivered to the graphics manager 940 without passing through the LSM 930 as described above and is processed in the graphics manager compositor via the WAM GM surface.

The graphics manager processes and outputs all graphics data in the Web OS device and receives and outputs data passing through the above-described LSM GM surface, data passing through a WAM GM surface, and graphics data passing through a GM surface, such as a data broadcasting application or a caption application, on a screen. The function of the GM compositor is equal or similar to the above-described compositor.

Figure 10:
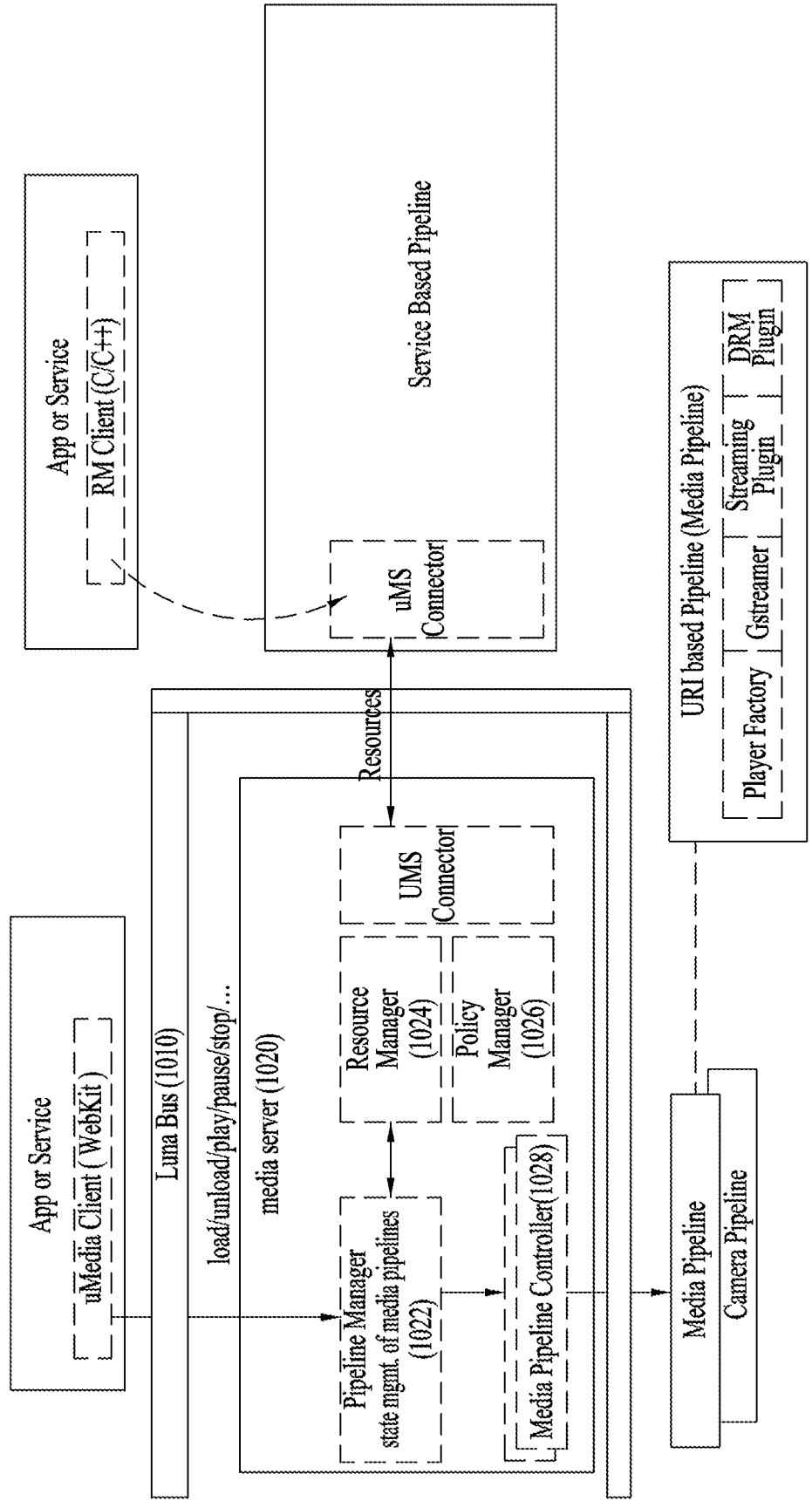
FIG. 10 is a diagram illustrating a media server according to one embodiment of the present invention.
Figure 11:
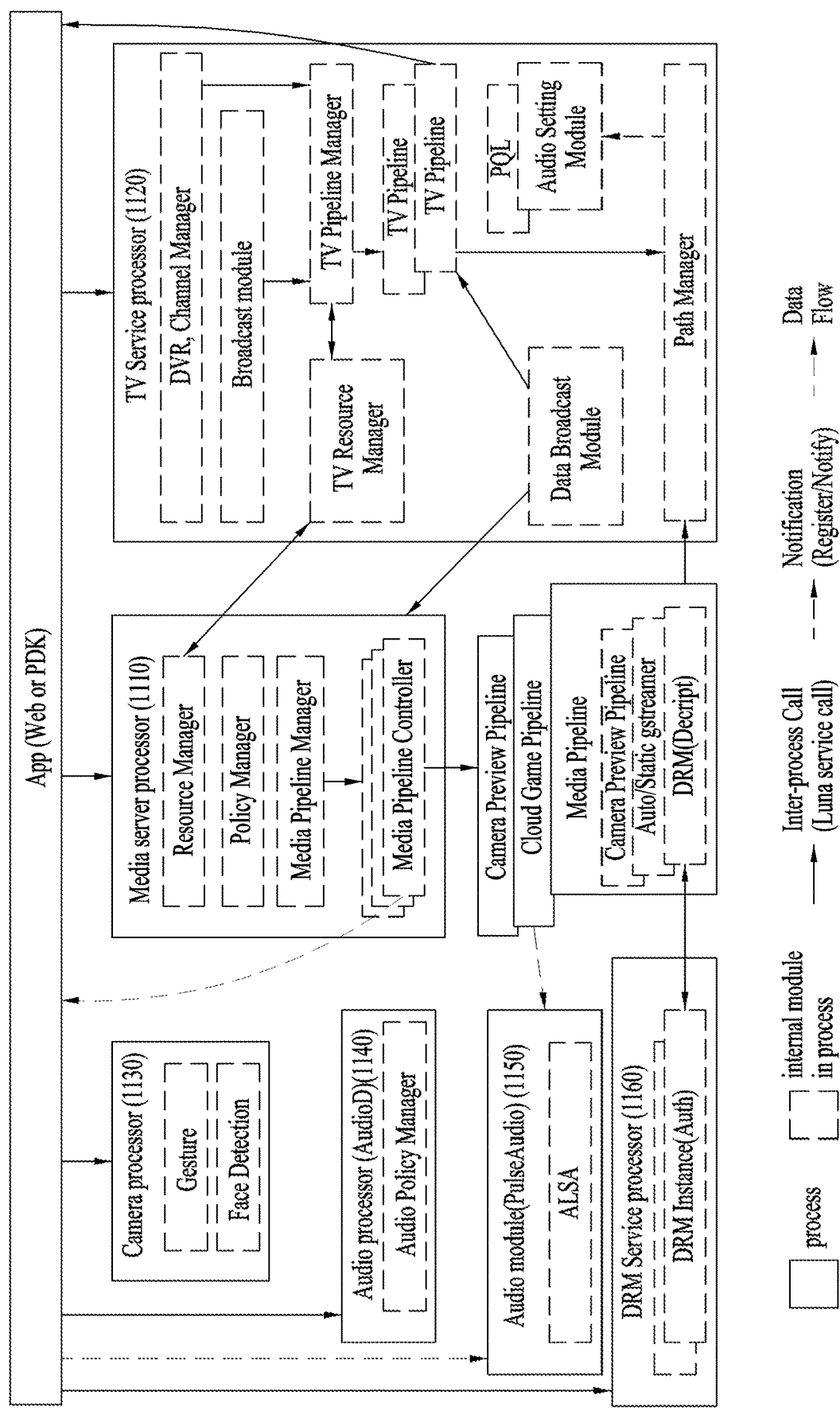
FIG. 11 is a block diagram illustrating a media server according to one embodiment of the present invention.
Figure 12:
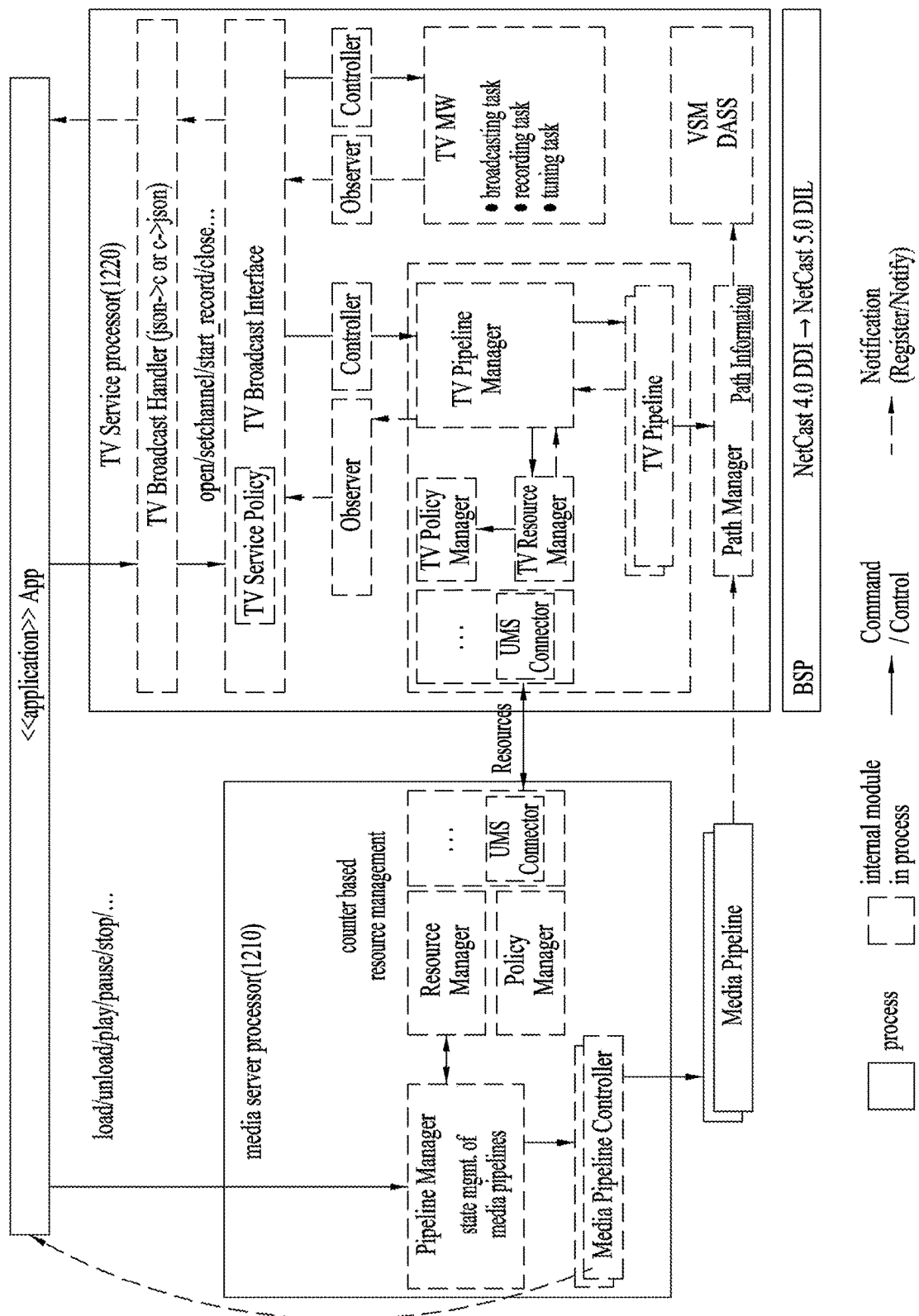
FIG. 12 is a diagram illustrating a relationship between a media server and a TV service according to one embodiment of the present invention.

FIG. 10 is a diagram illustrating a media server according to one embodiment of the present invention, FIG. 11 is a block diagram illustrating a media server according to one embodiment of the present invention, and FIG. 12 is a diagram illustrating a relationship between a media server and a TV service according to one embodiment of the present invention.

The media server supports execution of a variety of multimedia in a digital device and manages necessary resources. The media server may efficiently use hardware resources necessary for media play. For example, the media server requires audio/video hardware resources for multimedia execution and efficiently manages a resource use status to efficiently use resources. In general, a stationary device having a screen larger than that of a mobile device requires more hardware resources upon multimedia execution and requires high encoding/decoding rate and graphics data transfer rate due to a large amount of data. The media server should perform not only streaming or file playback but also broadcasting, recording and tuning tasks, a task for simultaneously viewing and recording, and a task for simultaneous displaying a sender and a recipient on a screen upon video call. It is difficult for the media server to simultaneously perform several tasks due to restriction in hardware resources such as an encoder, a decoder, a tuner, a display engine, etc. in chipset units. For example, the media server restricts a use scenario or performs processing using user input.

The media server may make system stability robust, and may remove a playback pipeline, in which errors occur during media playback, per pipeline, such that other media play is not influenced even when errors occur. Such a pipeline is a chain for connecting unit functions such as decoding, analysis, output, etc. upon a media playback request, and required unit functions may be changed according to media type, etc.

The media server may have extensibility and may add a new type of pipeline without influencing an existing implementation method. For example, the media server may accommodate a camera pipeline, a video conference (Skype) pipeline, a third-party pipeline, etc.

The media server may process general media playback and TV task execution as separate services because the interface of the TV service is different from that of media playback. The media server supports operation such as "set channel", "channel up", "channel down", "channel tuning" and "record start" in relation to the TV service and support operation such as "play", "pause" and "stop" in relation to general media playback, that is, supports different operations with respect to the TV service and general media playback and processes the TV service and media playback as separate services.

The media server may control or manage a resource management function. Hardware resource assignment or recovery in a device is conducted by the media server. In particular, the TV service process delivers a task which is being executed and a resource assignment status to the media server. The media server secures resources to execute a pipeline whenever media is executed, allows media execution due to priority (e.g., policy) upon media execution request, and performs resource recovery of another pipeline, based on a resource status of each pipeline. The predefined execution priority and resource information necessary for a specific request are managed by a policy manager and the resource manager communicates with the policy manager to process resource assignment and recovery.

The media server may have identifiers (IDs) for all operations related to playback. For example, the media server may send a command to a specific pipeline based on the ID. The media server may send respective commands to pipelines for playback of two or more media.

The media server is responsible for playing back a HTML5 standard media.

The media server performs a service process of a TV pipeline according to a TV restructuralization range. The media server may be designed and implemented regardless of the TV restructuralization range. If the separate service process of the TV is not performed, the TV may be wholly re-executed when errors occurs in a specific task.

The media server is also referred to as uMS, that is, a micro media server. The media player is a media client and means WebKit for HTML5 video tag, camera, TV, Skype or second screen, for example.

The media server mainly manages micro resources such as a resource manager or a policy manager. The media server also controls playback of web standard media content. The media server may manage pipeline controller resources.

The media server supports extensibility, reliability, efficient resource usage, etc., for example.

In other words, the uMS, that is, the micro media server, manages and controls resource usage for appropriate processing within the Web OS device, such as resources such as cloud game, MVPD (pay service, etc.), camera preview, second screen or Skype, and TV resources. A pipeline is used upon usage of each resource, for example, and the media server may manage and control generation, deletion, use of a pipeline for resource management.

The pipeline may be generated when a media related to a task starts a sequence of request, decoding streaming and parsing such as video output. For example, in association with a TV service and an application, watching, recording, channel tuning, etc. are controlled and performed via pipelines individually generated according to requests thereof with respect to resource usage.

Referring to FIG. 10, a processing structure of a media server will be described in detail.

In FIG. 10, an application or service is connected to a media server 1020 via a Luna-service bus 1010 and the media server 1020 is connected to and managed by pipelines generated via the Luna-service bus 1010.

The application or service includes various clients according to properties thereof and may exchange data with the media server 1020 or the pipeline via the clients.

The clients include a uMedia client (WebKit) for connection with the media server 1020 and a resource manager (RM) client (C/C++), for example.

The application including the uMedia client is connected to the media server 1020 as described above. More specifically, the uMedia client corresponds to the below-described video object, for example, and uses the media server 1020, for video operation by a request, etc.

The video operation relates to a video status and may include all status data related to the video operation, such as loading, unloading, play (playback or reproduction), pause, stop, etc. Such video operations or statuses may be processed by generating individual pipelines. Accordingly, the uMedia client transmits status data related to the video operation to the pipeline manager 1022 in the media server.

The media server 1022 acquires information about resources of the current device via data communication with the resource manager 1024 and requests assignment of resources corresponding to the status data of the uMedia client. At this time, the pipeline manager 1022 or the resource manager 1024 controls resource assignment via data communication with the policy manager 1026 if necessary. For example, if resources to be assigned according to the request of the pipeline manager 1022 are not present or are lacking in the resource manager 1024, resource assignment may be appropriately performed according to priority comparison of the policy manager 1026.

The pipeline manager 1022 requests to generate a pipeline for operation according to the request of the uMedia client from the media pipeline controller 102, with respect to resources assigned according to resource assignment of the resource manager 1024.

The media pipeline controller 1028 generates a necessary pipeline under control of the pipeline manager 1022. As shown, a media pipeline, a camera pipeline, a pipeline related to playback, pause or stop may be generated. The pipeline includes pipelines for HTML5, web CP, Smarthshare playback, thumbnail extraction, NDK, cinema, multimedia and hypermedia information coding experts group (MHEG), etc.

The pipeline may include a service-based pipeline and a URI based pipeline (media pipeline), for example.

Referring to FIG. 10, the application or service including the RM client may not be directly connected to the media server 1020, because the application or service can directly process a media. In other words, if the application or service directly processes a media, the media server may not be used. At this time, for pipeline generation and usage, resource management is necessary and, at this time, a uMS connector is used. When a resource management request for direct media processing of the application or service is received, the uMS connector communicates with the media server 1020 including the resource manager 1024. The media server 1020 also includes a uMS connector.

Accordingly, the application or service may cope with the request of the RM client via resource management of the resource manager 1024 via the uMS connector. The RM client may process services such as native CP, TV service, second screen, flash player, You Tube media source extensions (MSE), cloud game, Skype, etc. In this case, as described above, the resource manager 1024 may manage resources via appropriate data communication with the policy manager 1026 if necessary for resource management.

The URI based pipeline does not directly process the media unlike the above-RM client but processes the media via the media server 1020. The URI based pipeline may include player factory, Gstreamer, streaming plug-in, digital rights management (DRM) plug-in pipelines.

An interface method between the application and the media services is as follows.

An interface method using a service in a web application may be used. In this method, a Luna call method using a palm service bridge (PSB) and a method of using Cordova may be used, in which a display is extended to a video tag. In addition, a method of using HTML5 standard related to a video tag or media element may be used.

A method of using a service in PDK may be used.

Alternatively, a method of using in existing CP may be used. For backward compatibility, plug-in of an existing platform may be extended and used based on Luna.

Lastly, an interface method using a non-Web OS may be used. In this case, a Luna bus may be directly called to perform interfacing.

Seamless change is processed by a separate module (e.g., TVWIN) and refers to a process of first displaying a TV program on a screen without a Web OS before or duration Web OS booting and then performing seamless processing. This is used for the purpose of first providing a basic function of a TV service, for fast response to a power-on request of a user, because a booting time of a Web OS is late. The module is a part of a TV service process and supports seamless change for providing fast booting and a basic TV function, factory mode, etc. The module is responsible for switching from the non-Web OS mode to the Web OS mode.

FIG. 11 shows the processing structure of the media server.

In FIG. 11, a solid box denotes a process component and a dotted box denotes an internal processing module of the process. A solid arrow denotes an inter-process call, that is, a Luna-service call and a dotted arrow denotes notification such as register/notify or data flow.

The service, the web application or the PDK application (hereinafter, referred to as "application") is connected to various service processing components via a Luna-service bus and is operated or controlled via the service processing components.

A data processing path is changed according to application type. For example, if the application includes image data related to a camera sensor, the image data is transmitted to and processed by a camera processor 1130. At this time, the camera processor 1130 includes a gesture or face detection module and processes image data of the received application. The camera processor 1130 may generate a pipeline via a media server processor 1110 with respect to data which requires use of a pipeline according to user selection or automatically and process the data.

Alternatively, if the application includes audio data, the audio may be processed via an audio processor (AudioD) 1140 and an audio module (PulseAudio) 1150. For example, the audio processor 1140 processes the audio data received from the application and transmits the processed audio data to the audio module 1150. At this time, the audio processor 1140 may include an audio policy manager to determine processing of the audio data. The processed audio data is processed by the audio module 1160. The application or a pipeline related thereto may notify the audio module 1160 of data related to audio data processing. The audio module 1150 includes advanced Linux sound architecture (ALSA).

Alternatively, if the application includes or processes (hereinafter, referred to as "includes") content subjected to DRM, the content data is transmitted to a DRM service processor 1160 and the DRM service processor 1170 generates a DRM instance and processes the content data subjected to DRM. The DRM service processor 1160 is connected to a DRM pipeline in a media pipeline via a Luna-service bus, for processing of the content data subjected to DRM.

Hereinafter, processing of an application including media data or TV service data (e.g., broadcast data) will be described.

FIG. 12 shows the media server processor and the TV service processor of FIG. 11 in detail.

Accordingly, a description will be given with reference to FIGS. 11 and 12.

First, if the application includes TV service data, the application is processed by the TV service processor 1120/1220.

The TV service processor 1120 includes at least one of a DVR/channel manager, a broadcast module, a TV pipeline manager, a TV resource manager, a data broadcast module, an audio setting module, a path manager, etc., for example. In FIG. 12, the TV service processor 1220 may include a TV broadcast handler, a TV broadcast interface, a service processor, TV middleware (MW), a path manager and a BSP (NetCast). The service processor may mean a module including a TV pipeline manager, a TV resource manager, a TV policy manager, a USM connector, etc., for example.

In the present specification, the TV service processor may have the configuration of FIG. 11 or FIG. 12 or a combination thereof. Some components may be omitted or other components (not shown) may be added.

The TV service processor 1120/1220 transmits DVR or channel related data to a DVR/channel manager and transmits the DVR or channel related data to the TV pipeline manager to generate and process a TV pipeline, based on attribute or type of the TV service data received from the application. If the attribute or type of the TV service data is broadcast content data, the TV service processor 1120 generates and processes a TV pipeline via the TV pipeline manager, for processing of the data via a broadcast module.

Alternatively, a JavaScript standard object notation (json) file or a file written in c is processed by the TV broadcast handler and transmitted to the TV pipeline manager via a TV broadcast interface to generate and process a TV pipeline. In this case, the TV broadcast interface may transmit the data or file passing through the TV broadcast handler to the TV pipeline manager based on TV service policy and refer to the data or file upon generating a pipeline.

The TV pipeline manager generates one or more pipelines according to a request for generation of a TV pipeline from the processing module or manager of the TV service processor, under control of the TV resource manager. The TV resource manager may be controlled by the TV policy manager, in order to request a resource assignment status for a TV service according to a request for generation of a TV pipeline of the TV pipeline manager, and may perform data communication with the media server processor 1110/1210 via a uMS connector. The resource manager in the media server processor 1110/1210 sends the resource assignment status for the TV service according to the request of the TV resource manager. For example, if the resource manager in the media server processor 1110/1210 determines that the resources for the TV service are already assigned, the TV resource manager may be notified that assignment of all resources is completed. At this time, the resource manager in the media server processor may remove a predetermined TV pipeline according to a predetermined criterion or priority of TV pipelines already assigned for the TV service along with notification and request generation of a TV pipeline for the requested TV service. Alternatively, the TV resource manager may appropriately remove a TV pipeline or may add or newly establish a TV pipeline according to a status report of the resource manager in the media server processor 1110/1210.

The BSP supports backward compatibility with an existing digital device.

The generated TV pipelines may appropriately operate under control of the path manager in the processing procedure. The path manager may determine or control the processing path or procedure of the pipelines in consideration of the TV pipeline in the processing procedure and the operation of the pipelines generated by the media server processor 1110/1210.

Next, if the application includes media data, not TV service data, the application is processed by the media server processor 1110/1210. The media server processor 1110/1210 includes a resource manager, a policy manager, a media pipeline manager, a media pipeline controller, etc. As pipelines generated under control of the media pipeline manager and the media pipeline controller, a camera preview pipeline, a cloud game pipeline, a media pipeline, etc. may be generated. The media pipeline may include streaming protocol, auto/static gstreamer, DRM, etc. and the processing flow thereof may be determined under control of the path manager. For a detailed description of the processing procedure of the media server processor 1110/1210, refer to the description of FIG. 10 and a repeated description will be omitted.

In the present specification, the resource manager in the media server processor 1110/1210 may perform resource management to a counter base, for example.

Hereinafter, diverse embodiment(s) of the digital device according to the present invention will be described in more detail with reference to the accompanying drawings.

Figure 13:
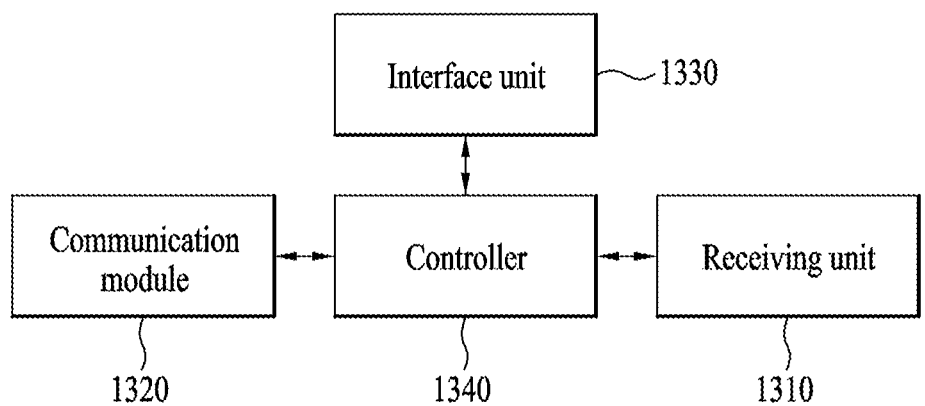
FIG. 13 is a detailed block diagram illustrating configuration modules of a digital device according to another embodiment of the present invention.

FIG. 13 illustrates a detailed block view showing configuration modules of a digital device according to another embodiment of the present invention. Referring to the above-described FIGS. 1 to 12, some of the modules of the digital device of FIG. 13 may be added or modified (or varied), and the scope of the present invention will not be decided only by the elements described in FIG. 1 to FIG. 13, and, by principle, the scope of the present invention should be interpreted based upon the appended claims of the present invention. As shown in FIG. 13, the digital device (1300) according to an embodiment of the present invention is configured by including a receiving unit (1310), a communication module (1320), a display module (1330), and a controller (1340), and so on.

The receiving unit (1310) may receive a User Input signal. The User Input signal may correspond to a signal being input from an external inputting means, such as a Remote Controller, a Keyboard, and a Smartphone, or may correspond to an IR (Infrared ray) signal. The receiving unit (1310) may include a sensor unit, and the receiving unit (1310) may detect a Touch input signal being input from a touch panel, and so on, which is equipped to the digital device (1300). The receiving unit (1300) may correspond to a user interface unit (450), which is described in FIG. 4.

The communication module (1320) may perform data communication with a Cloud server and an external device. The communication module (1320) collectively refers to all communication networks supporting diverse communication standards and/or protocols including wired/wireless networks. Such wired/wireless network may include all types of communication networks that are currently supported and that will be supported in the future by a communication standard, and one or more communication protocols for the same may also be supported. Such wired/wireless network may be configured by networks for a wired connection and a communication standard and protocol for the same, such as a USB, a CVBS, a component, an S-video (analog), a DVI, an HDMI, an RGB, a D-SUB, and so on, and configured by networks for a wireless connection and a communication standard and protocol for the same, such as Bluetooth, RFID, IrDA, UWB, ZigBee, DLNA, WLAN (Wi-Fi), Wibro, Wimax, HSDPA, LTE/LTE-A, Wi-Fi Direct, and so on.

The display module (1330) may display at least one or more content. When recommended content data are received through the communication module (1320), the display module (1330) may display a recommended content page, which is processed by using the recommended content data, on a screen. The display module (1330) may correspond to the display (480), which is described in FIG. 4.

The controller (1340) performs a function of managing overall functions of at least one or more modules shown in FIG. 13, such as the receiving unit (1310), the communication module (1320), and the display module (1330), and so on. Respectively, this will be described in more detail later on with reference to FIGS. 14 to 24.

Figure 14:
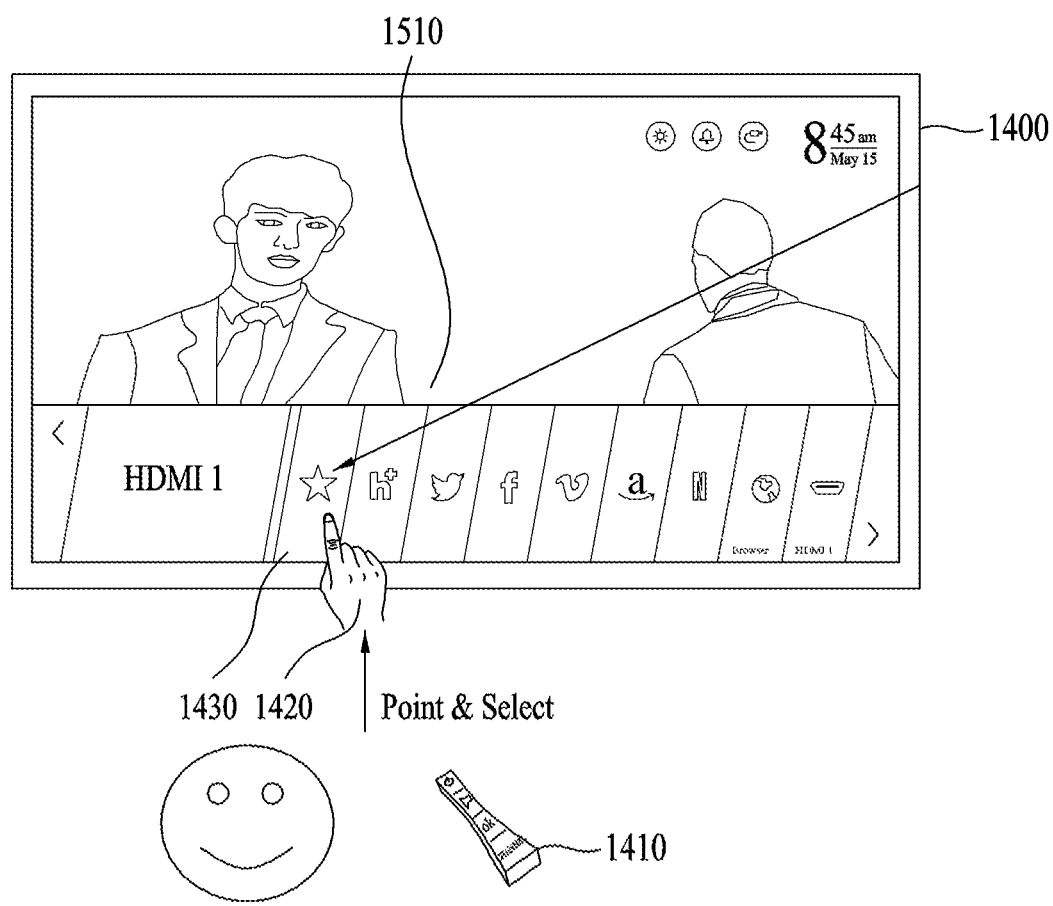

FIG. 14 and FIG. 15 illustrate examples of outputting a recommended content page from the digital device according to an embodiment of the present invention.

A controller of the digital device (1400) according to an embodiment of the present invention may perform control operations, so as to receive a Recommended Content Page Output Request signal, to receive a most recently updated version of Recommended Content Page data through a cloud server, and to display the Recommended Content Page received from the cloud server.

The Recommended Content Page may include a first window (or a first section) including broadcast content information, and a second window (or a second section) including VOD content information.

The first window and the second window may include thumbnail images of each content.

The signal for outputting Recommended Content Page may include a signal configured to select a recommended content page icon from a Home screen and an identical key signal, which is received from an external inputting means for a predetermined period of time or more.

The cloud server may store viewing history data (or viewing record data) of broadcast programs and VOD contents viewed by the user through the digital device during a predetermined period of time.

The broadcast content information and the VOD content information, which are included in the recommended content page, may include the same category information as the broadcast programs and VOD contents included in the viewing history data.

Additionally, when the controller receives a signal pointing the first window through a pointer, the controller may perform control operations so as to display channel information of a broadcast program, broadcasting station title information, title information of a broadcast program, and a progress-bar.

Moreover, when the controller receives a signal pointing the first window through the pointer, the controller may perform control operations so as to display images of a broadcast program, which is being broadcasted in real-time, through the first window.

Furthermore, when the controller receives a signal selecting the first window, the controller may perform control operations so as to expand and display the first window and to display supplemental information of a broadcast program included in the first window along with the respective thumbnail image.

Additionally, when the controller receives a signal pointing the second window through the pointer, the controller may perform control operations so as to display title information of a VOD content, viewer preference information, total playing time (or total running time) information, playback request icon, and supplemental information output request icon of the respective VOD content.

Additionally, when the controller receives a signal selecting the playback request icon, the controller may perform control operations so as to display a CP application list, which includes information on at least one or more CP (Content Provider) application providing the VOD content included in the second window.

Moreover, when the controller receives a signal selecting a specific CP application from the CP application list, the controller may perform control operations so as to execute the selected CP application and to play (or playback) the respective VOD content.

For example, as shown in FIG. 14, the controller of the digital device (1400) according to an embodiment of the present invention may receive a pointer (1420) movement signal from an external inputting means (1410) and may receive a signal selecting a recommended content page icon (1430) by using the pointer (1420).

In addition, as shown in (a) of FIG. 15, when the digital device (1400) is incapable of performing data communication, the controller may perform control operations so as to display a message (1510) notifying that the digital device (1400) is in a state of being incapable of performing data communication on the screen. Additionally, the message (1510) may include an icon (1515) requesting for an output of a Network Configuration page.

Conversely, as shown in (b) of FIG. 15, when the digital device (1400) is capable of performing data communication, the controller may perform control operations so as to receive a most recently updated version of recommended content page data from the cloud server, to create a Recommended Content Page by processing the recommended content page data received from the cloud server, and to display the created Recommended Content Page (1520) on the screen. Additionally, the Recommended Content Page (1520) may be displayed as a Translucent Panel. Accordingly, when the Recommended Content Page (1520) is being displayed, the user may be capable of viewing the content being played (or played-back overlaid) in the Background.

Figure 16:
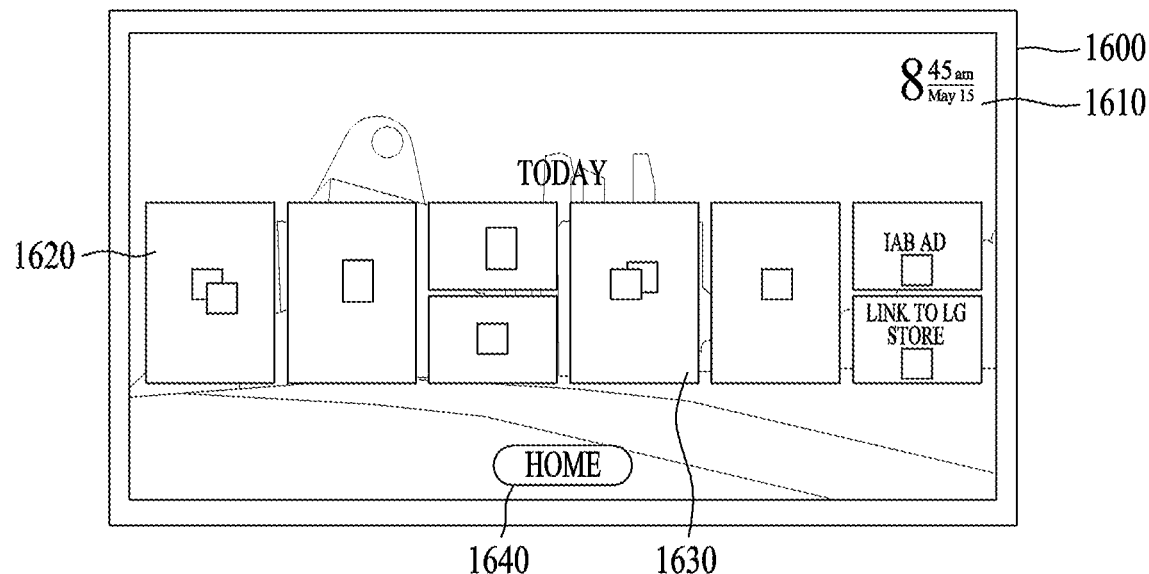
FIG. 16 is an overview illustrating a recommended content page being output from the digital device according to an embodiment of the present invention.

FIG. 16 illustrates a recommended content page being output from the digital device according to an embodiment of the present invention.

As shown in FIG. 16, a Recommended Content Page (1610), which is output from the digital device (1600) according to an embodiment of the present invention, may include a first window (1620) including broadcast content information and a second window (1630) including VOD content information. Moreover, in addition to the first window (1620) and the second window (1630), the Recommended Content Page (1610) may also include windows respective to diverse content types.

Additionally, when a real-time broadcast program or an external input image content has already been playing before the output of the Recommended Content Page (1610), the controller of the digital device (1600) may perform control operations so as to display the real-time broadcast program or the external input image content, which has been playing, in the Recommended Content Page (1610) as a PIP (picture in picture) (not shown).

Furthermore, the Recommended Content Page (1610) may include a Home icon (1640). Accordingly, when the Recommended Content Page (1610) is being output, and when the controller receives a signal selecting the Home icon (1640), the controller may perform control operations, so as to return to a screen prior to displaying the Recommended Content Page (1610).

Figure 17:
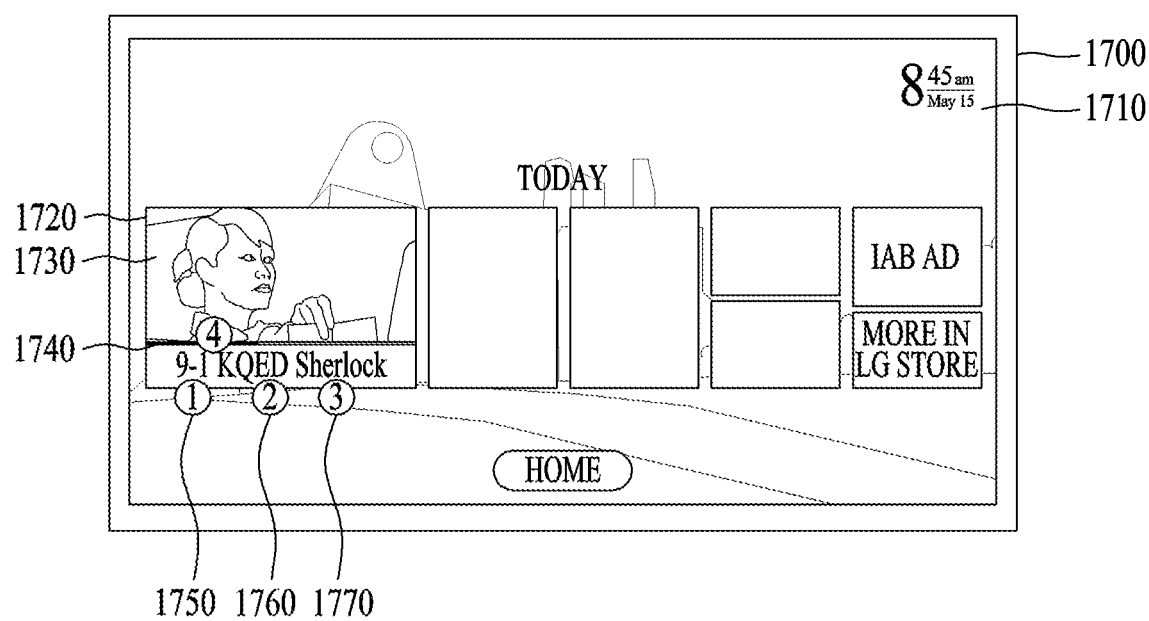
FIG. 17 is a first window included in the recommended content page being output from the digital device according to an embodiment of the present invention.

FIG. 17 illustrates a first window included in the recommended content page being output from the digital device according to an embodiment of the present invention.

As shown in FIG. 17, a Recommended Content Page (1710) being output from the digital device (1700) according to an embodiment of the present invention may include a first window (1720) including broadcast content information. The first window (1720) may include a thumbnail image (1730) of the broadcast content, title information (1750) of the broadcast program, broadcasting station title information (1760), title information (1770) of a broadcast program, and a progress-bar (1740). Additionally, the title information (1750) of the broadcast program, the broadcasting station title information (1760), the title information (1770) of a broadcast program, and the progress-bar (1740) may be displayed only when a pointer is positioned on the first window (1720).

Category information of the broadcast content included in the first window (1720) may be matched with category information of a broadcast program being included in the viewing history data recorded during a predetermined period of time, which is stored in a cloud server. Alternatively, the broadcast content included in the first window (1720) may correspond to a set of series of a broadcast program included in the viewing history data recorded during a predetermined period of time, which is stored in the cloud server.

Figure 18:
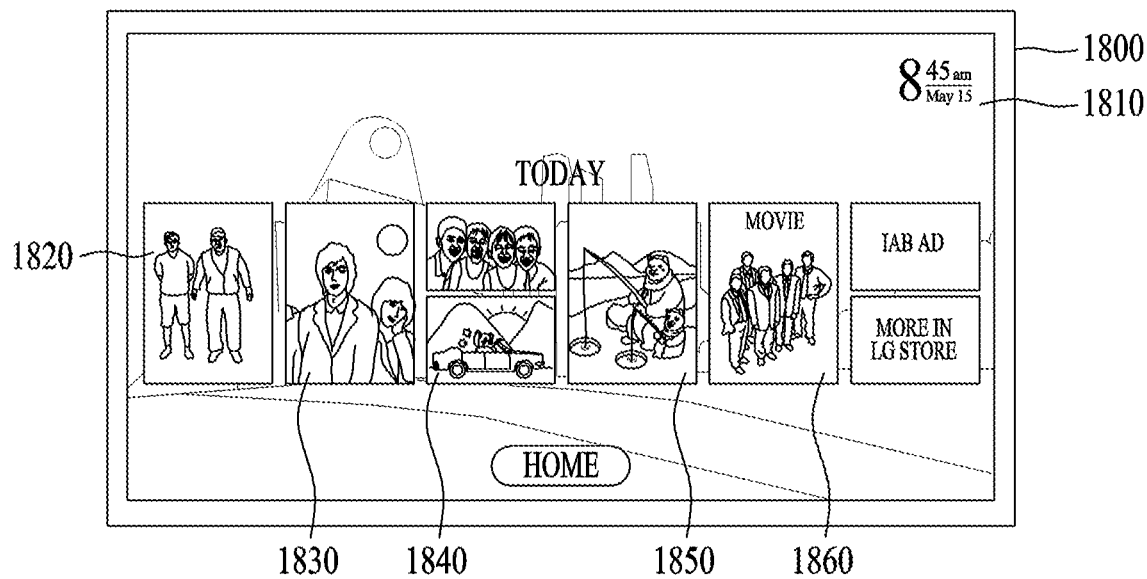
FIGS. 18 to 20 are a second window included in the recommended content page being output from the digital device according to an embodiment of the present invention.
Figure 19:
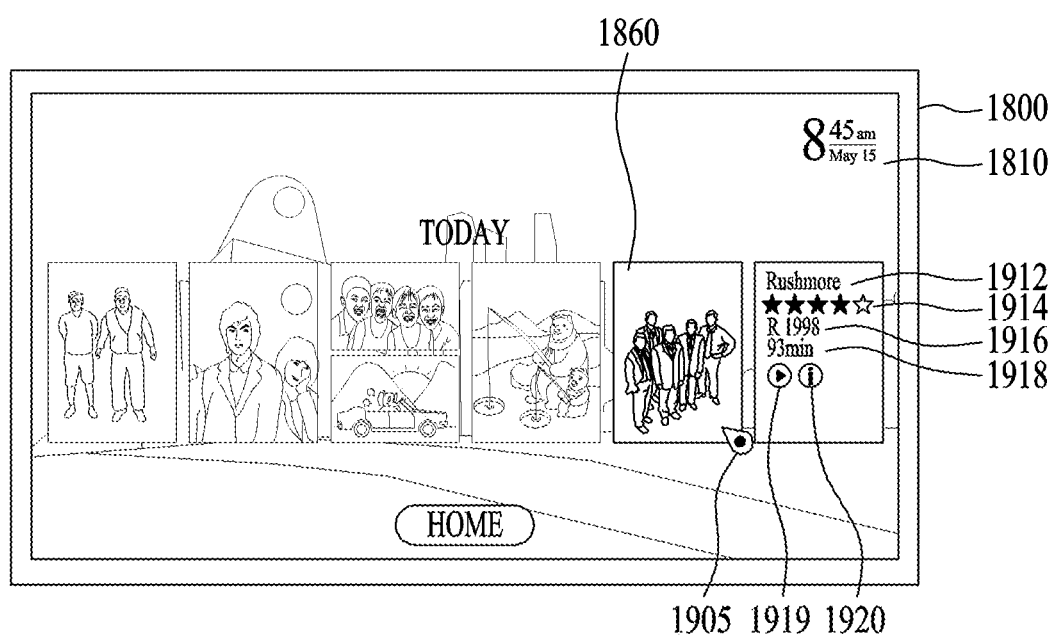
Figure 20:
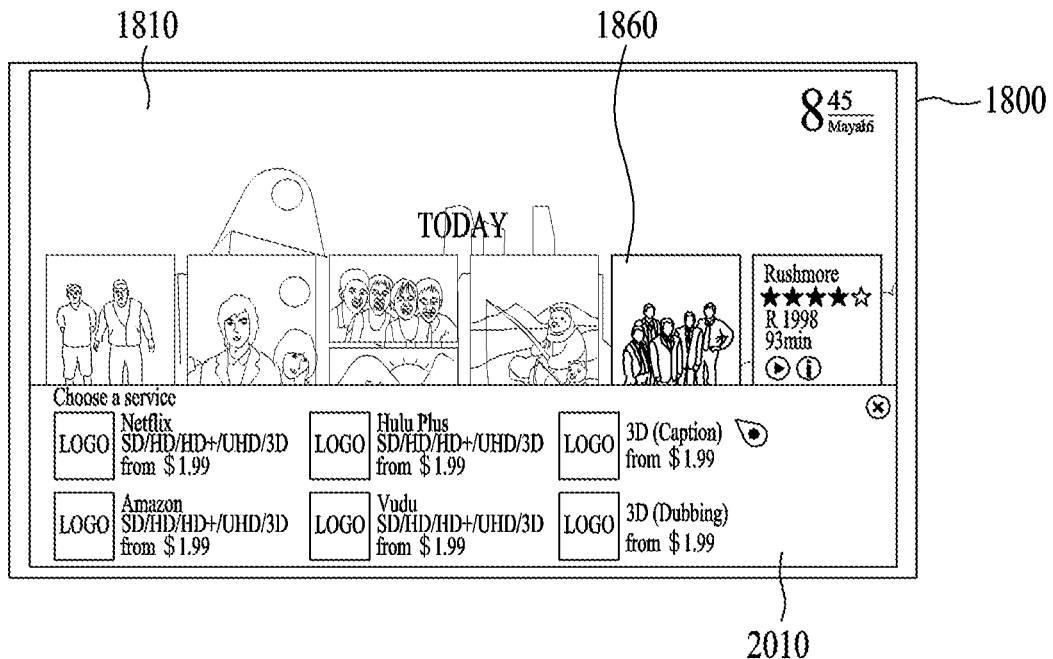

FIGS. 18 to 20 illustrate a second window included in the recommended content page being output from the digital device according to an embodiment of the present invention.

A controller of the digital device (1800) according to an embodiment of the present invention may perform control operations, so as to receive a signal requesting outputting Recommended Content Page, to receive a most recently updated version of Recommended Content Page data through a cloud server, and to display the Recommended Content Page (1810) received from the cloud server. The Recommended Content Page (1810) may include a first window (1840) including broadcast content information, and second windows (1820, 1830, 1850, and 1860) including VOD content information. The first window (1840) and the second windows (1820, 1830, 1850, and 1860) may include thumbnail images of each content.

The second window may include windows (1820, 1830, and 1860) including movie VOD content information and a window (1850) including broadcast VOD content information.

Additionally, when the controller of the digital device (1800) according to an embodiment of the present invention receives a signal pointing the second window through the pointer, the controller may perform control operations so as to display title information of a VOD content, viewer preference information, total playing time (or total running time) information, playback request icon, and supplemental information output request icon of the respective VOD content.

For example, as shown in FIG. 19, when the controller of the digital device (1800) according to the embodiment of the present invention receives a signal pointing at the second window (1860), which includes movie VOD content information, by using a pointer (1905) by having the user use an external inputting means, the controller may perform control operations so as to highlight the pointed second window (1860) within the Recommended Content Page (1810) and to display title information (1912) of the respective VOD content, viewer preference information (1914), production year (1916) of the respective VOD content, total playing time (or total running time) information (1918), playback request icon (1919), and supplemental information output request icon (1920) of the respective VOD content, which are displayed on the second window (1860).

Additionally, as shown in FIG. 20, when the controller receives a signal selecting the playback request icon (1919), the controller may perform control operations so as to display a CP application list (2010), which includes information on at least one or more CP application providing the VOD content included in the second window (1860).

Furthermore, when the controller receives a signal selecting a specific CP application from the CP application list, the controller may perform control operations so as to execute the selected CP application and to play (or playback) the respective VOD content.

Figure 21:
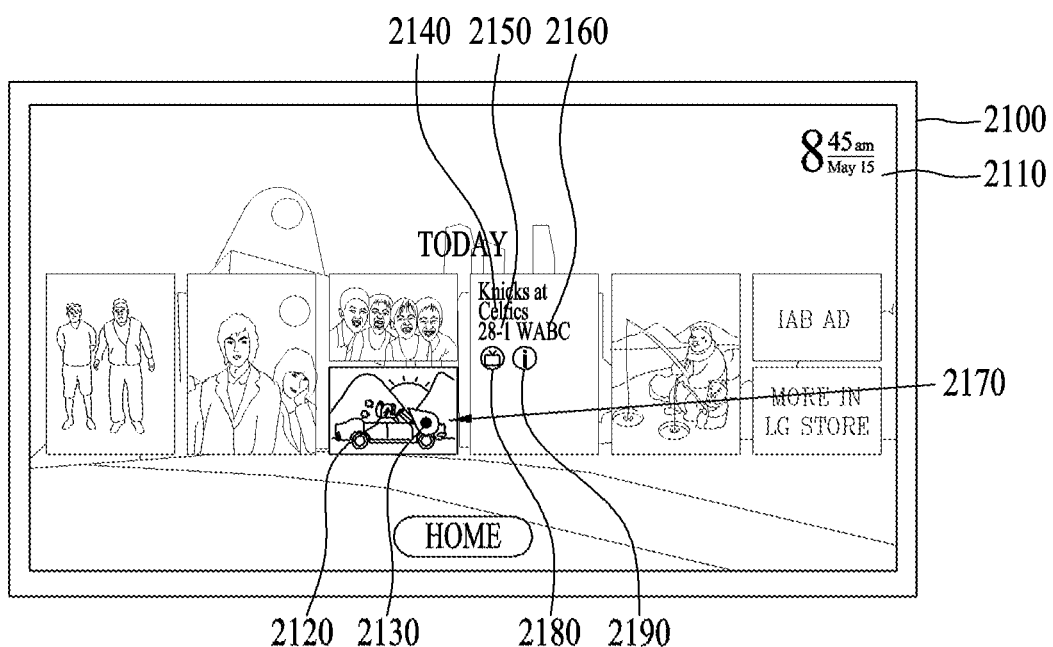
FIGS. 21 and 22 are another first window included in the recommended content page being output from the digital device according to an embodiment of the present invention.
Figure 22:
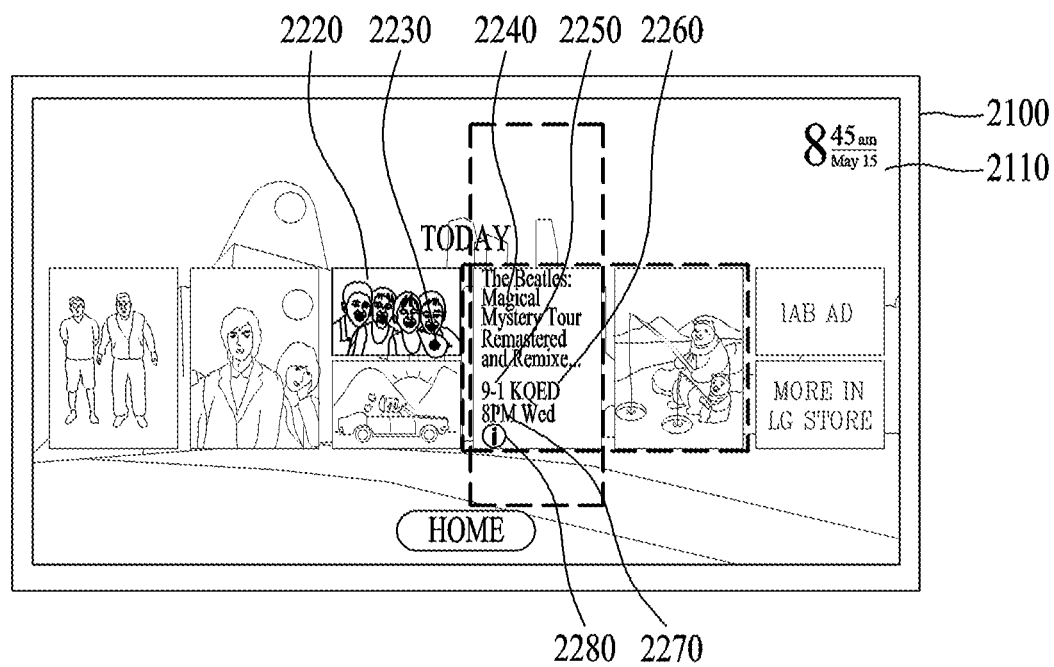

FIGS. 21 and 22 illustrate another first window included in the recommended content page being output from the digital device according to an embodiment of the present invention.

As shown in FIG. 21, the digital device (2100) may output the Recommended Content Page (2110), in which the Recommended Content Page (2110) may include a first window (2120) configured to display broadcast content information. Herein, when the broadcast content being displayed on the first window (2120) corresponds to a broadcast content that is currently being broadcasted, and when the pointer (2130) is pointing at the first window (2120), the controller of the digital device (2100) may perform control operations so as to display title information (2140) of the broadcast program being displayed on the first window (2120), channel information (2150), broadcasting station information (2160), a progress-bar (2170), broadcast content playback request icon (2180), and supplemental information output request icon (2190) on another window of the Recommended Content Page (2110). In addition, the other window, for example, may correspond to a window adjacent to the first window (2120). Moreover, when the controller receives a signal selecting the broadcast content playback request icon (2080), the controller may perform control operations so as execute an application outputting the broadcast content, thereby displaying the broadcast content displayed on the first window (2120) on the screen.

As shown in FIG. 22, the Recommended Content Page (2110) may include a first window (2220) displaying broadcast content information. In addition, when the broadcast content displayed on the first window (2220) corresponds to content scheduled to be broadcasted instead of content that is currently being broadcasted, and when the pointer (2230) is pointing at the first window (2220), the controller of the digital device (2100) may perform control operations so as to display title information (2240) of the broadcast program being displayed on the first window (2220), channel information (2250), broadcasting station information (2260), scheduled broadcasting time information (2270), and supplemental information output request icon (2280) on a window that is adjacent to the first window (2220). In addition, if a size of the information being provided through the adjacent window is larger than the window itself, the controller may perform control operations so as to display the information by providing a scroll bar within the corresponding window so that the information can be scrolled, and by expanding the corresponding window along up-and-down directions (or a vertical direction) or by expanding the corresponding along left-and-right directions (or a horizontal direction), i.e., by integrating the corresponding window with another adjacent window, so that all of the information can be directly recognized within a single window. Alternatively, as described above, when it is difficult to display all of the information through a single neighboring (or adjacent) window, the controller may provide the corresponding information by dividing the information and by distributing the divided information to left-side and right-side windows of the first window (2220) and outputting the information respectively.

Figure 23:
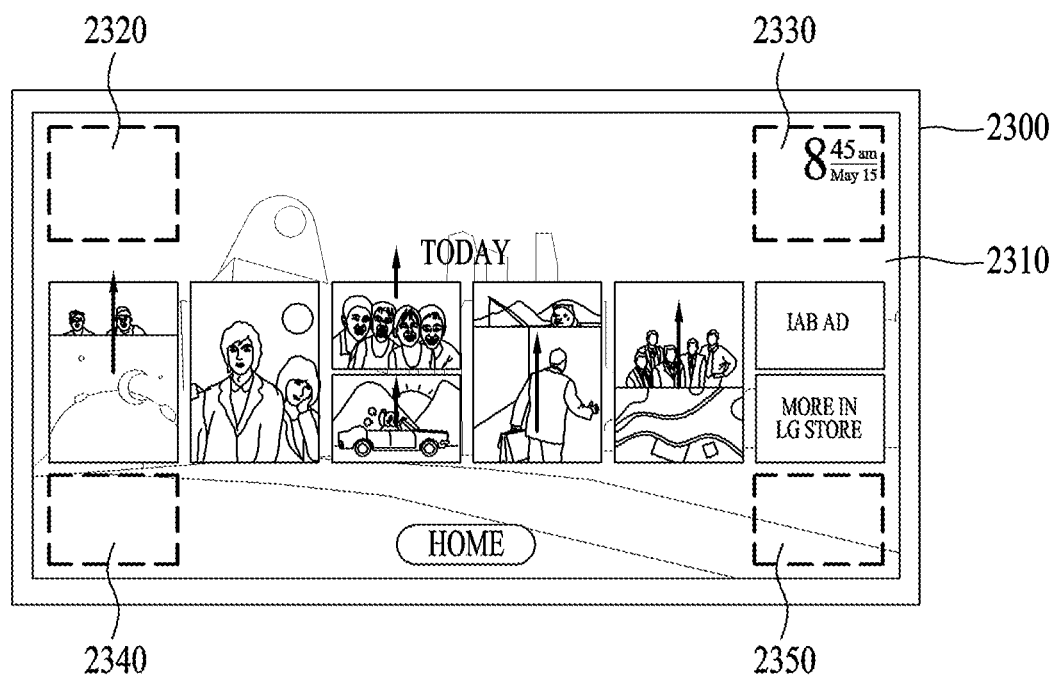
FIG. 23 is thumbnail images of a first window and a second window included in the recommended content page being output from the digital device according to an exemplary embodiment of the present invention.

FIG. 23 illustrates thumbnail images of a first window and a second window included in the recommended content page being output from the digital device according to an embodiment of the present invention.

As shown in FIG. 23, a controller of the digital device (2300) according to an embodiment of the present invention may perform control operations, so as to receive a signal requesting outputting Recommended Content Page, to receive a most recently updated version of Recommended Content Page data through a cloud server, and to display the Recommended Content Page (2310) received from a cloud server. The Recommended Content Page (2310) may include a first window including broadcast content information, and a second window including VOD content information. The first window and the second window may include thumbnail images of each content.

Additionally, the first window and the second window included in the Recommended Content Page (2310) may include a plurality of recommended content information and a plurality of thumbnail images respective to each of the plurality of recommended content information.

Additionally, when the Recommended Content Page (2310) is being displayed, and when a User Input signal is not received for a predetermined period of time, the controller of the digital device (2300) according to the embodiment of the present invention may perform control operations so as to sequentially display the plurality of thumbnail images by scrolling the thumbnail images included in each window or by using a method of shifting images, and so on.

Moreover, as shown in FIG. 23, when an additional control signal is received from the user while the pointer is in a state of being located on each edge area (2320, 2330, 2340, and 2350) of the recommended page, the controller of the digital device (2300), for example, may control the one or more windows within the recommended page by using a method different from the above-described method. Herein, for example, the additional control signal of the user may correspond to a signal moving a wheel of an input device along up-and-down directions. The other control refers to when, for example, a wheel movement control signal is received in a state when the pointer is located on a first edge area (2320), accordingly, the controller of the digital device allows thumbnail images of the overall windows, which configure the recommended page, to be shifted. Additionally, when a wheel movement control signal is received in a state when the pointer is located on a second edge area (2330), accordingly, among the windows configuring the recommended page, the controller of the digital device allows thumbnail images of only the windows belonging to a predetermined category to be shifted. In addition, the predetermined category may be defined by diverse references, such as genre, movie, and so on. Alternatively, when control is performed on a specific window and not on the edge area in the previous control process, the predetermined category may correspond to the category to which the corresponding window belongs. Moreover, when a wheel movement control signal is received in a state when the pointer is located on a third edge area (2340), accordingly, among the windows configuring the recommended page, the controller of the digital device allows thumbnail images of only the windows corresponding to the VOD criterion to be shifted. Furthermore, when a wheel movement control signal is received in a state when the pointer is located on a fourth edge area (2350), accordingly, among the windows configuring the recommended page, the controller of the digital device allows thumbnail images of only the window (s) corresponding to any one of multiple references, such as a broadcast content that is currently being broadcasted, as shown in FIG. 21, a broadcast content that is currently not being broadcasted, as shown in FIG. 22, content including only images, moving picture image content, series having a high viewing rate, and so on, to be shifted. Meanwhile, locations, sizes, forms, and so on of the edge areas (2320, 2330, 2340, and 2350), which are shown in FIG. 23, and functions mapped to each of the edge areas will not be limited only to the description provided above, and, therefore, the edge areas may also be mapped to other function(s), and such function(s) may also be performed in other edge areas. Additionally, in order to map the functions that are to be performed in each of the above-described edge areas, a UI may be provided, and, after receiving settings from the user and storing such settings, as described above, the control may be performed.

Additionally, although the details described in this specification has described and is describing details being controlled by an inputting device, such as mainly a remote controller, unlike the description provided herein, the control may also be performed by a voice command or be similarly performed based upon a gesture of the user, a movement of the pupils of the user. For example, for the voice command, the user's voice being received through an inputting device or through a predetermined application of a mobile device, such as a smart phone, which is carried by the user, is analyzed, and a respective control may be performed accordingly. Additionally, for a gesture of the user, by having the user recognize a gesture through the inputting device, which being in a state of contacting the inputting device, or by having a camera sensor, and so on, which is equipped to the digital device recognize an input user gesture, a control operation respective to the gesture input may also be performed. Furthermore, for the movement of the user's pupil, control may also be performed based upon the user's pupil movement data, which are sensed by an eye-tracking sensor equipped to the digital device or by an eye-tracking sensor equipped to the inputting device or smart phone. Meanwhile, if the user is wearing a glasses-type or watch-type wearable device, the control operations may also be performed by the digital device based upon the voice, gesture, and pupil movement data.

Figure 24:
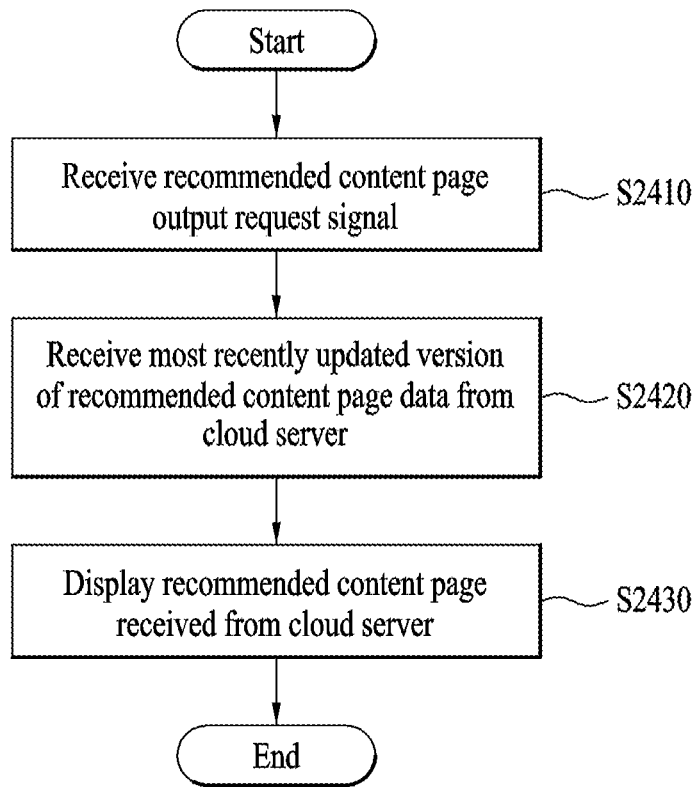
FIG. 24 is a flow chart illustrating a method for controlling a digital device according to an embodiment of the present invention.

FIG. 24 illustrates a flow chart showing a method for controlling a digital device according to an embodiment of the present invention.

As shown in FIG. 24, the method for controlling the digital device according to the embodiment of the present invention may be realized by including receiving a signal requesting for outputting a Recommended Content Page (S2410), a step of receiving a most recently updated version of a recommended content page data from a cloud server (S2420), and a step of displaying a recommended content page received from the cloud server (S2430). Since the detailed description of each step is identical to the description provided above, detailed description of the same will be omitted.

Figure 25:
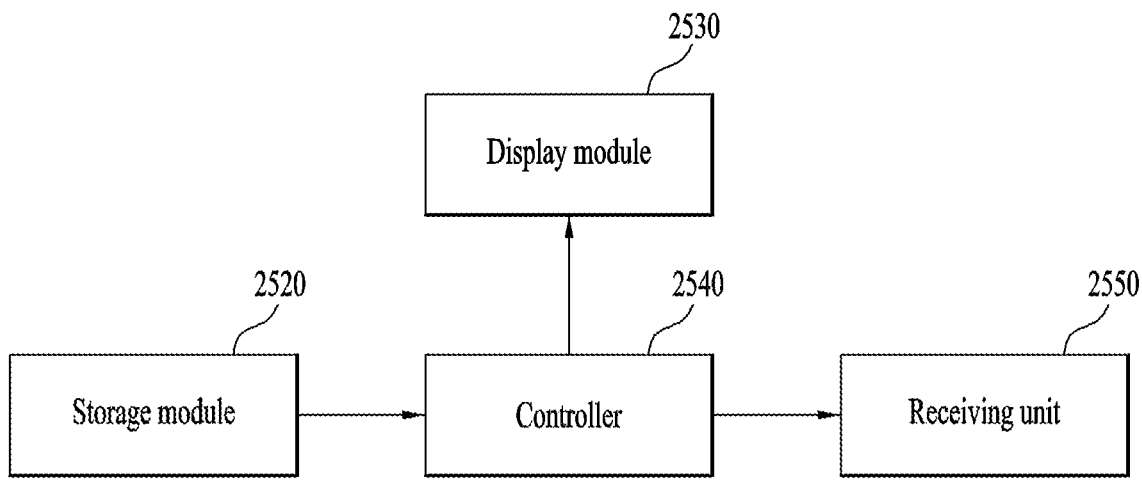
FIG. 25 is a detailed block view illustrating configuration modules of a digital device according to yet another embodiment of the present invention.

FIG. 25 illustrates a detailed block view showing configuration modules of a digital device according to yet another exemplary embodiment of the present invention. Referring to the above-described FIGS. 1 to 12, some of the modules of the digital device of FIG. 25 may be added or modified (or varied), and the scope of the present invention will not be decided only by the elements described in FIG. 25, and, by principle, the scope of the present invention should be interpreted based upon the appended claims of the present invention. As shown in FIG. 25, the digital device (2500) according to an exemplary embodiment of the present invention is configured by including a receiving unit (2550), (2510), a storage module (2520), a display module (2530), and a controller (2540), and so on.

The receiving unit (2550) may receive a User Input signal. The User Input signal may correspond to a signal being inputted from an external inputting means, such as a Remote Controller, a Keyboard, and a Smartphone, or may correspond to an IR (Infrared ray) signal. The receiving unit (2550) may include a sensor unit, and the receiving unit (2550) may detect a Touch input signal being inputted from a touch panel, and so on, which is equipped to the digital device (2500). The receiving unit (2550) may correspond to a user interface unit (450), which is described in FIG. 4.

The storage module (2520) may store application data. The storage module (2520) may include a Data Base, which is configured to store all application data installed in the digital device (2500), application list data of applications most frequently executed in the digital device (2500), and so on. The storage module (2520) may correspond to the storage unit (440), which is described in FIG. 4.

The display module (2530) may display at least one or more content. The display module (2530) may display an application graphic image, wherein application data included in the storage module (2520) are processed. The display module (2530) may correspond to the display (480), which is described in FIG. 4.

The controller (2540) performs a function of managing overall functions of at least one or more modules shown in FIG. 25, such as the receiving unit (2550), the storage module (2520), and the display module (2530), and so on. Respectively, this will be described in more detail later on with reference to FIG. 25.

The controller of the digital device (2500) according to the embodiment of the present invention may perform control operations so as to receive a first page output request signal, wherein a first page includes a Home menu, and to display the first page, and the Home menu may include a first window including Application information of an application that has been most recently executed in the digital device, a Favorite application icon, a Web Browser application icon, and an External Input icon, and the first page may include a second page output request icon, wherein the second page displays a list of applications executed in the digital device for a predetermined period of time, and a third page output request icon, wherein the third page displays a list of the entire applications installed in the digital device.

The first page output request icon may correspond to when a Home key signal, which is included in an external inputting means, is being input, or when a Return to (or Go Back to) previous screen request signal is received while the second page and the third page are being displayed.

The first page may be displayed in the form of a Translucent Panel, and content that was already being displayed in the Background may continue to be displayed.

The first window may include a Thumbnail image of an application, title information of the application, and type information of the application.

Additionally, when a signal selecting the first window is received, the controller may perform control operations so as to execute the application displayed (or indicated) in the first window and to display the executed application.

The Favorite application icons may be sequentially aligned (or listed) by an order of the most frequently executed application in the digital device during a predetermined period of time.

Additionally, when a signal pointing the Favorite application icon by using the pointer is received, the controller may perform control operations so as to display a list of applications that are included in the same category as the pointed application.

Moreover, when a signal selecting the second page output request icon is received, the controller may perform control operations so as to display a list of applications executed during a predetermined period of time by listing the application in the order of execution, and wherein the list may be configured of a plurality of windows including the first window.

Furthermore, when the signal selecting the second page output request icon is received, the controller may perform control operations so as to display a plurality of application category windows, and, when a signal pointing a specific application category window by using the pointer is received, the controller may perform control operations so as to display a list of applications, which are included the pointed category, among the applications that are executed during the predetermined period of time.

Also, when a signal selecting the third page output request icon is received, the controller may perform control operations so as to align (or list) application icons by an order of installation in the digital device and to display the aligned application icons.

This will hereinafter be described in more detail with reference to FIGS. 26 to 42.

Figure 26:
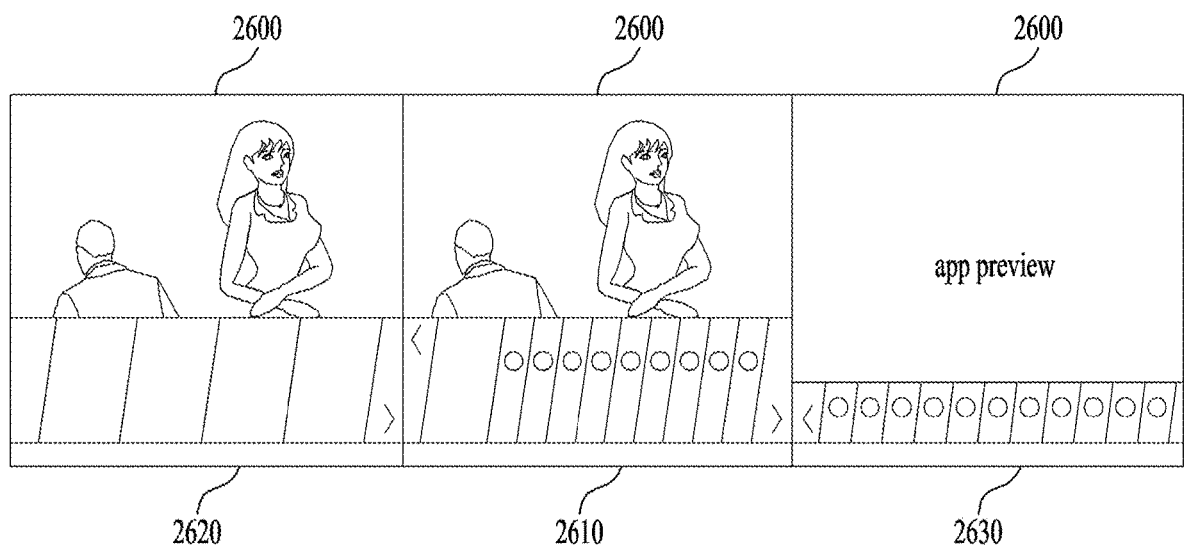
FIG. 26 illustrates a first page, a second page, and a third page being output from a digital device according to an embodiment of the present invention.

FIG. 26 illustrates a first page, a second page, and a third page being output from a digital device according to an embodiment of the present invention.

As shown in FIG. 26, the controller of the digital device according to the embodiment of the present invention may perform control operations so as to receive a first page output request signal including a Home menu and to display a first page (2610), and the controller may also perform control operations so as to receive a second page output request signal and to display a second page (2620), and the controller may also perform control operations so as to receive a third page output request signal and to display a third page (2630).

The first page (2610) may display (or indicate) a Favorite application list, external input information, basic configuration icon, information on the most recently executed application, and so on.

The second page (2620) may display (or indicate) applications executed by the user during a predetermined period of time and a list of external inputs by a time-based order.

The third page (2630) allows the user to access all applications installed in the digital device (2600). Additionally, the third page (2630) may include application icons each including a thumbnail image or Symbol of the respective application.

Figure 27:
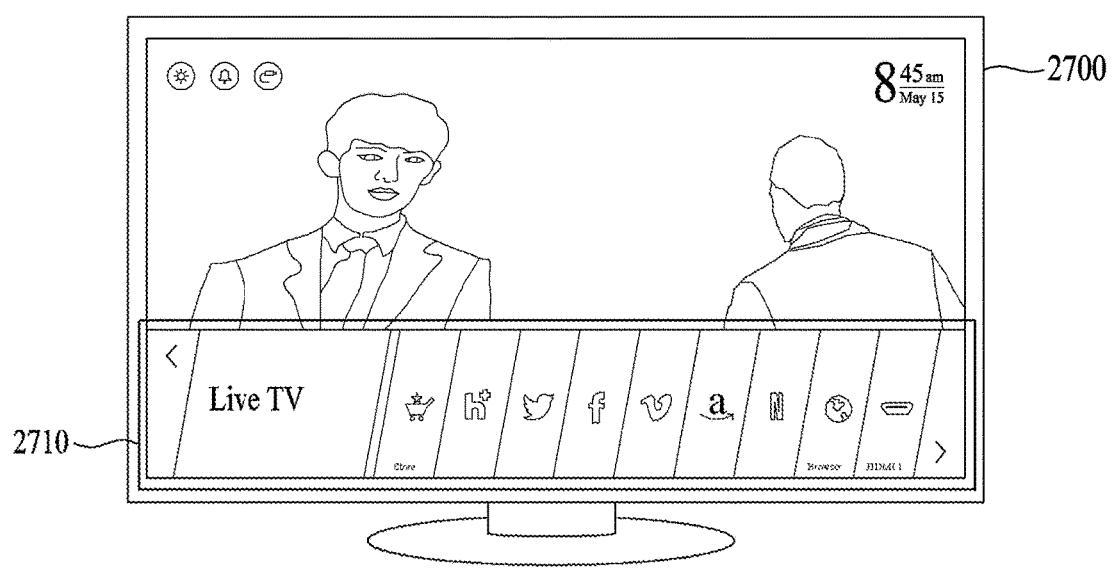
FIG. 27 to FIG. 29 illustrate a first page being output from a digital device according to an embodiment of the present invention.
Figure 28:
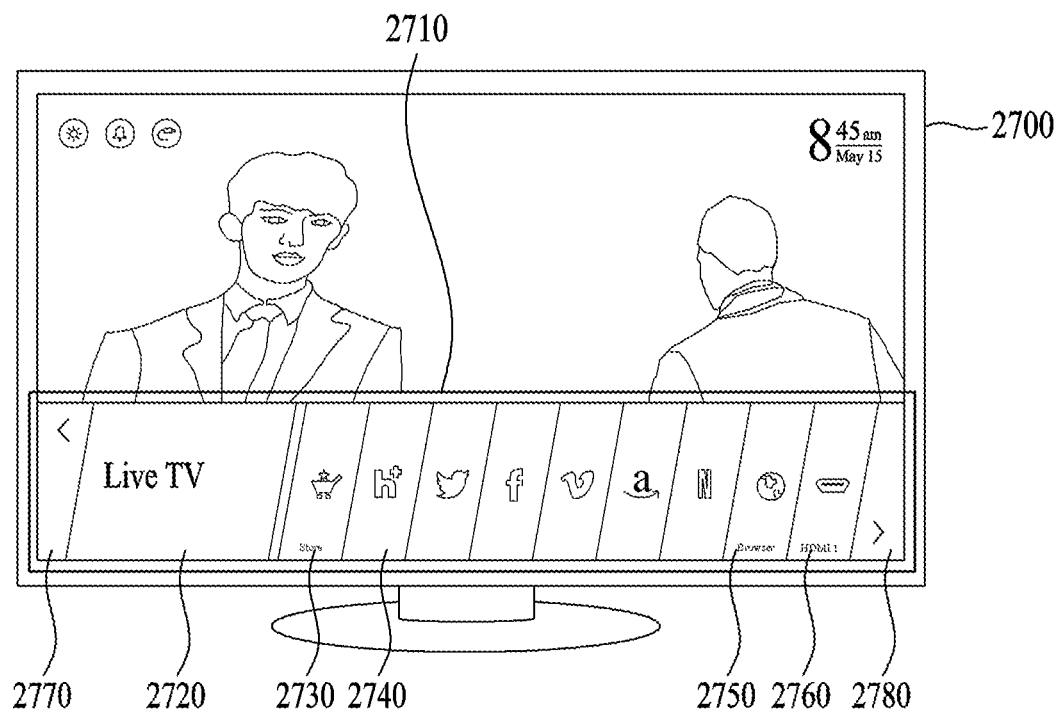
Figure 29:
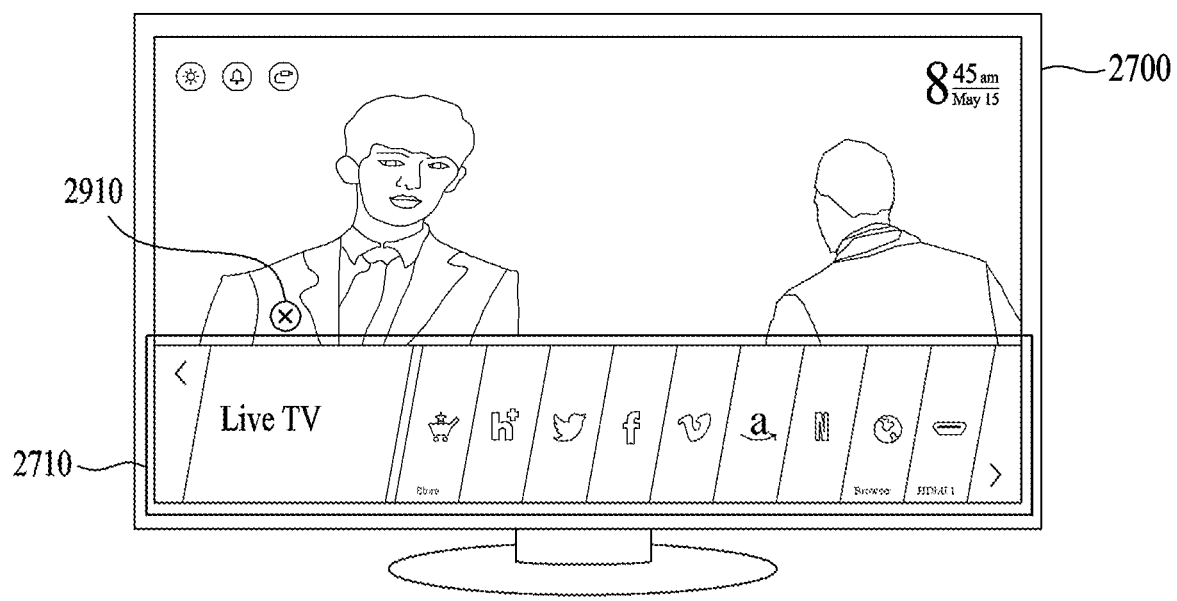

FIG. 27 to FIG. 29 illustrate a first page being output from a digital device according to an embodiment of the present invention.

As shown in FIG. 27, the controller of the digital device (2700) according to an embodiment of the present invention may perform control operations so as to receive a first page output request signal, wherein a first page includes a Home menu, and to display the first page (2710).

Additionally, as shown in FIG. 28, the first page (2710) may include a first window (2720) including information on the most recently executed application, an Application store icon (2730), a Favorite application icon (2740), a Web browser application icon (2750), and an external input icon (2760). Additionally, the first page (2710) may include a second page output request icon (2770), wherein the second page displays a list of applications executed in the digital device during a predetermined period of time, and a third page output request icon (2780), wherein the third page displays a list of all applications installed in the digital device.

By pressing on a Home button, which is included in the remote controller, while viewing a content through the digital device (2700), or by pressing on a Back key while the second page and the third page are being output, or by pressing on a Back key during an initiation step (or starting step) of an application, the user may display the first page (2710) on the screen.

Furthermore, as shown in FIG. 17, when a pointer points at the first window (2710) for a predetermined period of time or more, an icon (1710) for deleting information on the application displayed on the first window may be displayed. And, when a signal indicating that the user has selected the icon (2910) is received, the controller of the digital device (2700) may perform control operations so as to delete the information on the application displayed on the first window (2710) and to allow information on an application, which has most recently been executed in succession to the pervious application, to be displayed on the first window (2710).

Figure 30:
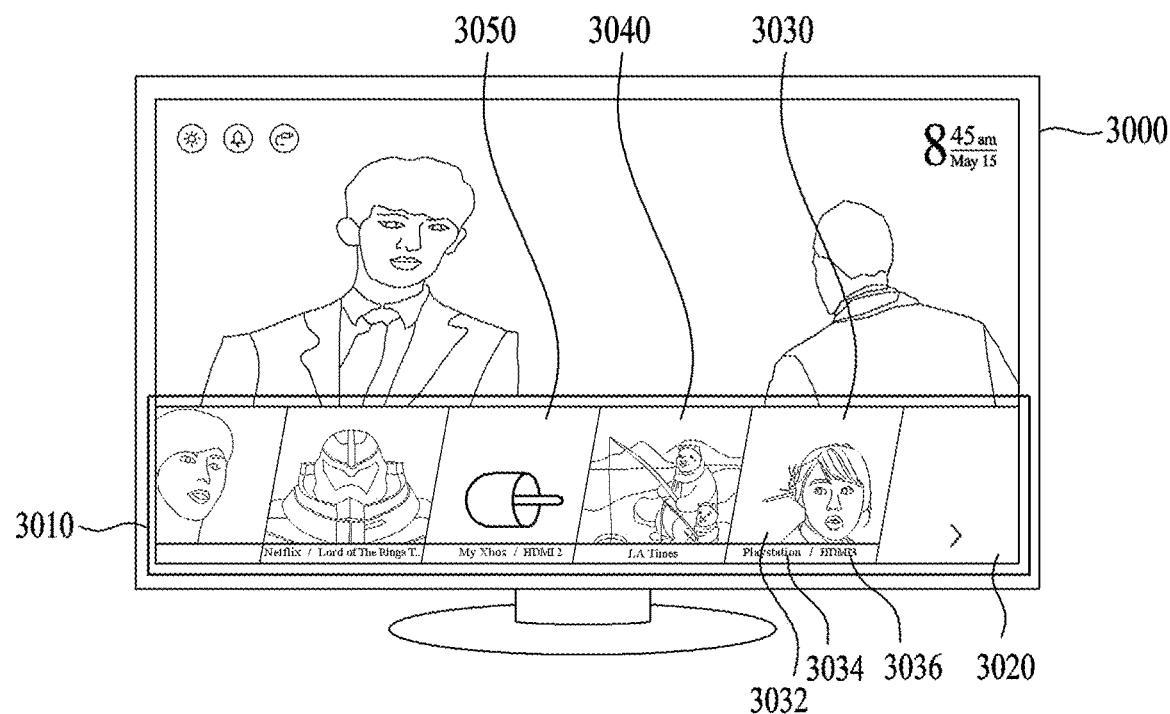
FIG. 30 to FIG. 32 illustrate a second page being output from a digital device according to an embodiment of the present invention.
Figure 31:
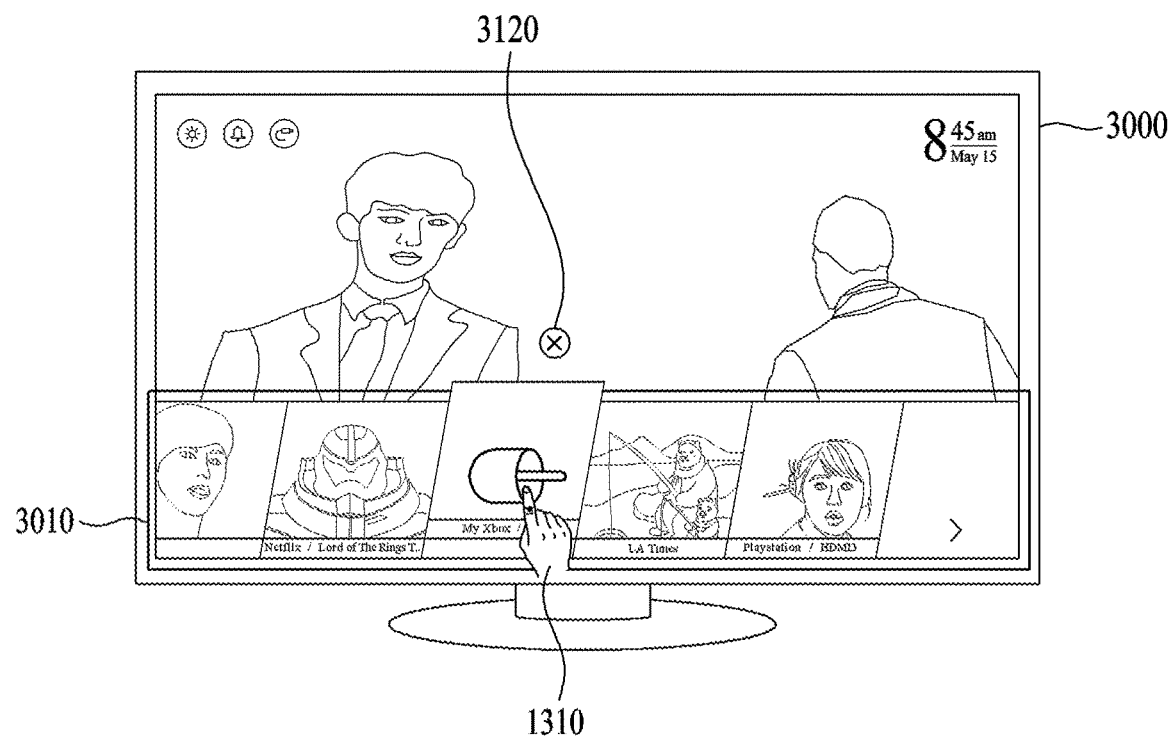
Figure 32:
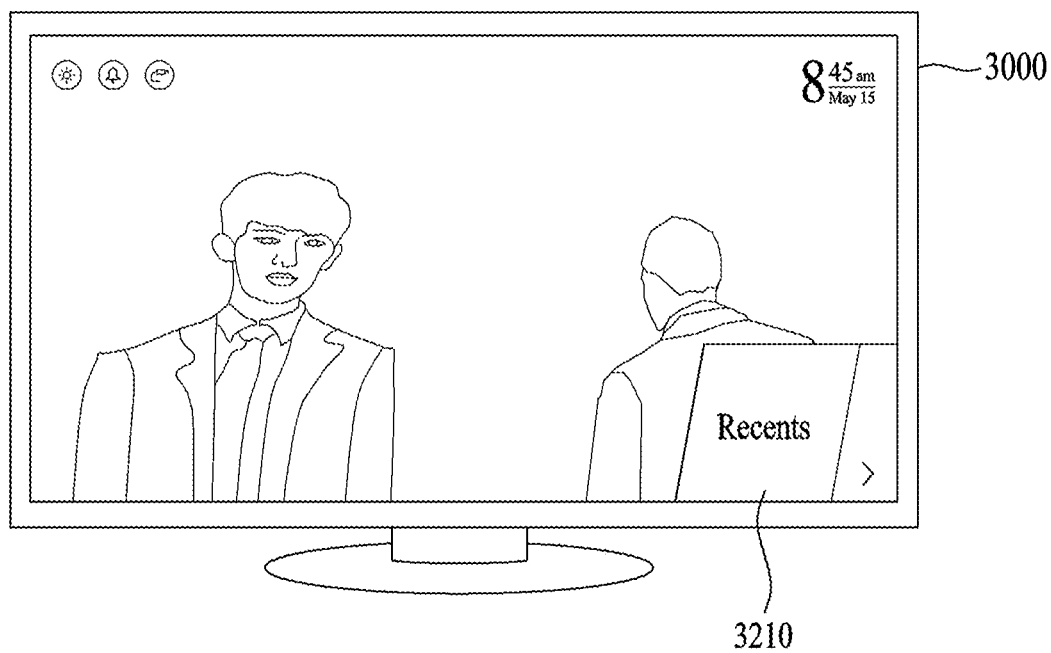

FIG. 30 to FIG. 32 illustrate a second page being output from a digital device according to an embodiment of the present invention.

As shown in FIG. 30, when a signal selecting the second page output request icon, which is included in the first page, is received, the controller of the digital device (3000) according to an embodiment of the present invention may perform control operations so as to display the second page (3010), which includes a list of applications executed in the digital device (3000). The second page (3010) may include a first page output request icon (3020), a first window (3030) including information on the most recently executed application, and a second window (3040) and a third window (3050) each including information on the previously executed applications. The first window (3030) may include a thumbnail image (3032) of the respective application, application title information (3034), and application type information (3036).

Additionally, as shown in FIG. 31, when a signal pointing at a specific window included in the second page (3010) for a predetermined period of time or more by a pointer (3110) is received, the controller of the digital device (3000) according to the embodiment of the present invention may perform control operations so as to display an icon (1920) for deleting the pointed window from the second page (3010). The user may select the icon (3120) and may delete the corresponding window within the second page (3010).

Furthermore, as shown in FIG. 32, when there is no application being executed in the digital device (3000) starting from the current time for a predetermined period of time or more, the controller of the digital device (3000) according to the embodiment of the present invention may perform control operations so as to display a message (3210) notifying that there are no currently executed applications.

Figure 33:
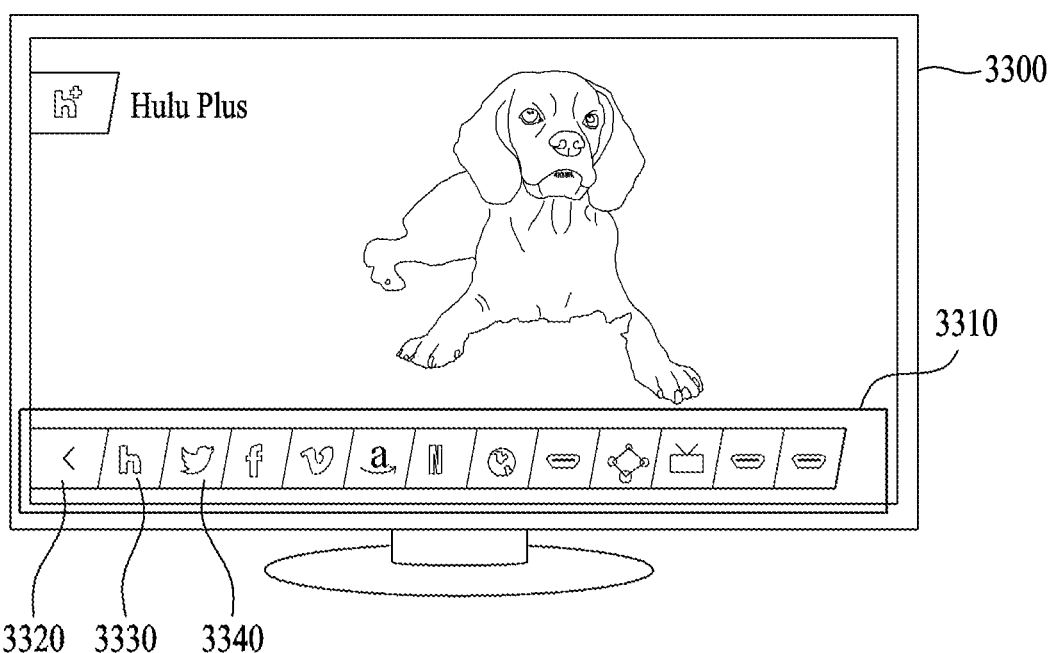
FIG. 33 to FIG. 34 illustrate a third page being output from a digital device according to an embodiment of the present invention.
Figure 34:
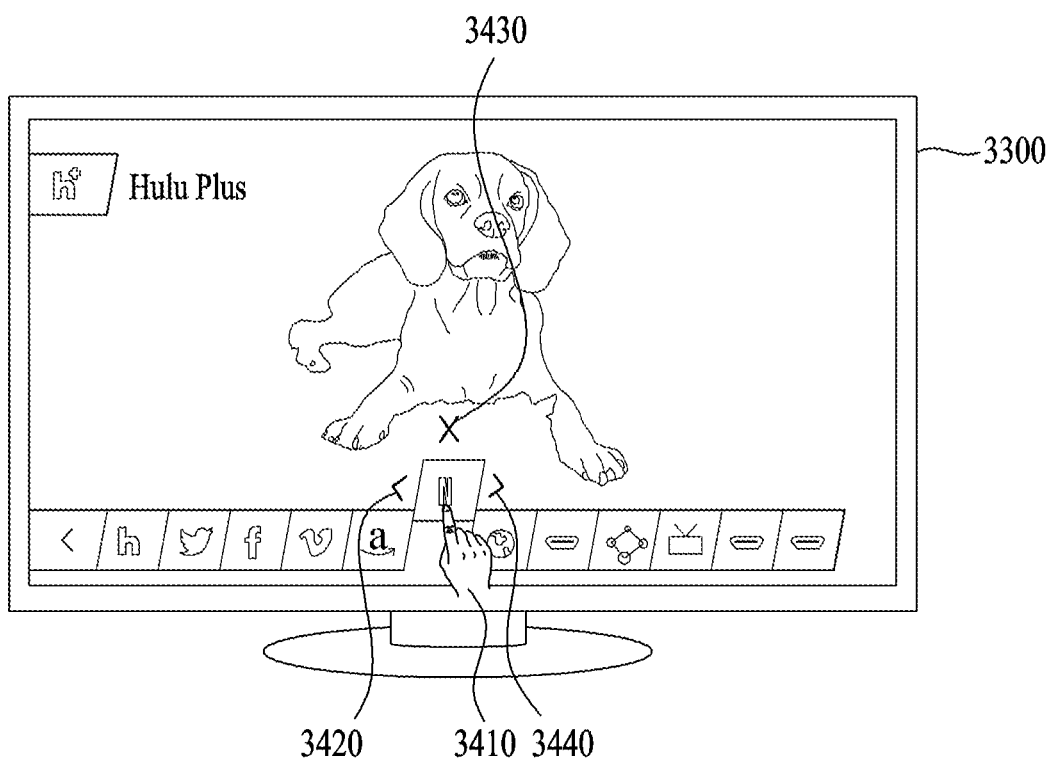

FIG. 33 to FIG. 34 illustrate a third page being output from a digital device according to an embodiment of the present invention.

As shown in FIG. 33, when a signal selecting the third page output request icon, which is included in the first page, is received, the controller of the digital device (3300) according to the embodiment of the present invention may perform control operations so as to display a third page (3310) including a list of all applications installed in the digital device (3300). The third page (3310) may include a first page output request icon (3320), a first application icon (3330), a second application icon (3340), and so on. The third page (3310) may align the icons respective to all applications installed in the digital device (3300) by an order of installation or by an inverse order of the installation order. Moreover, the third page (3310) may align the icons respective to the applications by an order of execution in the digital device (3300) during a predetermined period of time.

Additionally, as shown in FIG. 34, when a signal pointing at a specific application icon included in the third page (3310) for a predetermined period of time or more by a pointer (3510) is received, the controller of the digital device (3300) according to the embodiment of the present invention may perform control operations so as to display the pointed application icon by relocating the corresponding icon upward. Moreover, the controller may include direction keys (3520, 3540) for relocating icons and a Delete key (3530) for deleting the pointed application icon from the third page (3310) in a surrounding area of the relocated and displayed application icon. Accordingly, the user may relocate the positions of the pointed application icons by selecting the direction keys (3520, 3540), or the user may delete the pointed application icons from the third page (3310) by selecting the Delete key (3530).

Figure 35:
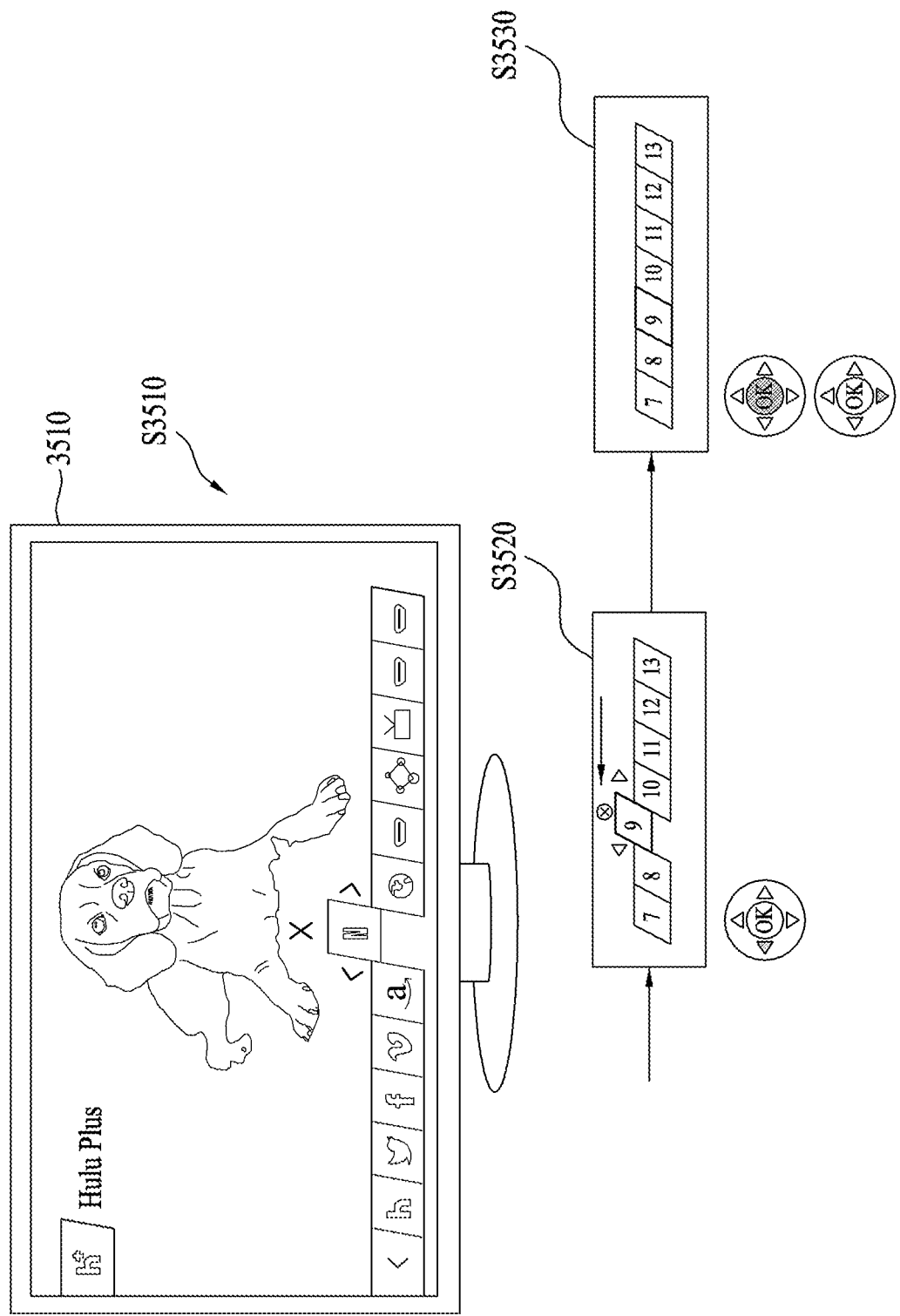
FIG. 35 to FIG. 37 illustrate an example of editing an application icon included in a third page from a digital device according to an embodiment of the present invention.
Figure 36:
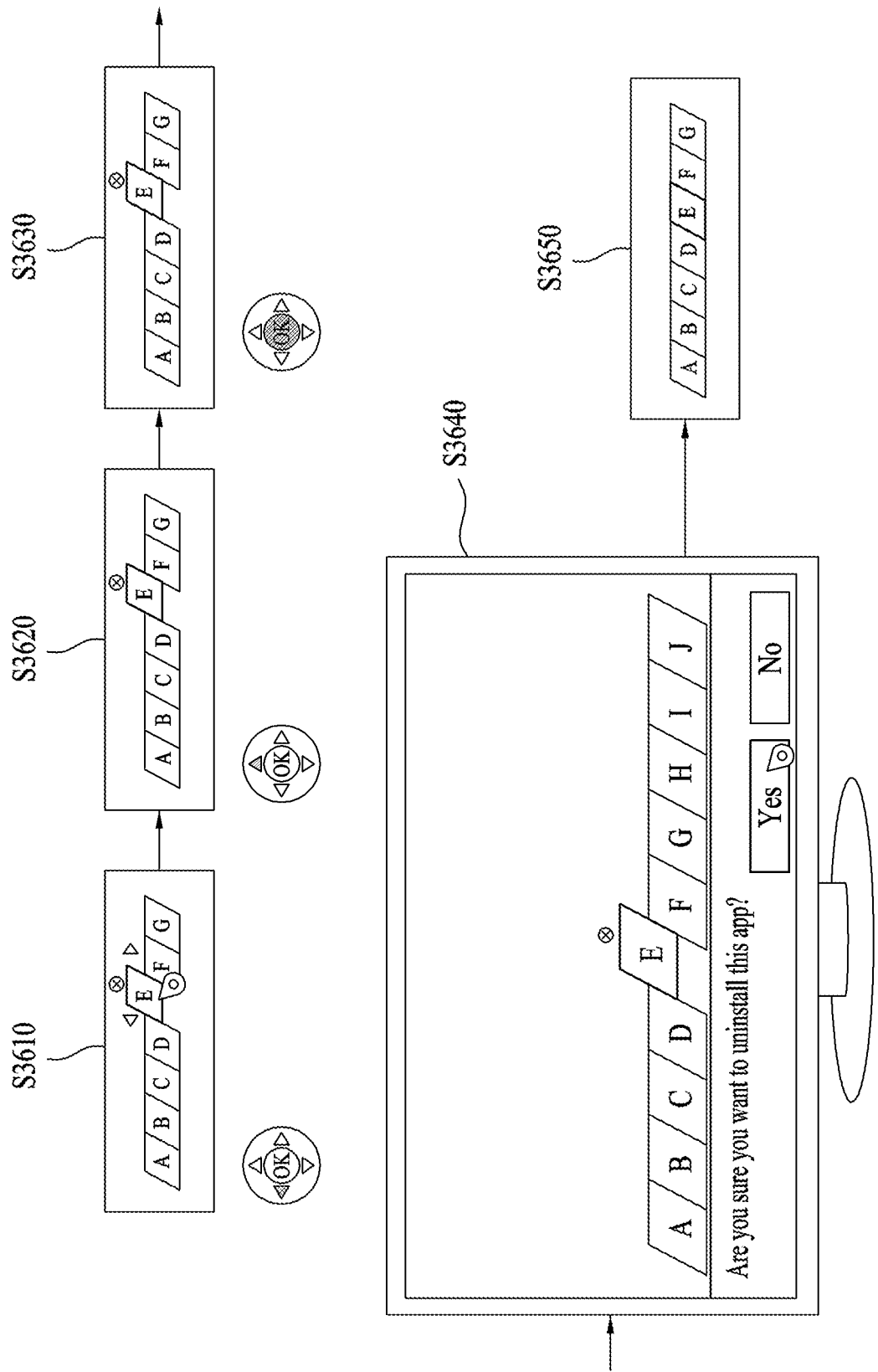
Figure 37:
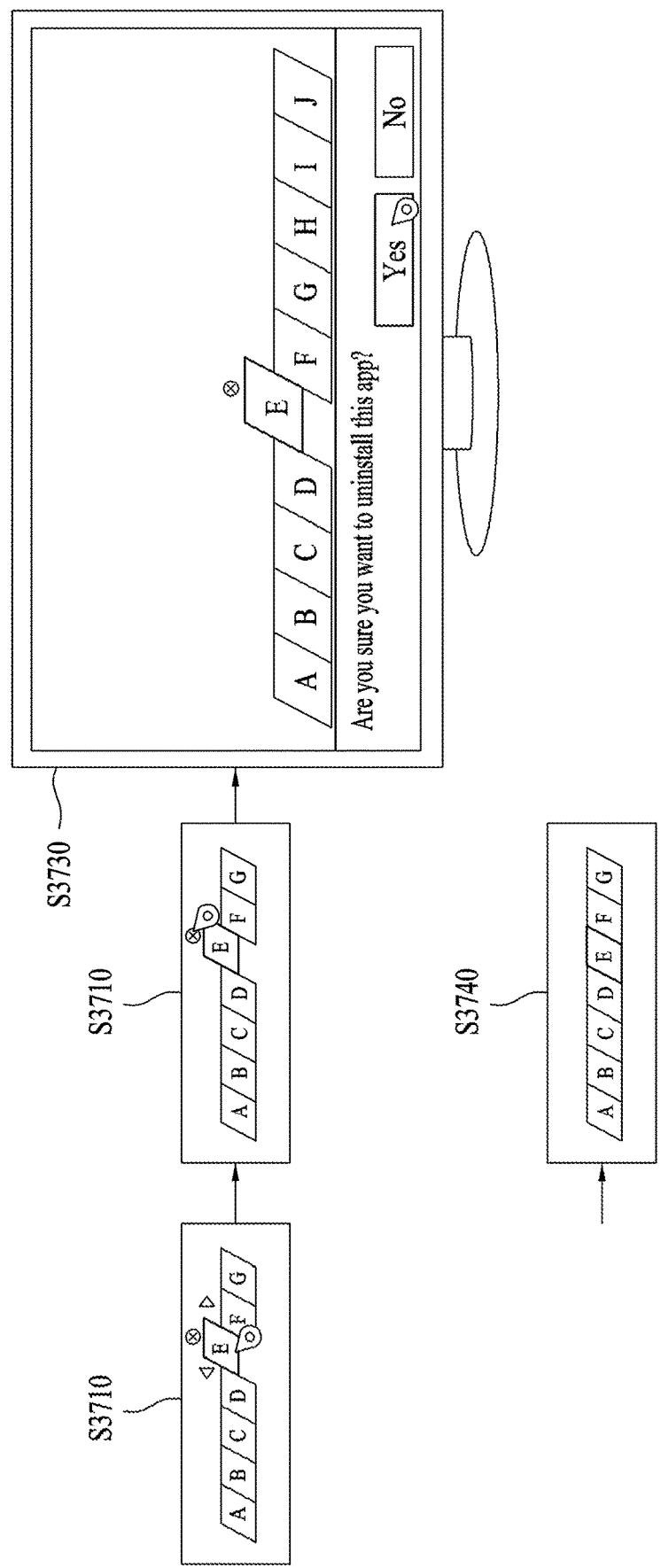

FIG. 35 to FIG. 37 illustrate an example of editing an application icon included in a third page from a digital device according to an embodiment of the present invention.

As shown in FIG. 35, when a third page including icons respective to the applications, which are installed in the digital device (3500), is displayed on the screen, and when a signal indicating that the user has selected an Edit mode respective to an icon of the corresponding application is received, the controller of the digital device (3500) according to the embodiment of the present invention may perform control operations so as to relocate the icon of the selected application to a position higher than an icon of another application (S3510).

Additionally, when the user inputs a Move leftward or rightward signal by using direction keys (physical keys) included in a remote controller, the controller may perform control operations so as to change the positions of icons of the applications with respect to the user input signal (S3520).

Finally, when the user inputs an OK key included in the remote controller or inputs a Move downward signal, the controller may perform control operations so as to relocate the icon of the corresponding application to a higher position identical to icons of other applications, and to end the Edit mode respective to the selected application.

Moreover, as shown in FIG. 36, when the third page including the icons of applications installed in the digital device is displayed, and, after the user points at the icon of the corresponding application, when a signal for inputting an Up-key included in the remote controller is received, the controller of the digital device according to the embodiment of the present invention may perform control operations so as to relocate the position of the pointed application to a position higher that icons of other applications, and to activate the Edit mode with respect to the pointed application (S3610).

Additionally, when the controller receives a signal corresponding to the user's input of the Up-key of the remote controller, the controller may perform control operations so as to relocate the pointer for performing control to the Delete key (S3620).

When the controller of the digital device receives a signal corresponding to the user's input of the Up-key (S3630), the controller may perform control operations so as to display a message verifying whether or not to delete the selected application icon from the third page on the screen (S3640).

Thereafter, when the user inputs a signal requesting for the deletion of the corresponding application icon through the message, the controller may perform control operations so as to delete the corresponding application icon from the third page and to align other application icons in a respective order and display the aligned applications (S3650).

As shown in FIG. 37, when the user relocates the position of the application icon included in the third page to an upward direction by using the remote controller, the controller of the digital device according to the embodiment of the present invention may perform control operations so as to activate the Edit mode respective to the selected application icon (S3710).

Thereafter, when the user relocates the remote controller and selects the Delete Application icon with the pointer (S3720), the controller may perform control operations so as to display a message verifying whether or not to delete the selected application icon on the screen (S3730).

Finally, when the user inputs a signal requesting for the deletion of the selected application icon through the message, the controller may perform control operations so as to align other application icons in a respective order and display the aligned applications (S3740).

Figure 38:
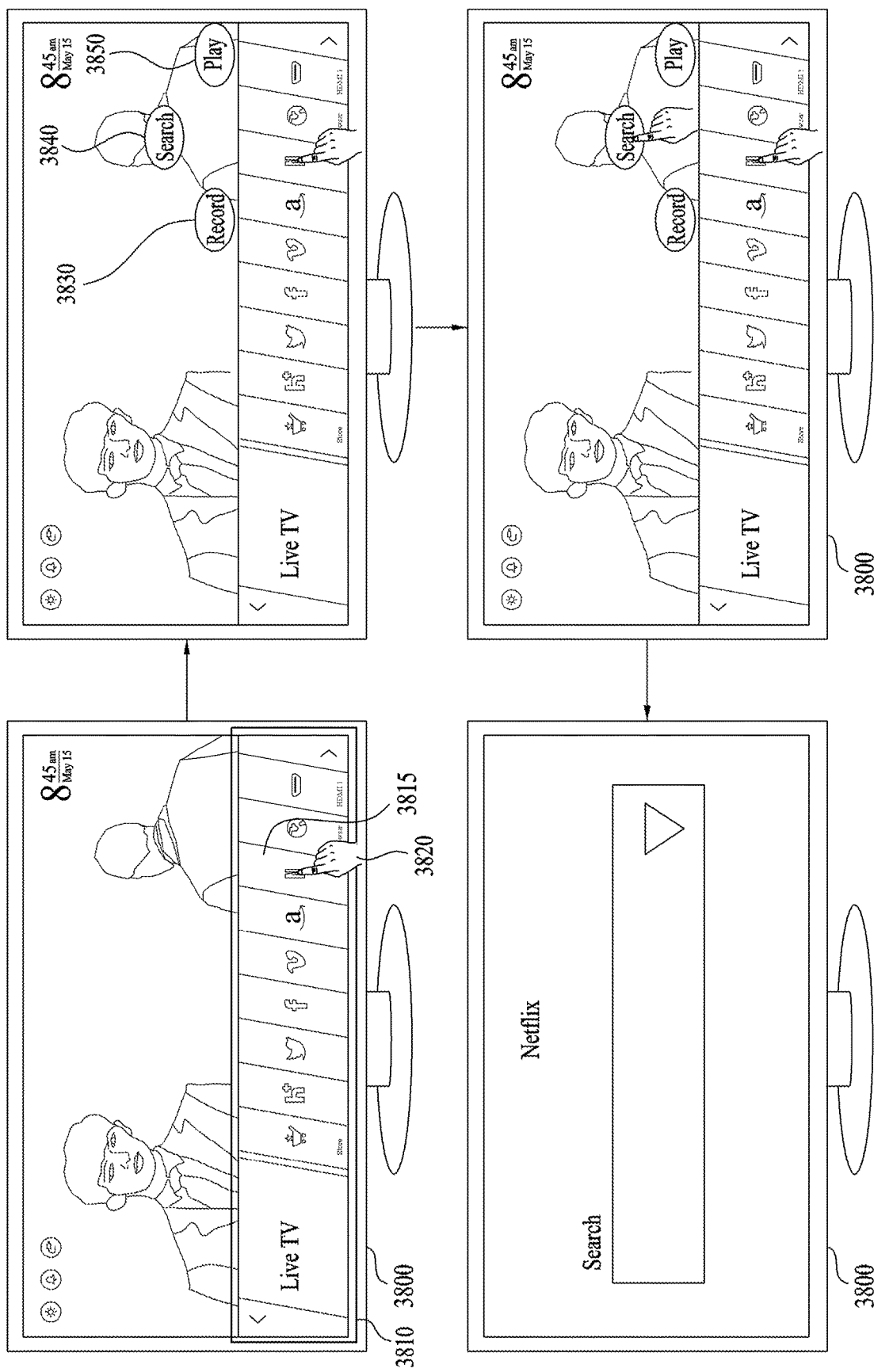
FIG. 38 illustrates an example of controlling a Favorite application within a first page from the digital device according to an embodiment of the present invention.

FIG. 38 illustrates an example of controlling a Favorite application within a first page from the digital device according to an embodiment of the present invention.

As shown in FIG. 38, the controller of the digital device (3800) according to the embodiment of the present invention may perform control operations so as to receive a first page output request signal, wherein the first page includes a Home menu, and to display the first page (3810). Thereafter, when the controller receives a signal, which is input by the user by using the pointer (3820), for pointing at the Favorite application icon (3815) for a predetermined period of time or more, the controller may perform control operations so as to display lower menu icons (3830, 3840, 3850) of the Favorite application icon (3815). Furthermore, when the controller receives a signal input by the user for selecting a specific lower menu icon (3840) by using the direction keys included in the external inputting means or by moving (or relocating) the pointer (3815), the controller may perform control operations so as to display content (3860) respective to the selected specific lower menu icon (3840) on the screen.

FIG. 39 illustrates another example of controlling a Favorites application within a first page from the digital device according to an embodiment of the present invention.

As shown in FIG. 39, when a first page (3910) including a Favorite application list is being displayed, and when the controller receives a signal input by the user by pointing at a specific Favorite application (3920) for a predetermined period of time or more using the pointer (3915), the controller may perform control operations so as to display application icons (3930, 3940, 3950) of applications having the same or similar categories as the pointed specific Favorite application (3920).

Accordingly, by designing the digital device as shown in FIG. 39, it will be advantageous in that the user may be capable of quickly and easily executing applications belonging to the same or similar category.

Figure 40:
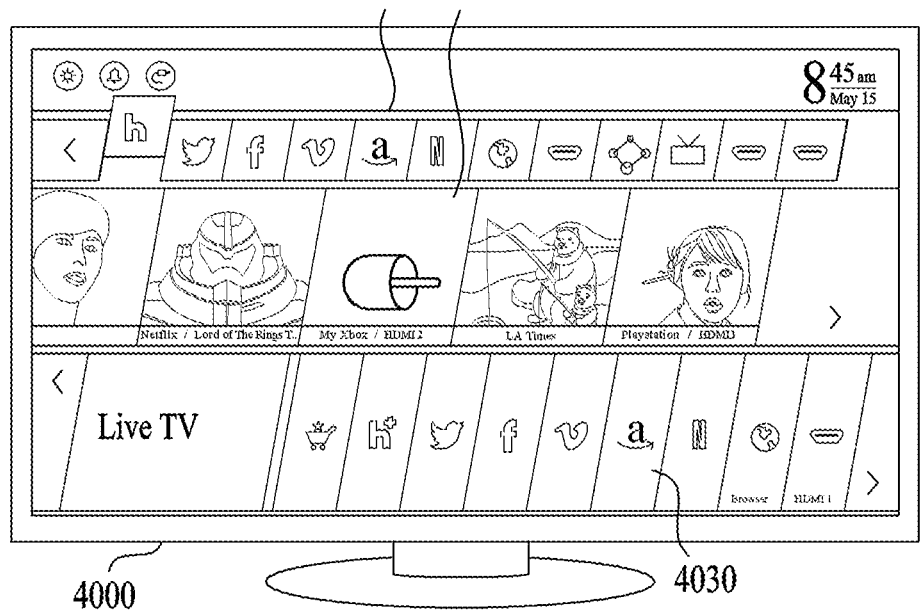
FIG. 40 illustrates an example of simultaneously outputting a first page, a second page, and a third page from the digital device according to an embodiment of the present invention.

FIG. 40 illustrates an example of simultaneously outputting a first page, a second page, and a third page from the digital device according to an embodiment of the present invention.

As shown in FIG. 40, the controller of the digital device (4000) according to the embodiment of the present invention may perform control operations so as to display a first page (4010), a second page (4020), and a third page (4030) in a single screen at the same time in accordance with the user's request. Additionally, as shown in FIG. 40, the user may configure settings so that the first page (4010), the second page (4020), and the third page (4030) can be interchanged between one another, while the first page (4010), the second page (4020), and the third page (4030) are being simultaneously displayed in one screen. Accordingly, the user may configure settings so that details being displayed on the first page (4010) and the second page (4020) can be exchanged between one another, while the first page (4010), the second page (4020), and the third page (4030) are being simultaneously displayed in one screen. Furthermore, while the first page (4010), the second page (4020), and the third page (4030) are being simultaneously displayed in one screen, the user may execute a control step allowing the icons included in each step to be added to another page or to be exchanged with another page.

Figure 41:
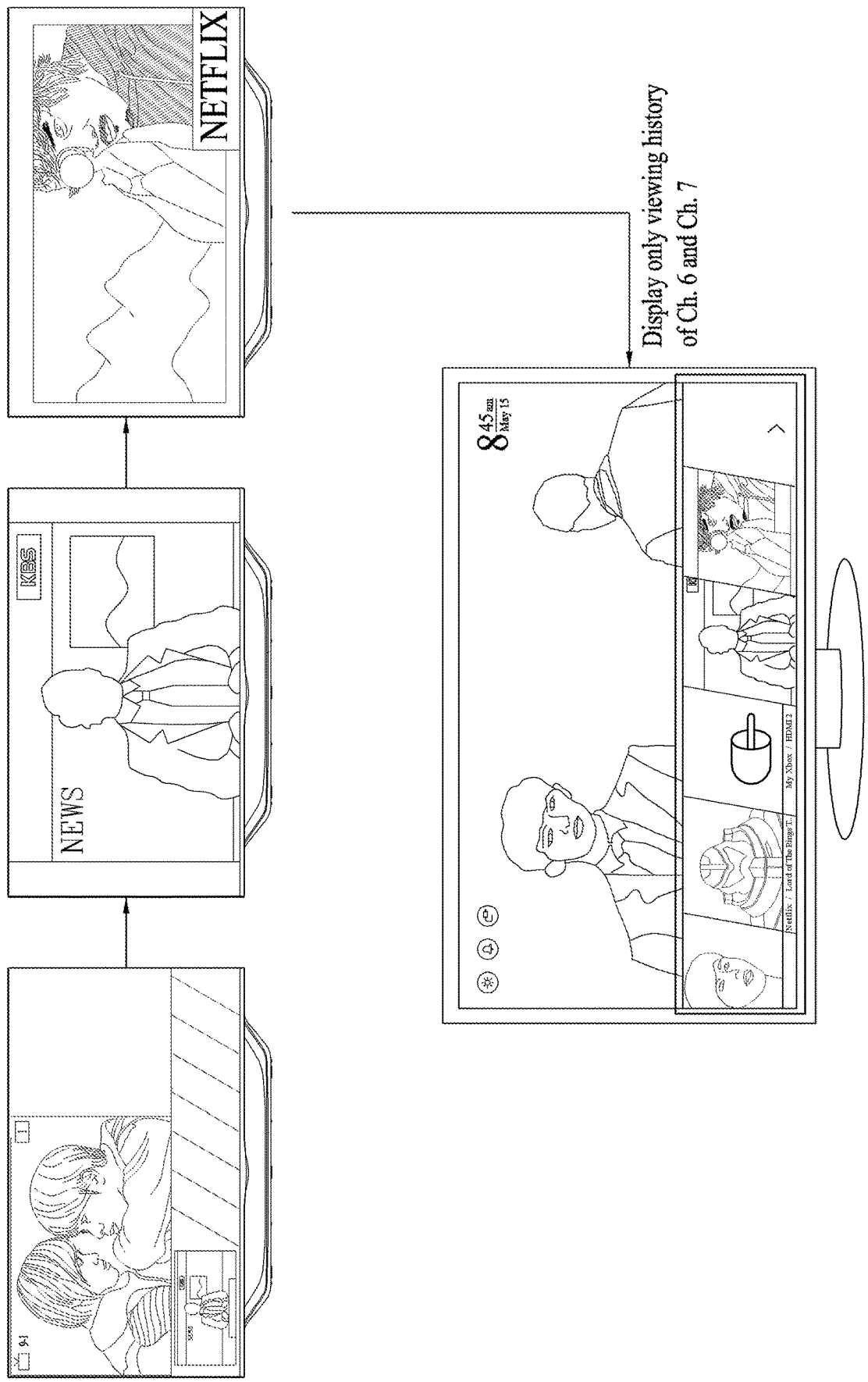
FIG. 41 illustrates an example of a second page displaying only information on a specific channel, the second page being displayed from the digital device according to an embodiment of the present invention.

FIG. 41 illustrates an example of a second page displaying only information on a specific channel, the second page being displayed from the digital device according to an embodiment of the present invention.

As shown in FIG. 41, when the user sequentially views Channel No. 9, Channel No. 7, and Channel No. 6, and when the user configures settings so that details on Channel No. 6 and Channel No. 7 can be recorded in the second page, the controller of the digital device may perform control operations so as to not display viewing history (or viewing record) of Channel No. 9 on the second page, and to display only the viewing history of Channel No. 6 and Channel No. 7 on the second page as set up by the user.

Furthermore, although it is not shown in FIG. 41, when the user has configured settings so that recording can only be performed with respect to a specific application or applications belonging to a specific category, the second page may display an execution history (or execution record) respective to the specific application or applications having the specific category as set up by the user.

Figure 42:
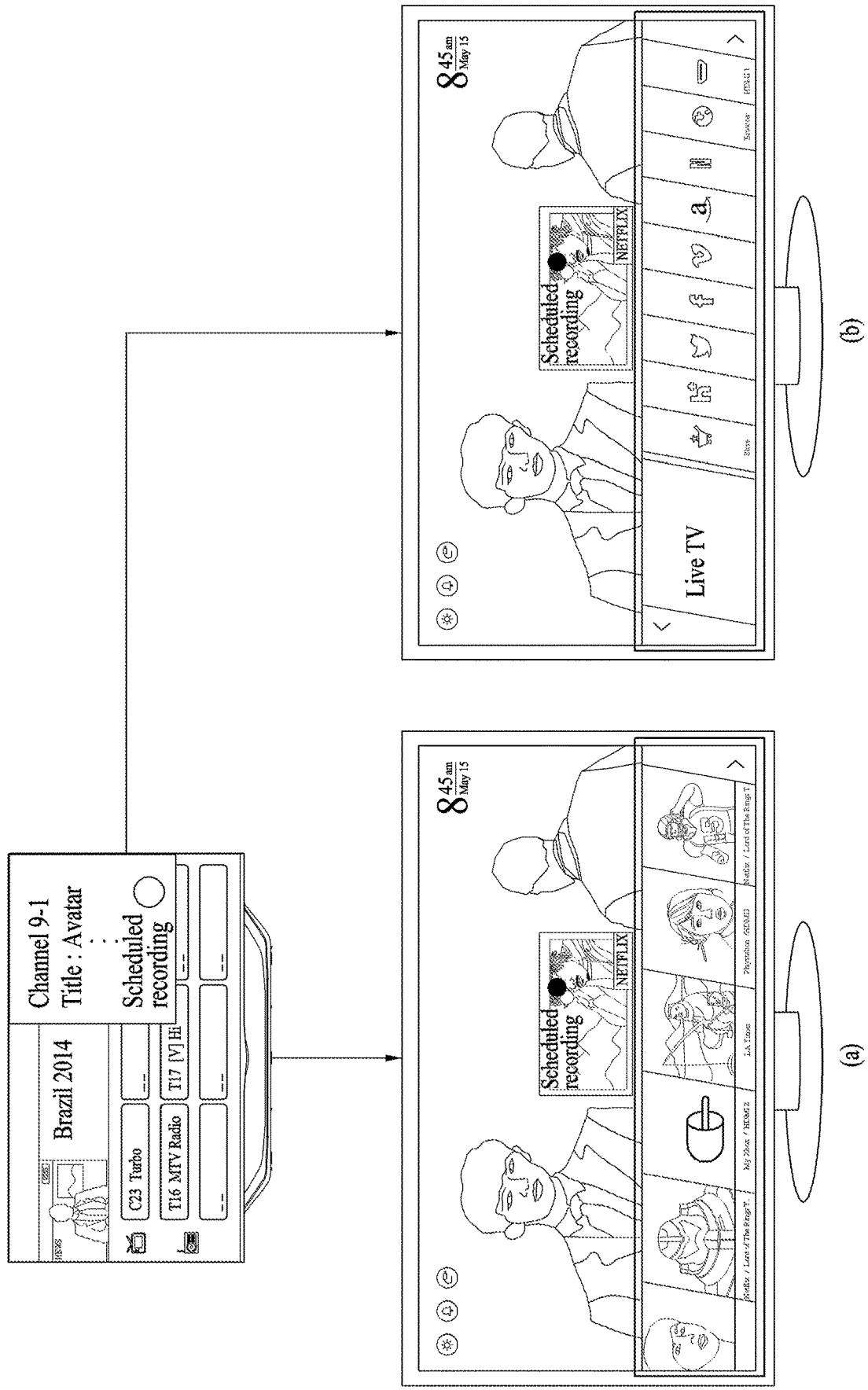
FIG. 42 illustrates an example of having the digital device display scheduled (or reserved) recording information on a first page and a second page according to an embodiment of the present invention.

FIG. 42 illustrates an example of having the digital device display scheduled (or reserved) recording information on a first page and a second page according to an embodiment of the present invention.

When the user sets up scheduled recording (or reserved recording) of broadcast program that is being broadcasted on a specific channel through an EPG (Electronic Program Guide), the controller of the digital device according to the embodiment of the present invention may perform control operations so as to display a Sub-window notifying that the scheduled recording has been completed in a surrounding area of a window including information on a specific channel with respect to which the user has set up the scheduled recording respective in the second page, as shown in (a) of FIG. 42, or to display a Sub-window notifying that the scheduled recording has been completed in a specific area of the first page, as shown in (b) of FIG. 42.

The digital device disclosed in this specification may not be limited only to the configuration and methods of the above-described embodiments, and, therefore, variations of the embodiments may be configured by selectively combining each embodiment fully or in part.

MODE FOR CARRYING OUT THE INVENTION

The method for operating the digital device disclosed in this specification may be realized as a code that can be read by a processor, which is provided in a network device, in a recording medium that can be read by a processor. The recording medium that can be read by the processor includes all types of recording devices storing data that can be read by the processor. Examples of the recording media that can be read by a processor may include ROM (Read Only Memory), RAM (Random Access Memory), CD-ROM, magnetic tape, floppy disk, optical data storing device, and so on. Also, a recording medium being realized in the form of a carrier-wave, such as a transmission via Internet, may also be included. Also, the recording medium that can be read by a processor may be scattered within a computer system, which is connected through a network. And, a code that can be read by the processor may be stored and executed by using a dispersion (or scattering) method.

Meanwhile, although detailed description is provided in this specification with reference to the accompanying drawings, this is merely exemplary, and, therefore, the detailed description will not be limited only to such exemplary embodiments, and, it should also be understood that diverse features that can be modified and varied by anyone skilled in the art, to which the present invention belongs, come within the scope of the appended claims and their equivalents. It is also apparent that such variations of this specification are not to be understood individually or separately from the technical scope or spirit of this specification.

INDUSTRIAL APPLICABILITY

The present invention relates to a digital device and a method for controlling the same, which have industrial applicability.

What is claimed is:

1. A digital television comprising:
a memory configured to store one or more applications;
an interface configured to receive control signals from a remote controller; a display; and
a controller configured to:
    display an application execution screen of an application among the one or more applications,
    display a single row menu for listing arranged multiple application icons overlapping at a lower portion of the application execution screen,
    navigate through the displayed single row menu and after a specific application icon is pointed and a direction key among a plurality of direction keys included in the remote controller is selected, enter an edit mode for rearranging the pointed specific application icon while continuing to display the application execution screen, wherein the plurality of direction keys include an up direction key, a left direction key, a right direction key, and a down direction key,
    while in the edit mode, move up the pointed specific application icon to a position higher than other icons displayed in the single row menu, and display both a left direction indicator on a left side of the pointed specific application icon for moving the pointed specific application icon to the left and a right direction indicator on a right side of the pointed specific application icon for moving the pointed specific application icon to the right,
    while in the edit mode and in response to selecting at least one of the right direction key or the left direction key right and left direction keys included in the remote controller, change a position of the pointed specific application icon within the single row menu by relocating the pointed specific application icon to the changed position within the single row menu, and
    end the edit mode for the pointed specific application icon in response to selecting an OK key or the down direction key included in the remote controller.

2. The digital television of claim 1, wherein the multiple application icons include at least one of a thumbnail image, a moving picture and an icon image.

3. The digital television of claim 1, wherein the controller enlarges or changes an appearance of the pointed specific application icon in response to selecting one of the plurality of direction keys included in the remote controller.

4. The digital television of claim 1, wherein the multiple application icons correspond to a social networking application, a video on demand application or an online shopping application.

5. A method of controlling a digital television, the method comprising:
    storing one or more applications in a memory of the digital television;
    displaying an application execution screen of an application among the one or more applications;
    displaying a single row menu for listing arranged multiple application icons overlapping at a lower portion of the application execution screen;
    navigating through the displayed single row menu and after a specific application icon is pointed and a direction key among a plurality of direction keys included in a remote controller is selected, entering an edit mode for rearranging the pointed specific application icon while continuing to display the application execution screen, wherein the plurality of direction keys include an up direction key, a left direction key, a right direction key, and a down direction key;
    while in the edit mode, moving up the pointed specific application icon to a position higher than other icons displayed in the single row menu, and displaying both a left direction indicator on a left side of the pointed specific application icon for moving the pointed specific application icon to the left and a right direction indicator on a right side of the pointed specific application icon for moving the pointed specific application icon to the right;
    while in the edit mode and in response to selecting at least one of the right direction key or the left direction key included in the remote controller, changing a position of the pointed specific application icon within the single row menu by relocating the pointed specific application icon to the changed position within the single row menu; and
    ending the edit mode for the pointed specific application icon in response to selecting an OK key or the down direction key included in the remote controller.

6. The method of claim 5, wherein the at least one application icon includes at least one of a thumbnail image, a moving picture and an icon image.

7. The method of claim 5, further comprising enlarging or changing an appearance of the pointed specific application icon in response to selecting one of the plurality of direction keys included in the remote controller.

8. The method of claim 5, wherein the multiple application icons correspond to a social networking application, a video on demand application or an online shopping application.

* * * * *